(12) United States Patent
Kuromizu

(10) Patent No.: US 8,491,143 B2
(45) Date of Patent: Jul. 23, 2013

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 372 days.

(21) Appl. No.: 13/121,212

(22) PCT Filed: Jul. 17, 2009

(86) PCT No.: PCT/JP2009/062944
§ 371 (c)(1),
(2), (4) Date: Mar. 28, 2011

(87) PCT Pub. No.: WO2010/050276
PCT Pub. Date: May 6, 2010

(65) Prior Publication Data
US 2011/0199545 A1    Aug. 18, 2011

(30) Foreign Application Priority Data
Oct. 31, 2008    (JP) .................. 2008-282389

(51) Int. Cl.
*G09F 13/04*    (2006.01)

(52) U.S. Cl.
USPC ........... 362/97.1; 362/235; 362/606; 362/615

(58) Field of Classification Search
USPC ................. 362/97.1, 235, 606, 607, 615, 616
See application file for complete search history.

(56) References Cited

U.S. PATENT DOCUMENTS

| | | |
|---|---|---|
| 2003/0063456 A1 | 4/2003 | Katahira |
| 2006/0221638 A1 | 10/2006 | Chew et al. |
| 2009/0316074 A1 | 12/2009 | Tomiyoshi |

FOREIGN PATENT DOCUMENTS

| | | |
|---|---|---|
| JP | 2001-93321 A | 4/2001 |
| JP | 2006-286638 A | 10/2006 |
| RU | 2 174 725 C1 | 10/2001 |
| RU | 44 408 U1 | 10/2005 |
| RU | 44 410 U1 | 10/2005 |
| WO | 2008/050509 A1 | 5/2008 |

OTHER PUBLICATIONS

English translation of Official Communication issued in corresponding Russian Patent Application No. 2011116558, mailed on Jul. 13, 2012.
Official Communication issued in International Patent Application No. PCT/JP2009/062944, mailed on Oct. 27, 2009.

*Primary Examiner* — Vip Patel
(74) *Attorney, Agent, or Firm* — Keating & Bennett, LLP

(57) ABSTRACT

A backlight unit includes LEDs, light guide plates, LED boards, clips and locking structures. Each light guide plate has a light entrance surface and a light exit surface. The light entrance surface faces the LED. Light from the LED enters the light entrance surface. The light exit surface is parallel to a Y-axis direction. The light guide plates are arranged in lines along the Y-axis direction so as to overlap one another in a Z-axis direction, and are fixed to the LED boards with the clips. A first light guide plate is arranged on a rear-surface side with respect to a second light guide plate, which is arranged on a front-surface side. The locking structures are configured to restrict a relative movement of the second light guide plate in the X-axis direction and the Y-axis direction.

34 Claims, 29 Drawing Sheets

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, displays of image display devices including television receivers are shifting from conventional cathode-ray tube displays to thin-screen displays including liquid crystal panels and plasma display panels. With the thin-screen displays, thin image display devices can be provided. A liquid crystal display device requires a backlight unit as a separate lighting device because a liquid crystal panel used therein is not a light-emitting component.

A technology to provide thin and large-screen liquid crystal display devices is disclosed in Patent Document 1. A backlight unit disclosed therein includes LEDs and light guide plates. Each LED has a light-emitting surface through which light is emitted in the direction substantially parallel to a display surface of a liquid crystal panel. Each light guide plate has a light entrance surface in a side area (a side-edge area) and a light exit surface on a front surface. The light entrance surface faces the LED. Light emitted from the LED enters the light guide plate through the light entrance surface and exit from the light exit surface toward the display surface of the display panel. The light guide plates and the LEDs are arranged in lines that are parallel to each other. Each line contains a plurality of the light guide plates and the LEDs and extends in a direction parallel to an arrangement direction in which each light guide plates and the corresponding LED are arranged. The adjacent light guide plates overlap each other.
Patent Document 1: Japanese Published Patent Application No. 2001-93321

PROBLEM TO BE SOLVED BY THE INVENTION

To arrange the light guide plates in a parallel layout, the light guide plates are mounted in sequence from the rear side. The light guide plates need to be precisely positioned on the respective light guide plates that are previously mounted. This makes assembly work difficult. When a displacement occurs in a relative portion of a specific guide plated to the adjacent light guide plate arranged in series, a position of the light entrance surface with respect to the LED also displaced. As a result, a variation may occur in the amount of incident light to the light entrance surface or the amount of outgoing light from the light exit surface, and brightness may vary from one light guide plate to another.

Especially in a large-screen liquid crystal display device, a large number of light guide plates are arranged in a parallel layout. Positional relationships between the light guide plates cannot be easily equalized. The workability tends to further decrease. Therefore, a solution to such a problem is needed.

DISCLOSURE OF THE PRESENT INVENTION

The present invention was made in view of the foregoing circumstances. An object of the present invention is to simplify assembly work and to reduce uneven brightness.

PROBLEM TO BE SOLVED BY THE INVENTION

To solve the above problem, a lighting device of the present invention includes light sources, a base member, a plurality of light guide members, a fixing members and locking structures. The light sources and the light guide members are mounted to the base member. Each of the light guide members has a light entrance surface that faces at least one of the light sources such that light from the light source enters the light guide member through the light entrance surface. Each of the light guide members has a light exit surface through which the light exits. The light exit surface is parallel to an arrangement direction in which the light source and the light entrance surface are arranged. The light guide members are arranged in a line along the arrangement direction and overlapping one another in a direction that crosses the light exit surface. The light guide members that overlap one another include a first light guide member and a second light guide member. The first light guide member is arranged on a base member side. The second light guide member is arranged on an opposite side from the base member side. The fixing members fix the light guide members to the base member so as to be held in initial conditions in which the light guide members are mounted. The first light guide member is included in the light guide members that overlap one another and arranged on a base member side. The second light guide member is included in the light guide members that overlap one another and arranged on an opposite side from the base member side. The locking structures are provided for restricting a relative movement of the second light guide member in a direction along the light exit surface. The locking structures are provided in the fixing member that fixes the first light guide member and the second light guide member, respectively.

During mounting of the light guide members, the first light guide member is mounted to the base member and fixed with the fixing members. Then, the second light guide member is mounted to the base member. The second light guide member is arranged on an opposite side from the base member with respect to the first light guide member so as to overlap the first light guide member. The locking structures restrict relative movement of the second light guide member to the fixing members that fix the first light guide member along the light exit surface. With this configuration, assembly work can be easily performed and the second light guide member is less likely to move with respect to the first light guide member. Because positional relationships between the light guide members remain constant, positional relationships between the light sources and the light entrance surfaces are equalized. Moreover, amounts of incident rays to the light entrance surfaces and amounts of outgoing rays from the light exit surfaces are equalized. Therefore, differences in brightness are less likely to be produced among the light guide members. In a large-size lighting device, a large number of the light guide members are arranged in a parallel layout. Therefore, this configuration is especially advantageous for such a lighting device.

BEST MODE FOR CARRYING OUT THE INVENTION

First Embodiment

The first embodiment of the present invention will be explained with reference to FIGS. 1 to 17. In this embodiment, a liquid crystal display device 10 will be explained. X-axes, Y-axes and Z-axes in some figures correspond to each other so as to indicate the respective directions. In FIGS. 4 to 11, the upper side and the lower side correspond to the front-surface side and the rear-surface side, respectively.

Figure 1:
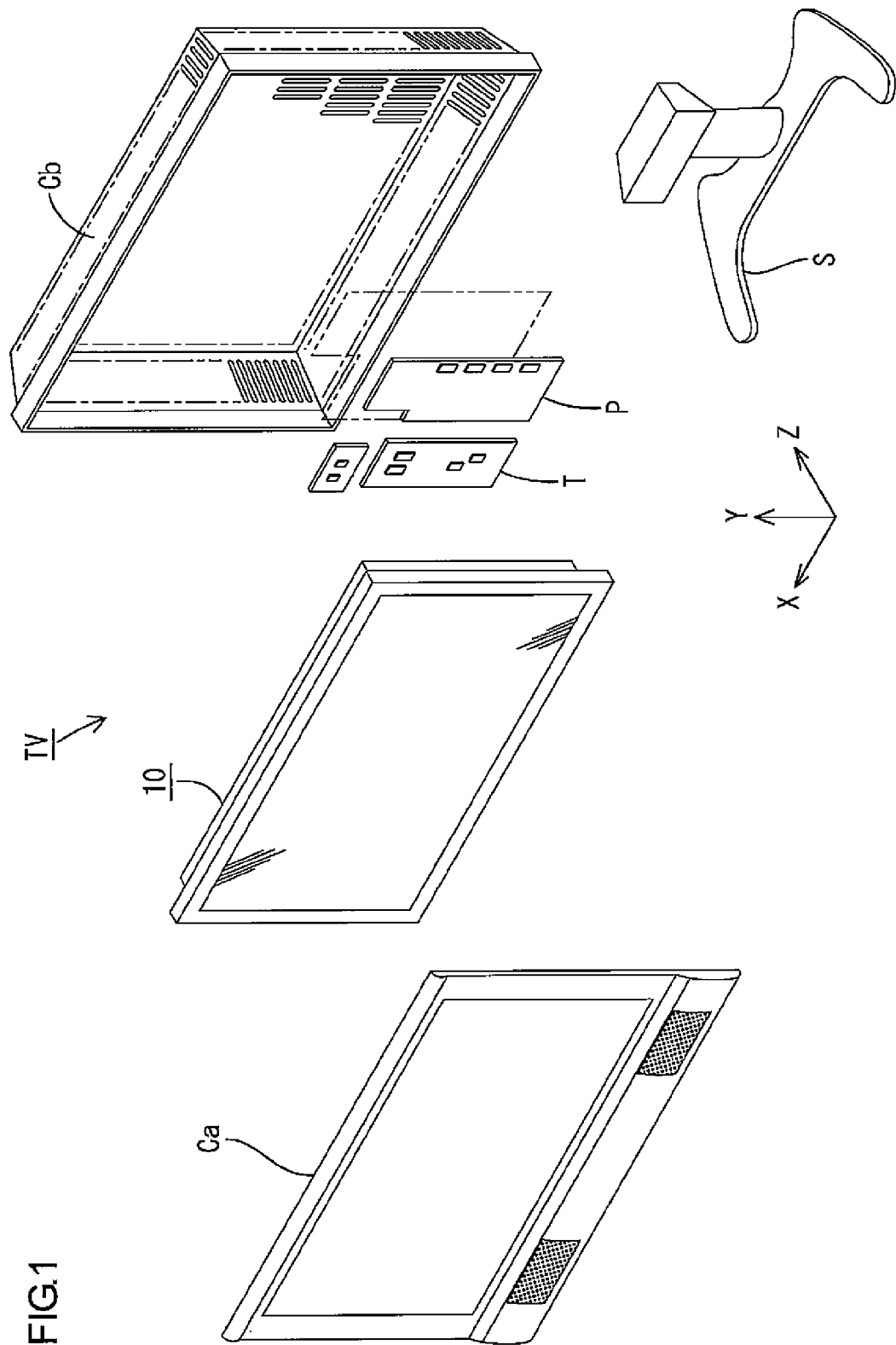
FIG. 1 is an exploded perspective view illustrating a general construction of a television receiver according to the first embodiment.
Figure 2:
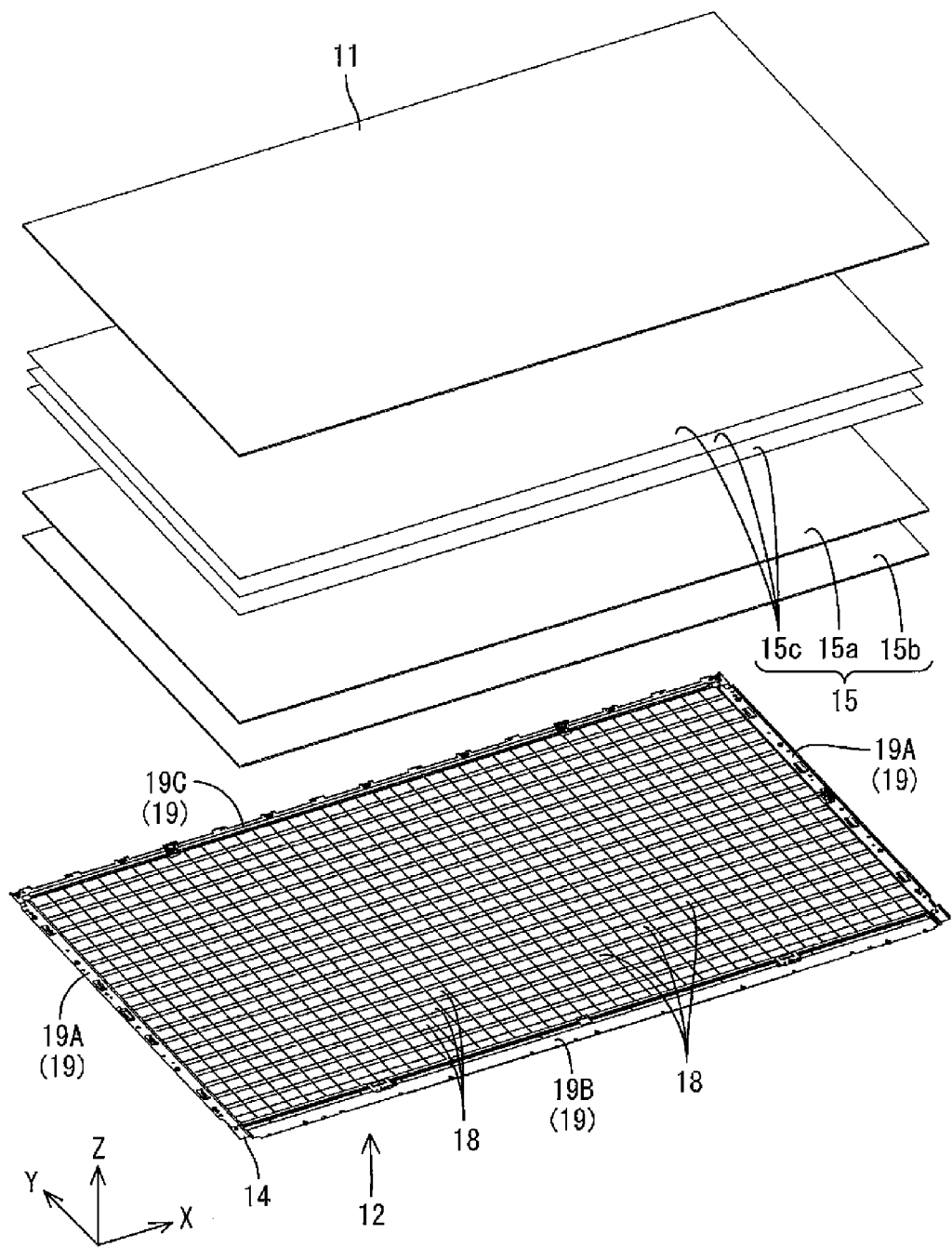
FIG. 2 is an exploded perspective view illustrating a general construction of a liquid crystal panel and a backlight unit.

As illustrated in FIG. 1, the television receiver TV of this embodiment includes the liquid crystal display device 10 (a display device), a front cabinet Ca, a rear cabinet Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 is held by a stand S in a vertical position in which a display surface 11a is set along a substantially vertical direction (the Y-axis direction). The liquid crystal display device 10 has a landscape rectangular overall shape. As illustrated in FIG. 2, the liquid crystal display device 10 includes a liquid crystal panel 11, which is a display panel, and a backlight unit 12 (a lighting device), which is an external light source. The liquid crystal panel 11 and the backlight unit 12 are held together by a frame-shaped bezel 13.

"The display surface 11a is set along the vertical direction" is not limited to a condition that the display surface 11a is set parallel to the vertical direction. The display surface 11a may be set along a direction closer to the vertical direction than the horizontal direction. For example, the display surface 11a may be 0° to 45° slanted to the vertical direction, preferably 0° to 30° slanted.

Next, the liquid crystal panel 11 and the backlight unit 12 included in the liquid crystal display device 10 will be explained. The liquid crystal panel (a display panel) 11 has a rectangular plan view and includes a pair of transparent glass substrates bonded together with a predetermined gap therebetween and liquid crystals sealed between the substrates. On one of the glass substrates, switching components (e.g., TFTs), pixel electrodes and an alignment film are arranged. The switching components are connected to gate lines and the source lines that are perpendicular to each other. The pixel electrodes are connected to the switching components. On the other glass substrate, color filters including R (red) G (green) B (blue) color sections in predetermined arrangement, a counter electrode and an alignment film are arranged. Polarizing plates are arranged on outer surfaces of the glass substrates, respectively (see FIG. 5).

Figure 4:
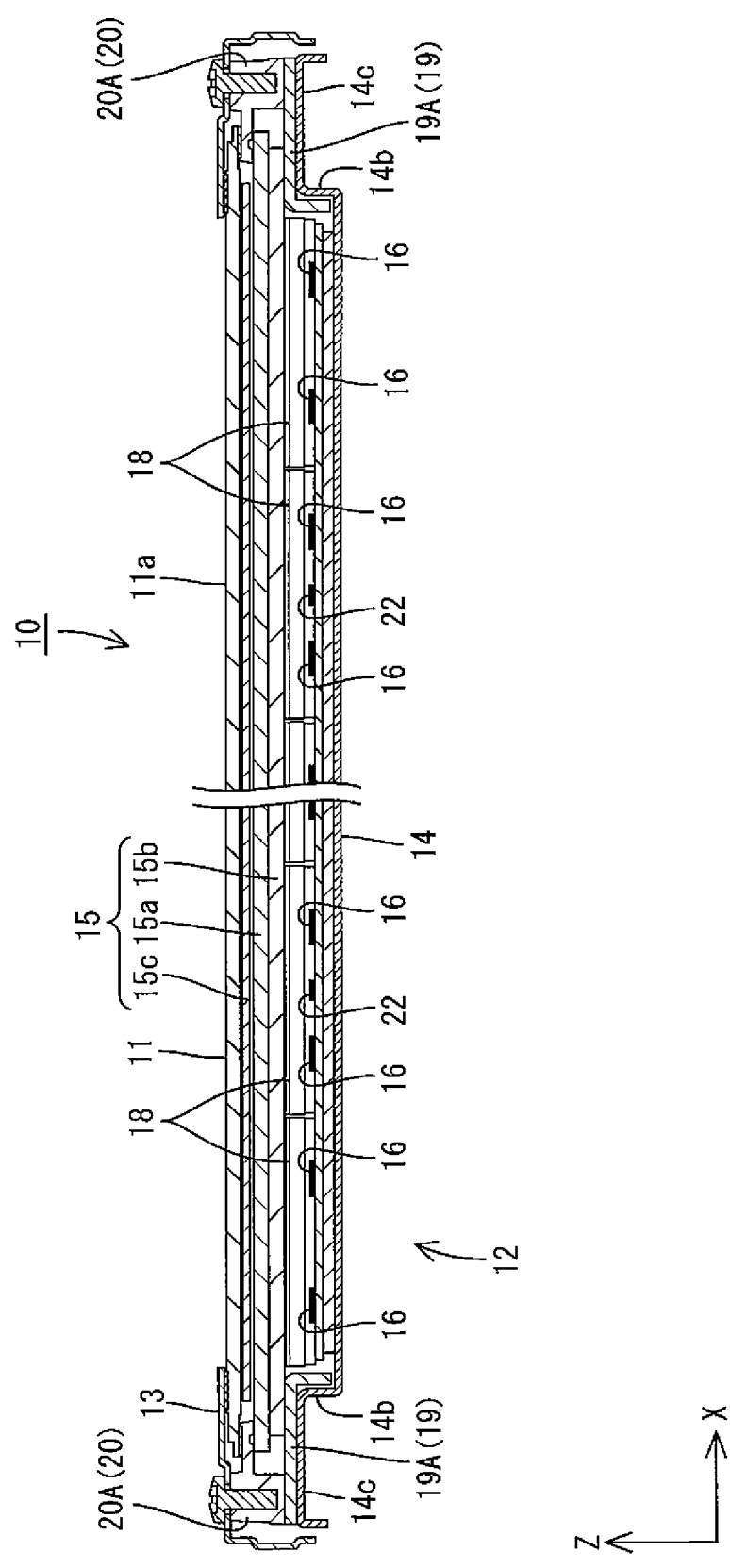
FIG. 4 is a cross-sectional view of a liquid crystal display device along the long-side direction.

Next, the backlight unit 12 will be explained in detail. As illustrated in FIG. 4, the backlight unit 12 includes a chassis 14, an optical member 15, light-emitting diodes (LEDs) 16, LED boards 17 and light guide plates 18. The chassis 14 has a box-like overall shape and an opening on the front side (the liquid crystal panel 11 side, the light-exiting side). The optical member 15 is arranged so as to cover the opening. The LEDs 16 are light sources arranged inside the chassis 14. The LEDs 16 are mounted on the LED boards 17. Rays of light emitted from the LEDs 16 are guided to the optical member 15 by the light guide plates 18. The backlight unit 12 further includes a support member 19, a holddown member 20 and heat sinks 21. The support member 19 holds diffusers 15a and 15b included in the optical member 15 from the rear-surface side. The holddown member 20 holds down the diffusers 15a and 15b from the front-surface side. The heat sinks 21 are provided for dissipation of heat generated while the LEDs 16 are lit.

The backlight unit 12 includes a number of unit light emitters arranged in lines that are parallel to each other. Each unit light emitter includes the light guide plate 18 and the LEDs 16 that are arranged parallel to each other. The LEDs 16 are disposed in side-edge areas of each light guide plate 18. A number of the unit light emitters (twenty of them in FIG. 3) are arranged in series along an arrangement direction (an Y-axis direction) in which the LEDs 16 and the light guide plates 18 are arranged in series, that is, in a tandem layout (see FIGS. 7 to 9). Furthermore, the backlight unit 12 includes a number of the unit light emitters (forty of them in FIG. 3) arranged in lines that are parallel to each other in a direction substantially perpendicular to the tandem arrangement direction (the Y-axis direction) and along the display surface 11a (the X-axis direction). Namely, a number of the unit light emitters are arranged in a plane (i.e., in a two-dimensional parallel layout) along the display surface 11a (the X-Y plane) (see FIG. 3).

Figure 8:
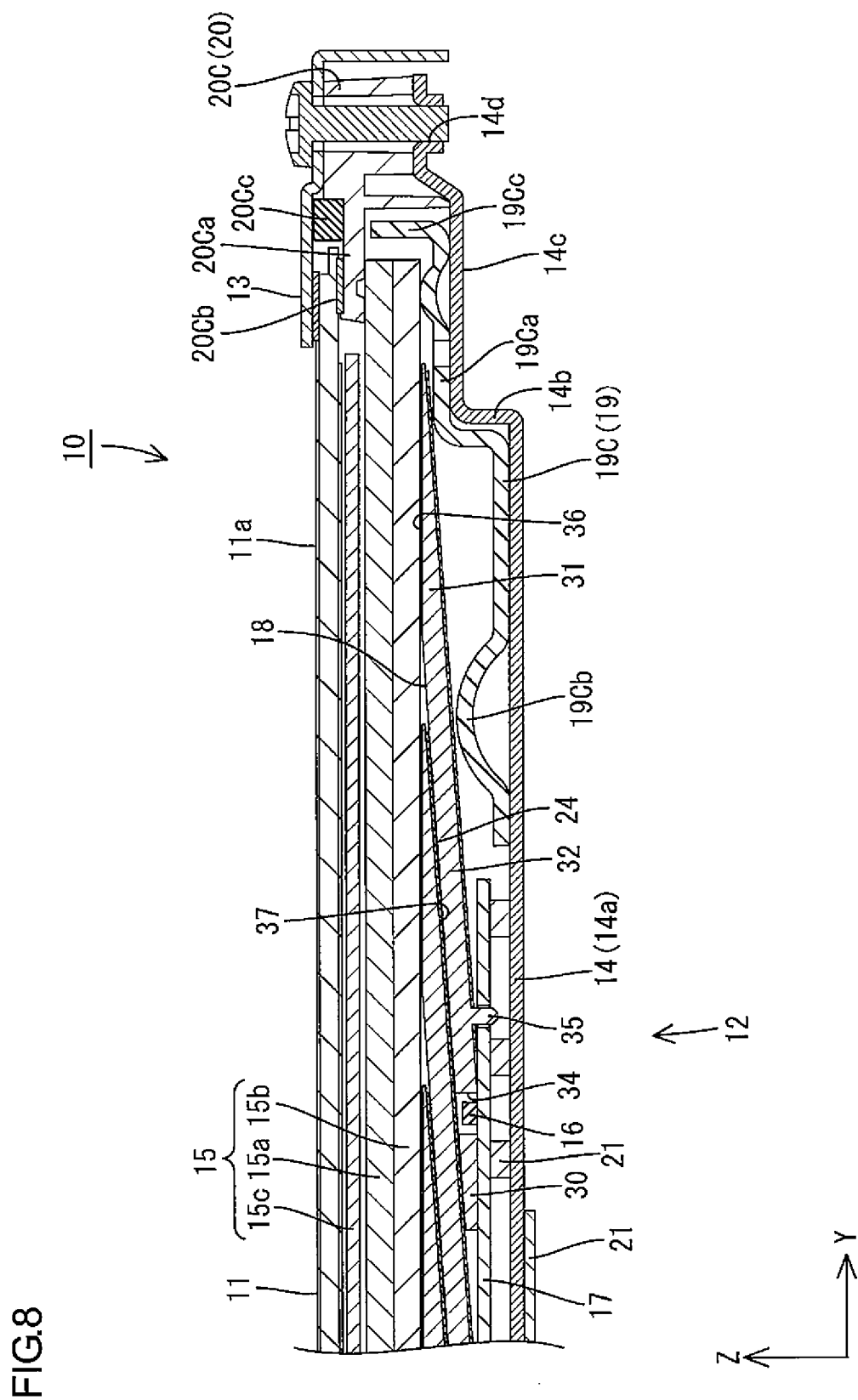
FIG. 8 is a magnified cross-sectional view of an upper-end portion of the liquid crystal display device in FIG. 3 along the short-side direction.

Next, components of the backlight unit 12 will be explained in detail. The chassis 14 is made of metal and has a shallow-box-like overall shape (or a shallow-tray-like overall shape) with the opening on the front-surface side as illustrated in FIG. 4. The chassis 14 includes a bottom plate 14a, side plates 14b and support plates 14c. The bottom plate 14a has a rectangular shape similar to the liquid crystal panel 11. The side plates 14b rise from the respective edges of the bottom plate 14a. The support plates 14c project outward from the respective end edges of the side plates 14b. The long-side direction and the short-side direction of the chassis 14 correspond to the horizontal direction (the X-axis direction) and the vertical direction (the Y-axis direction), respectively. The support plates 14c of the chassis 14 are formed such that the support member 19 and the holddown member 20 are placed thereon, respectively, from the front-surface side. Each support plate 14c has mounting holes 14d that are through holes for holding the bezel 13, the support member 19 and the holddown member 20 together with screws and formed at predetermined locations. One of the mounting holes 14d is illustrated in FIG. 8. An outer edge portion of each support plate 14c on the long side is folded so as to be parallel to the corresponding side plate 14b (see FIG. 4). The bottom plate 14a has insertion holes 14e that are through holes for inserting clips 23 therein and formed at predetermined locations (see FIGS. 5 and 6). The light guide plates 18 are mounted to the chassis with the clips 23. The bottom plate 14a also has mounting holes (not shown). The mounting holes are through holes for mounting the LED boards 17 with screws and formed at predetermined locations.

As illustrated in FIG. 4, the optical member 15 is arranged between the liquid crystal panel 11 and the light guide plates 18. It includes the diffusers 15a and 15b arranged on the light guide plate 18 side, and an optical sheet 15c arranged on the liquid crystal panel 11 side. Each of the diffusers 15a and 15b includes a transparent resin base material with a predefined thickness and a large number of diffusing particles scattered in the base material. The diffusers 15a and 15b have functions of diffusing light that passes therethrough. The diffusers 15a and 15b having the same thickness are placed on top of each other. The optical sheet 15c is a thin sheet having a smaller thickness than that of the diffusers 15a and 15b. The optical sheet 15c includes three sheets placed on top of each other, more specifically, a diffusing sheet, a lens sheet and a reflection-type polarizing sheet arranged in this order from the diffuser 15a or 15b side (i.e., from the rear-surface side).

Figure 3:
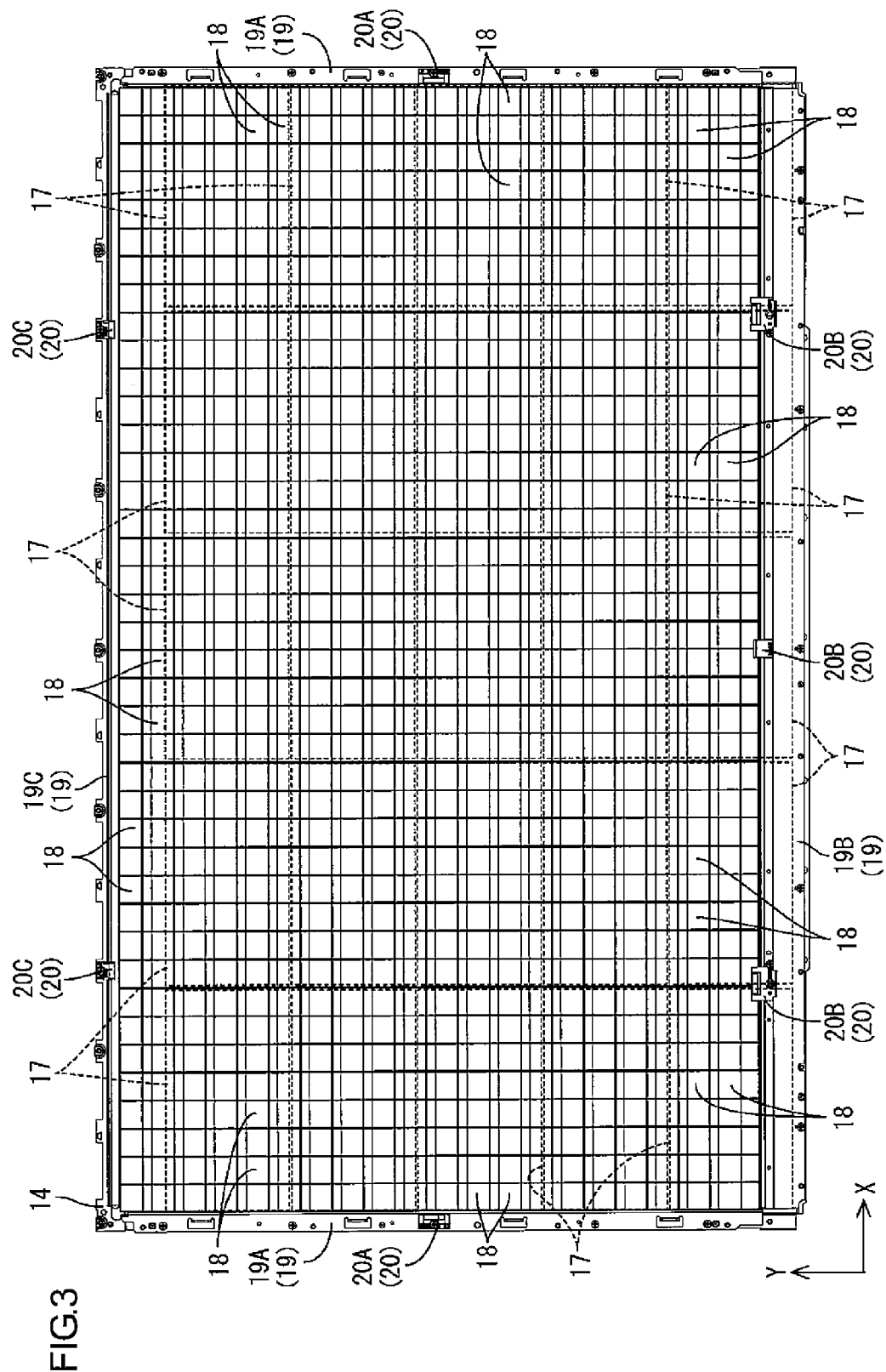
FIG. 3 is a plan view of the backlight unit.

The support member 19 is arranged on outer-edge portions of the chassis 14 so as to support almost entire outer-edge portions of the diffuser plates 15a and 15b. As illustrated in FIG. 3, the support member 19 includes a pair of short-side support parts 19A and two different long-side support parts 19B and 19C. The short-side support parts 19A are arranged so as to extend along the respective short sides of the chassis 14. The long-side support parts 19B and 19C are arranged so as to extend along the respective short sides of the chassis 14. The parts of the support member 19 are configured differently according to mounting locations. The symbols 19A to 19C are used for referring to the parts of the support member 19 independently. To refer to the support member 19 as a whole, the numeral 19 without the letters is used.

Figure 5:
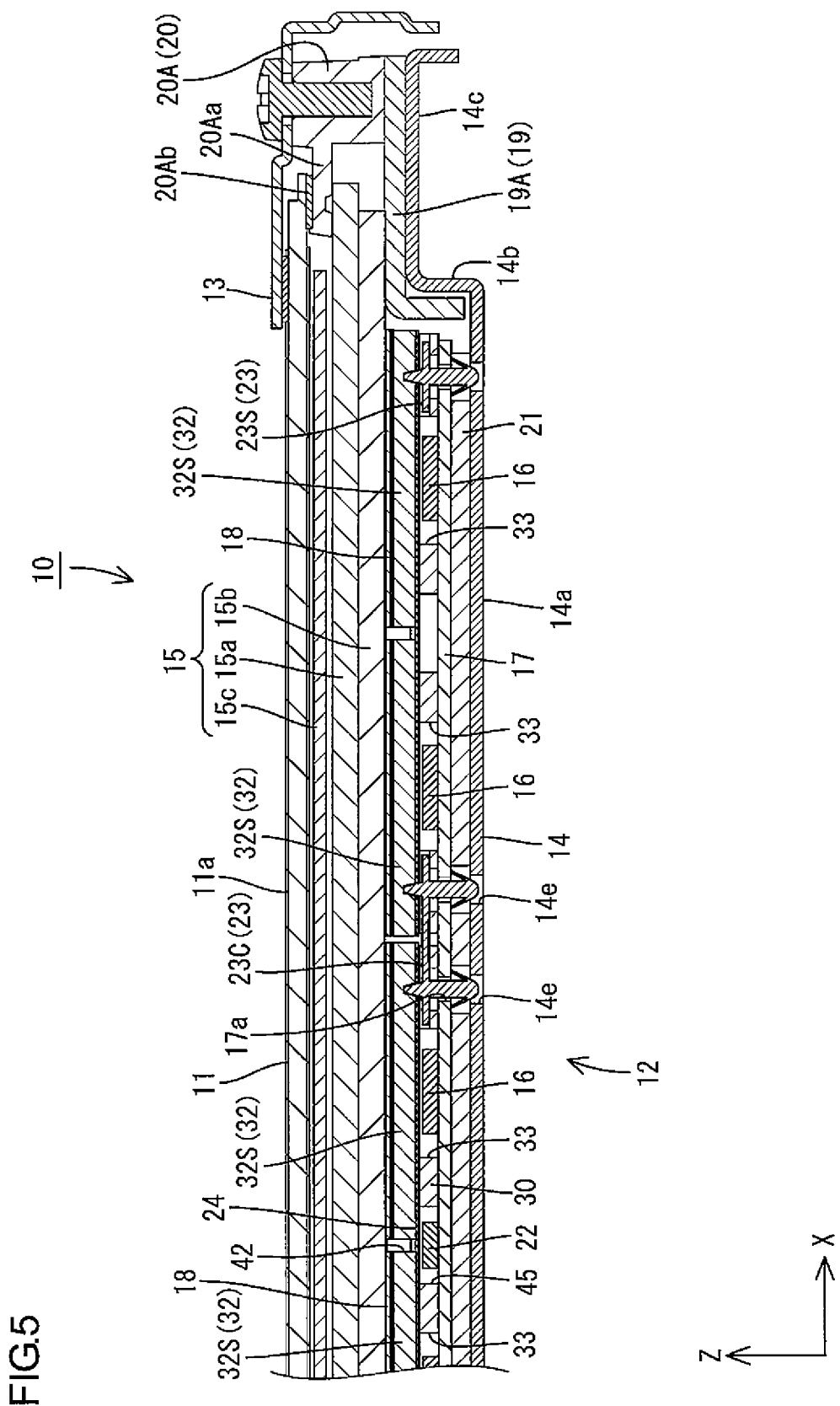
FIG. 5 is a magnified cross-sectional view illustrating an end portion of the liquid crystal display device in FIG. 4.

As illustrated in FIGS. 4 and 5, the short-side support parts 19A have substantially same configurations. Each of them has a substantially L-shape cross-section so as to extend along a surface of the support plate 14c and an inner surface of the side plate 14b. A part of each short-side support part 19A parallel to the support plate 14c receives the diffuser 15b in an inner area and a short-side holddown part 20A in an outer area. The short-side holddown part 20A will be explained later. The short-side support parts 19A cover substantially entire lengths of the support plates 14c and the side plates 14b on the short sides.

Figure 7:
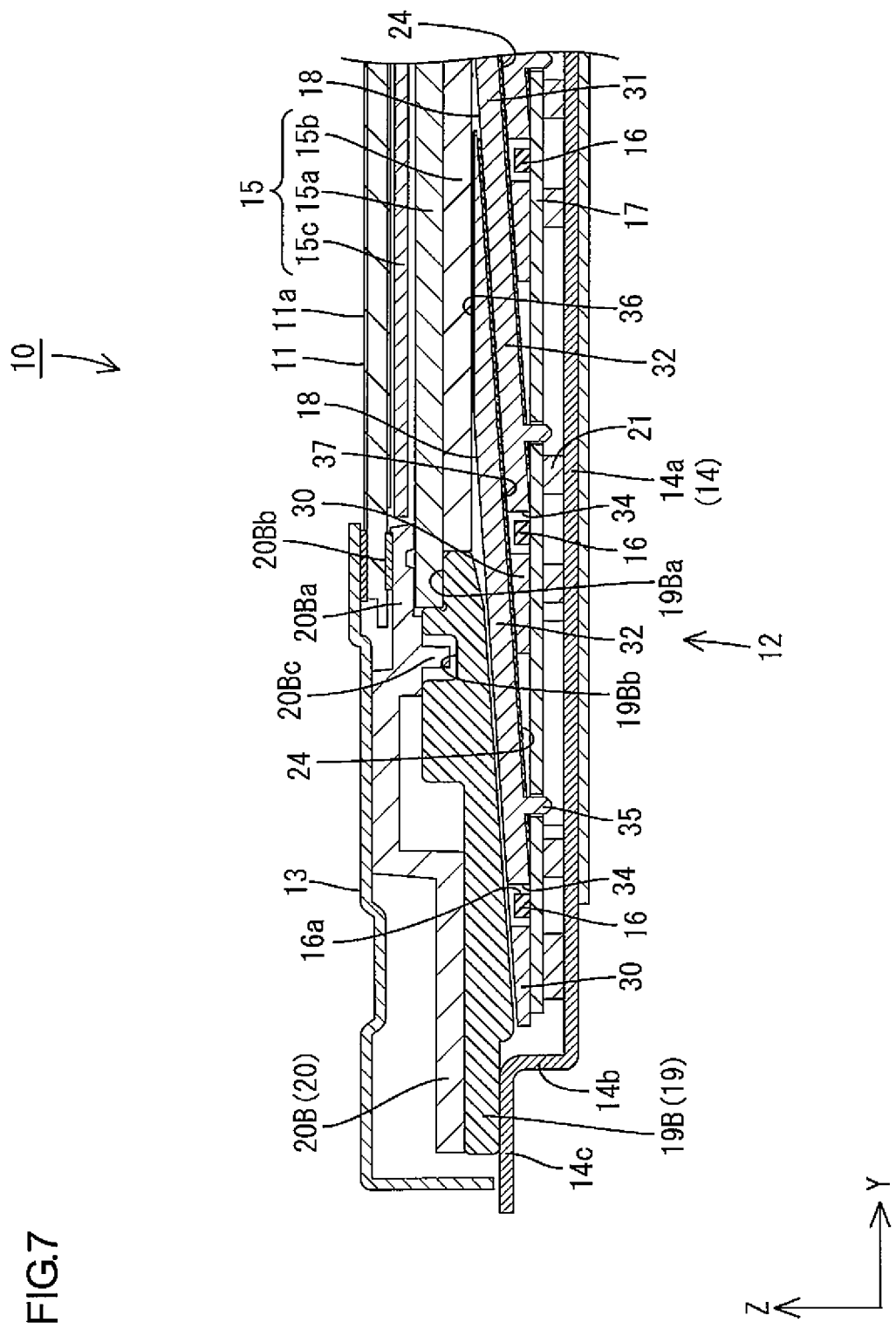
FIG. 7 is a magnified cross-sectional view of a lower-end portion of the liquid crystal display device in FIG. 3 along the short-side direction.

The long-side support parts 19B and 19C are configured differently. Specifically, the first long-side support part 19B is arranged on the lower side in FIG. 3 (the lower side in the vertical direction) of the chassis 14. As illustrated in FIG. 7, it is arranged so as to extend along the inner surface of the support plate 14c and a surface of the adjacent light guide plate 18 located on the front-surface side (a surface opposite from the LED board 17 side). The first long-side support part 19B has a function of pressing the adjacent light guide plate 18 from the front-surface side. The first long-side support part 19B receives the diffuser 15a that is located on the front-surface side in the inner-edge area, and the first long-side holddown part 20B in the outer-edge area. The first long-side holddown part 20B will be explained later. The inner-edge area of the first long-side support part 19B has a stepped portion 19Ba formed so as to correspond to the shape of the outer edge area of the diffuser 15a that is located on the front-surface side. Adjacent to the stepped portion 19Ba, recesses 19Bb for receiving protrusions 20Bc of the first long-side holddown part 20B are formed in the first long-side support part 19B on the outer side with respect to the stepped portions 19Ba. The first long-side holding part 19B covers substantially entire lengths of the support plate 14c on the long side and non-luminous portions of the adjacent light guide plates 18 (a board-mounting portion 30 and a light guide portion 32). The width of the first long-side support part 19B is larger than those of the other support parts 19A and 19C by an area that covers the non-luminous portion.

The second long-side support part 19C is arranged on the upper side of the chassis 14 in FIG. 3 (the upper side in the vertical direction). As illustrated in FIG. 8, the second long-side support part 19C has a crank-like cross-section. It is arranged along the inner surfaces of the support plate 14c, the side plate 14b and the bottom plate 14a. A diffuser support protrusion 19Ca is formed in an area of the long-side support part 19C parallel to the support plate 14c so as to protrude on the front-surface side. The diffuser support protrusion 19Ca has an arch-shaped cross-section. It is brought into contact with the diffuser 15b on the rear-surface side from the rear-surface side. A light guide plate support protrusion 19Cb is formed in an area of the second long-side support part 19C parallel to the bottom plate 14a so as to protrude on the front-surface side. The light guide plate support protrusion 19Cb has an arch-shaped cross-section. It is brought into contact with the adjacent light guide plate 18 from the rear-surface side. The second long-side support part 19C has functions of receiving the diffusers 15a and 15b (i.e., support functions) and light guide plate 18. An area of the second long-side holding part 19C parallel to the support plate 14c and inside with respect to the diffuser support protrusion 19Ca is brought into contact with the end portion of the light guide plate 18 from the rear-surface side. The light guide plate 18 is supported at two points: at the end portion with the support protrusion 19Ca and at the base portion with the light guide support protrusion 19Cb. The second long-side support part 19C covers substantially entire areas of the support plate 14c and the side plate 14b on the long side. A projecting portion 19Cc rises from the outer edge of the second long-side holding part 19C so as to face the end surfaces of the diffusers 15a and 15b.

As illustrated in FIG. 3, the holddown member 20 is arranged on outer-edge areas of the chassis 14. A width of the holddown member 20 is smaller than a dimension of the corresponding sides of the chassis 14 and the diffusers 15a and 15b. Therefore, the holddown member 20 presses parts of the outer-edge portion of the diffusers 15a. The holddown member 20 includes short-side holddown parts 20A arranged on the respective short-edge area of the chassis 14 and a plurality of long-side holddown parts 20B and 20C arranged on each long-edge area of the chassis 14. The parts of the holddown member 20 are configured differently according to mounting locations. The symbols 20A to 20C are used for referring to the parts of the holddown member 20 independently. To refer to the holddown member 20 as a whole, the numeral 20 without the letters is used.

The short-side holddown parts 20A are arranged around central portions of the respective short-edge areas of the chassis 14. They are placed on the outer-edge portions of the short-side support parts 19A and fixed with screws. As illustrated in FIGS. 4 and 5, each short-side holddown part 20A has a holding tab 20Aa that projects inward from a body that is screwed. The diffuser 15a is pressed by edge areas of the holding tabs 20Aa from the front-surface side. The liquid crystal panel 11 is placed on the holding tabs 20Aa from the display surface side and held between the bezel 13 and the holding tabs 20Aa. Cushion materials 20Ab for the liquid crystal panel 11 are arranged on surfaces of the holding tabs 20Aa.

The long-side holddown parts 20B and 20C are configured differently. The first long-side holddown parts 20B are arranged on the lower side of the chassis 14 in FIG. 3 (the lower side in the vertical direction). As illustrated in FIG. 3, three long-side holddown parts 20B are arranged at substantially equal intervals. One of them is arranged around the middle of the long-side-edge area of the chassis 14 on the lower side in FIG. 3 and the other two are arranged on either side of the one arranged in the middle. They are placed on the outer-edge area of the first long-side support part 19B and screwed. As illustrated in FIG. 7, each long-side holding part 20B has a holding tab 20Ba on the inner side similar to the short-side holding parts 20A. A surface of the holding tab 20Ba on the rear-surface side presses the diffuser 15a. Surfaces on the front-surface side receive the liquid crystal display panel 11 via cushion materials 20Bb. The long-side holddown parts 20B has widths larger than those of the other holddown parts 20A and 20C so as to correspond to the first long-side support parts 19B. Protrusions 20Bc for positioning the first long-side holddown parts 20B relative to the first long-side support parts 19B are formed on the surfaces of the long-side holddown parts 20B on the rear-surface side.

The long-side holddown parts 20C are arranged on the upper side of the chassis 14 in FIG. 3 (the upper side in the vertical direction). As illustrated in FIG. 3, two long-side holddown parts 20C are arranged in a long-edge area of the chassis 14 on the upper side in FIG. 3 and off the center. They are directly placed on the support plate 14c of the chassis 14 and screwed. As illustrated in FIG. 8, each long-side holddown part 20C has a holding tab 20Ca on the inner side, similar to the short-side holddown parts 20A and the first long-side holing parts 20B. Surfaces of the holding tabs 20Ca on the rear-surface side press the diffuser 15a and the surfaces on the front-surface side receive the liquid crystal panel 11 via cushion materials 20Cb. Other cushion materials 20Cc are provided between the holding tabs 20Ca of the second long-side holddown parts 20C and the bezel 13.

The heat sinks 21 are made of synthetic resin or metal having high thermal conductivity and formed in a sheet-like shape. As illustrated in FIGS. 5 and 7, the heat sinks 21 are arranged inside and outside the chassis 14, respectively. The heat sink 21 inside the chassis 14 is placed between the bottom plate 14a of the chassis 14 and the LED boards 17. It has cutouts in some areas to avoid other components. The heat sink 21 outside the chassis 14 is attached to the rear surface of the bottom plate 14a of the chassis 14.

Figure 10:
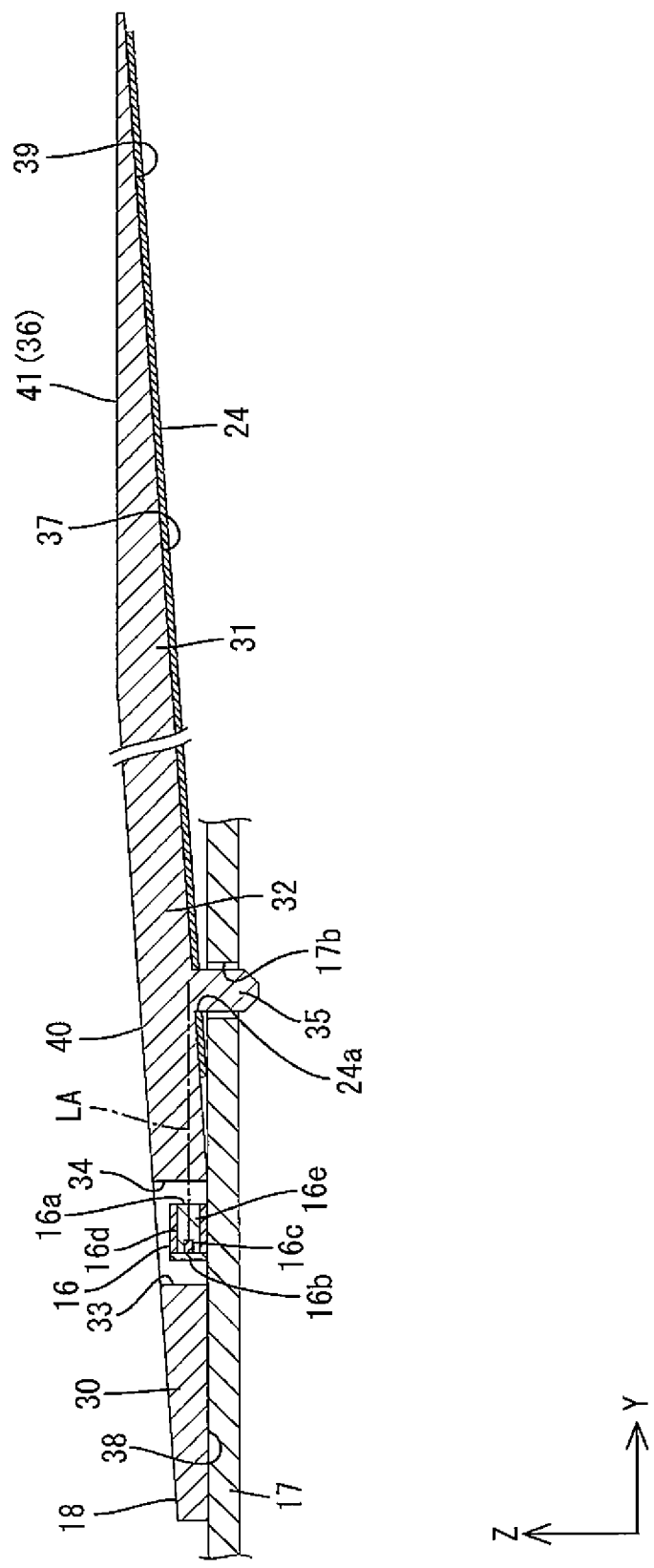
FIG. 10 is a magnified cross-sectional view of a light guide plate in FIG. 9.

As illustrated in FIG. 10, the LEDs 16 are surface-mounted to the LED boards 17, that is, the LEDs 16 are surface-mount LEDs. Each LED 16 has a block-like overall shape that is long in the horizontal direction. The LEDs 16 are side emitting LEDs. A side surface of each LED 16 that stands upright from a mounting surface is a light-emitting surface 16a. The mounting surface is placed against the LED board 17 (i.e., the bottom surface that is in contact with the LED board 17). A light axis LA of light emitted from the LED 16 is substantially parallel to the display surface 11a of the liquid crystal display panel 11 (the light exit surface 36 of the light guide plate 18) (see FIGS. 7 and 10). Specifically, the light axis LA of the light emitted from the LED 16 matches the short-side direction (the Y-axis direction) of the chassis 14, that is, the vertical direction. The light travels toward the upper side in the vertical direction (a travel direction of the outgoing light from the light exit surface 16a) (see FIGS. 3 and 7). The light emitted from the LED 16 three-dimensionally radiates around the light axis LA in a specified angle range. The directivity thereof is higher than cold cathode tubes. Namely, angle distributions of the LED 16 shows a tendency that the emission intensity of the LED 16 is significantly high along the light axis LA and sharply decreases as the angle to the light axis LA increases. The longitudinal direction of the LED 16 matches the long-side direction of the chassis 14 (the X-axis direction).

As illustrated in FIG. 10, the LED 16 includes a plurality of LED chips 16c mounted on a board 16b that is arranged on an opposite side from the light-emitting surface 16a (the rear-surface side). The LED chips 16c are light-emitting components. The LED 16 is housed in the housing 16d and an inner space of the housing 16d is closed with a transparent resin member 16e. The LED 16 includes three different kinds of the LED chips 16c with different main emission wavelengths. Specifically, each LED chip 16c emits a single color of light of red (R), green (G) or blue (B). The LED chips 16c are arranged parallel to each other along the longitudinal direction of the LED 16. The housing 16d is in white that provides high light reflectivity. The housing 16d is formed in a drum-like shape that is long in the horizontal direction. The rear surface of the board 16b is soldered to a land on the LED board 17.

Each LED board 17 is made of resin and the surfaces thereof (including a surface facing the light guide plate 18) are in white that provides high light reflectivity. As illustrated in FIG. 3, the LED board 17 is formed in a plate-like shape having a rectangular plan view. The LED board 17 has a long dimension smaller than the short dimension of the bottom plate 14a and thus it can partially cover the bottom plate 14a of the chassis 14. The LED boards 17 are in a plane arrangement in a grid pattern on the surface of the bottom plate 14a of the chassis 14. In FIG. 3, five along the long-side direction of the chassis 14 by five along the short-side direction and a total of 25 LED boards 17 are arranged parallel to each other. Wiring patterns that are metal films are formed on each LED board 17 and the LEDs 16 are mounted in predetermined locations on the LED board 17. The LED boards 17 are connected to an external control board, which is not illustrated in the figures. The control board is configured to feed currents for turning on the LEDs 16 and to perform driving control of the LEDs 16. A number of LEDs 16 are arranged in a planar grid pattern on each LED board 17. The arrangement pitch of the LEDs 16 corresponds to the arrangement pitch of the light guide plates 18, which will be explained later. Specifically, eight along the long-side direction of the LED board 17 by four along the short-side direction thereof and a total of 32 LEDs 16 are arranged parallel to each other on the LED board 17. Photo sensors 22 are also mounted on the respective LED boards 17. Light emitting conditions of the LEDs 16 are determined by the photo sensors 22 and thus feedback control can be performed on the LEDs 16 (see FIGS. 4 and 12). Each LED board 17 has mounting holes 17a for receiving the clips 23 for mounting the light guide plates 18 (see FIG. 6). It also has positioning holes 17b for positioning the light guide plates 18 (see FIG. 10). The holes are formed in locations corresponding to mounting locations of the light guide plates 18.

Figure 9:
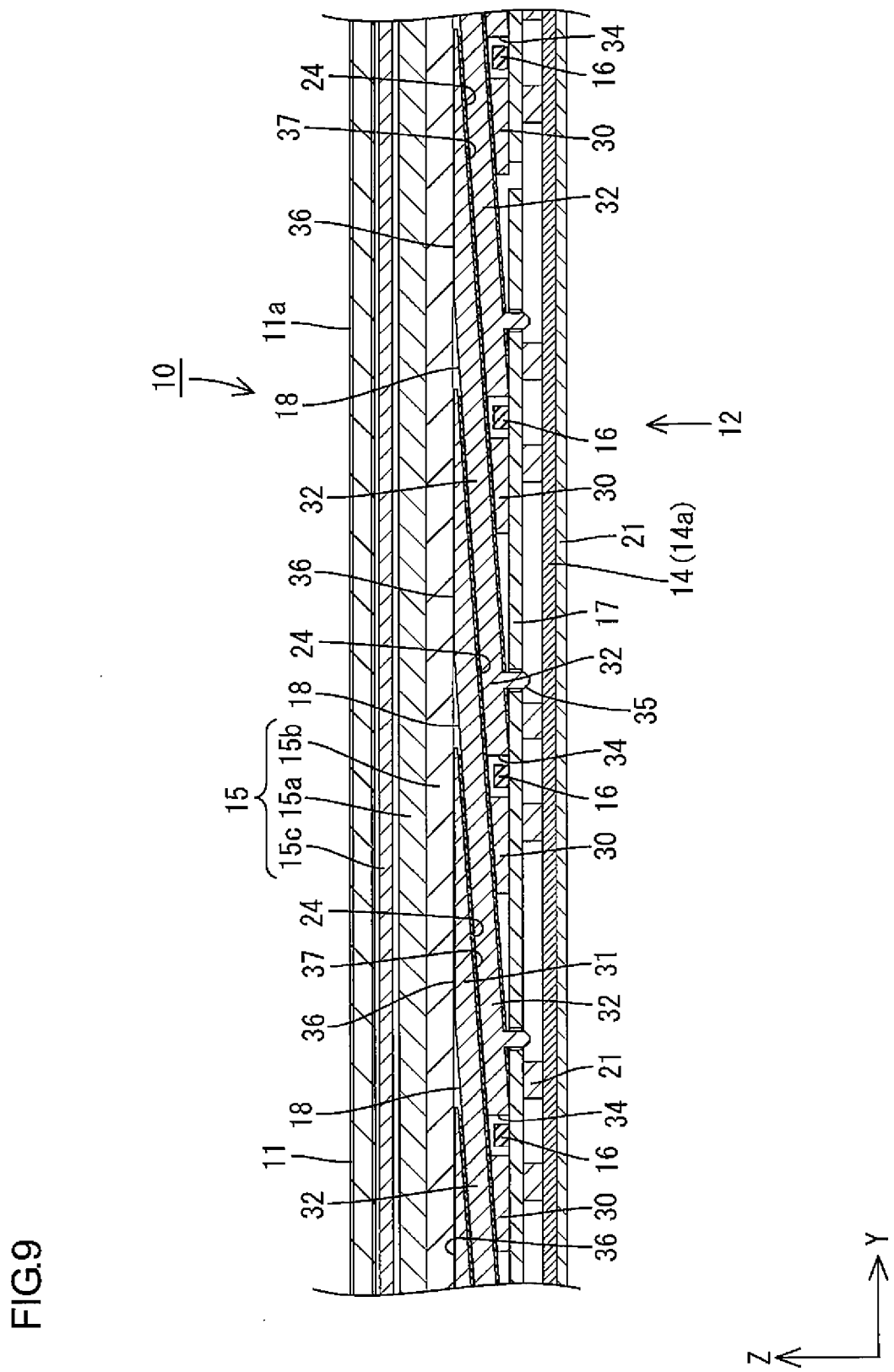
FIG. 9 is a magnified cross-sectional view of a middle portion of the liquid crystal display device along the short-side direction.
Figure 13:
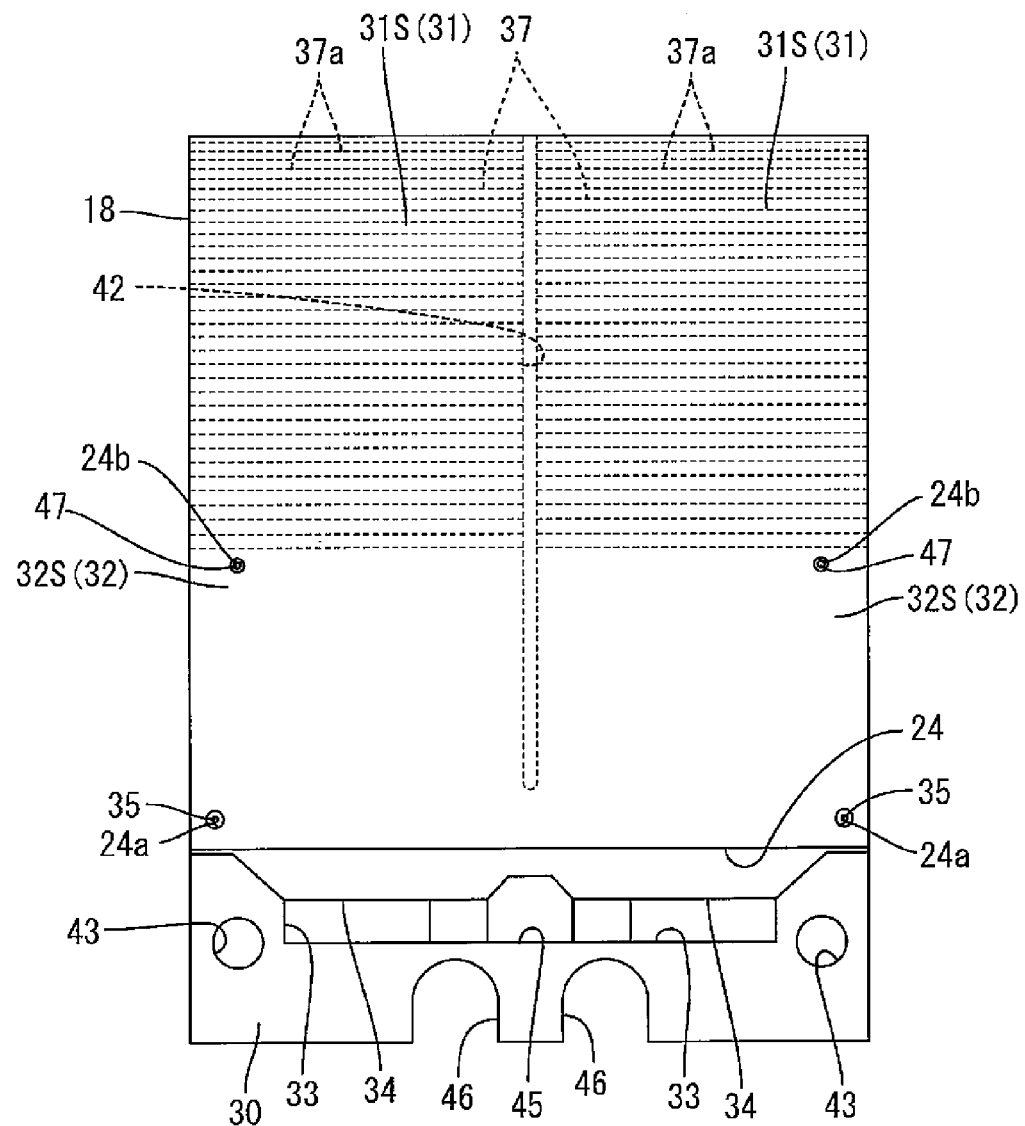
FIG. 13 is a bottom view of the light guide plate.

Each light guide plate 18 is made of substantially transparent (providing high light transmission) synthetic resin (e.g. polycarbonate), a reflective index of which is significantly higher than that of air. As illustrated in FIGS. 7 to 9, the light guide plate 18 draws the light emitted from the LED 16 in the vertical direction (the Y-axis direction), transmit the light therethrough and directs it toward the optical member 15 (in the Z-axis direction). As illustrated in FIG. 13, the light guide plate 18 has a plate-like shape having a rectangular overall plan view. The long-side direction of the light guide plate 18 is parallel to the light axis LA of the LED 16 (the light emitting direction) and the short-side direction of the chassis 14 (the Y-axis direction or the vertical direction). The short-side direction is parallel to the long-side direction of the chassis 14 (the X-axis direction or the horizontal direction). Next, a cross-sectional structure of the light guide plate 18 along the long-side direction will be explained in detail.

As illustrated in FIGS. 7 to 9, each light guide plate 18 has a board-mounting portion 30 that is located at one of end parts of the long dimension (on the LED 16 side) and mounted to the LED board 17. The other end part of the long dimension is configured as a light exit portion 31 from which light exits toward the diffusers 15a and 15b. The middle portion between the board-mounting portion 30 and the light exit portion 31 is configured as a light guide portion 32. The light guide portion 32 is configured to direct the light to the light exit portion 31 without losing most of the light. Namely, the board-mounting portion 30, the light guide portion 32 and the light exit portion 31 are arranged in this order from the LED 16 side along the long-side direction of the light guide plate 18, that is, along the light axis LA (the light emitting direction) of the LED 16. The board-mounting portion 30 and the light guide portion 32 are non-luminous portions. The light exit portion 31 is a luminous portion. In the following description, a point ahead in a direction from the board-mounting portion 30 toward the light exit portion 31 (the light emitting direction of the LED 16 or the direction toward right in FIGS. 7 to 9) is referred to as the front. A point behind in a direction from the light exit portion 31 toward the board-mounting portion 30 (the direction toward left in FIGS. 7 to 9) is referred to as the rear.

In front of the board-mounting portion 30, an LED holding space 33 is formed so as to run all the way through in the Z-axis direction. A surface of one of inner walls of the LED holding space 33, which faces the light-emitting surface 16a of the LED 16 (i.e., the front surface), is a light entrance surface 34 through which light from the LED 16 enters. The light entrance surface 34 is located between the board-mounting portion 30 and the light guide portion 32. About entire peripheries of the light guide portion 32 are flat and smooth surfaces. Scattered reflections do not occur at interfaces (between the surfaces and external air layers). Incident angles of light that strikes the interfaces are larger than a critical angle and thus the light is totally reflected at multiple times while traveling through the light guide portion 32 and guided to the light exit portion 31. Therefore, the light is less likely to leak from the light guide portion 32 and reach other light guide plates 18. The LED chips 16c of the LED 16 emits rays of light in respective RGB colors. Three different colors of the rays are mixed as the rays of light travel through the light guide portion 32 and turn into white. The white light is guided to the light exit portion 31. Furthermore, positioning pin 35 protrudes toward the rear-surface side. It is located in an area of the light guide portion 32 close to the board-mounting portion 30 (close to a rear-end area). The light guide plate 18 is positioned with respect to the LED board 17 in the X-axis direction and the Y-axis direction (the directions parallel to a light exit surface, which will be explained later) when the protrusion 35 is fitted (or inserted) in the positioning hole 17b of the LED board 17.

A surface of the light exit portion 31 which faces the front-surface side is about an entire area of the surface opposite the diffuser 15b is the light exit surface 36. The light exit surface 36 is a substantially flat and smooth surface. It is substantially parallel to the plate surfaces of the diffusers 15a and 15b (or the display surface 11a of the liquid crystal display panel 11) and substantially perpendicular to the light entrance surface 34. The surface of the light exit portion 31 on the rear-surface side (the surface opposite from the light exit surface 36 or the surface facing the LED board 17) is processed so as to form microscopic asperities thereon. The surface with microscopic asperities is a scattering surface 37 that scatters light at the interface. The light that travels through the light guide plate 18 is scattered by the interface of the scattering surface 37. Namely, light rays strike the light exit surface 36 at the incident angles smaller than the critical angle (light rays that break the total reflection) and exit through the light exit surface 36. The scattering surface 37 has a plurality of lines of perforations 37a that extend straight along the short-side direction of the light guide plate 18 and parallel to each other (see FIG. 13). The arrangement pitch (the arrangement interval) of the perforations 37a is larger on the rear side of the light exit portion 31 than on the front-end side and gradually decreases. Namely, the density of the perforations 37a of the scattering surface 37 is low on the rear side and that is high on the front side. The smaller the distance (or closer) to the LED 16 the lower the density becomes, and the larger the distance (or farther) from the LED 16 the higher the density becomes, that is, the perforations 37a formed in a gradational arrangement. With this configuration, brightness in the area of the light exit portion 31 closer to the LED 16 is less likely to differ from brightness in the area of the light exit portion 31 father from the LED 16. As a result, the uniform in-plane brightness distribution can be achieved on the light exit surface 36. The scattering surface 37 is provided in the about entire area of the light exit portion 31. The entire area substantially overlaps the light exit surface 36 in the plan view.

A reflection sheet 24 is placed on surfaces of each light exit portion 31 and each light guide portion 32 (including the scattering surface 37) on the rear-surface side. The reflection sheet 24 is made of synthetic resin and the surface thereof is white that provides high light reflectivity. The reflection sheet 24 is disposed so as to cover about entire areas of the light exit portion 31 and the light guide portion 32 in the plan view (see FIG. 13). With the reflection sheet 24, the light that travels through the light guide plate 18 does not leak to the rear-surface side, and the light that is scattered at the scattering surface 37 is effectively directed toward the light exit surface 36. The reflection sheet 24 is attached to the light guide plate 18 with adhesives at points in side-edge areas that are less likely to interfere with light that travels through the light guide plate 18. The reflection sheet 24 has a pair of holes 24*a* through which the positioning pins 35 are passed (see FIGS. 10 and 13). The holes 24*a* are formed at locations corresponding to the positioning pins 35. The side-edge surfaces and the front-end surface of each light exit portion 31 are flat and smooth surfaces similar to those of the light guide portion 32. Therefore, light is less likely to leak.

As illustrated in FIG. 10, the light guide plate 18 has flat surfaces 38 and 41 on the front-surface side (the surface opposite the diffusers 15*a* and 15*b*, including the light exit surface 36) and on the rear-surface side (the surface opposite the LED board 17), respectively. The flat surfaces 38 and 41 are substantially parallel to the X-Y plane (or the display surface 11*a*). The light guide plate 18 also has sloped surfaces 39 and 40. The sloped surfaces 39 and 40 are sloped with respect to the X-axis and the Z-axis. The surface of the board-mounting portion 30 on the rear-surface side is a mounting surface that is placed on the LED board 17. To make the mounting condition stable, the flat surface 38 (the surface parallel to the main board surface of the LED board 17) is provided. The surfaces of the light guide portion 32 and the light exit portion 31 on the rear-surface side form a continuous sloped surface 39. The board-mounting portion 30 of the light guide plate 18 is in contact with the LED board 17 and fixed. The light guide portion 32 and the light exit portion 31 are separated from the LED board 17, that is, they are not in contact with the LED board 17. The light guide plate 18 is held in a cantilever manner with the board-mounting portion 30 in the rear part as an anchoring point (or a support point) and the front part as a free end.

The surfaces of entire parts of the board-mounting portion 30 and the light guide portion 32 and a part of the light exit portion 31 close to the light guide portion 32 on the front-surface side form the continuous sloped surface 40. The sloped surface 40 is sloped at about the same angle and parallel with respect to the sloped surface 39 on the rear-surface side. Namely, the thickness of the light guide plate 18 is substantially constant in the entire light guide portion 32 and a part of the light exit portion 31 close to the light guide portion 32 (close to the LED 16). The surface of the light exit portion 31 on the front side (away from the LED 16) on the front-surface side is the flat surface 41. Namely, the light exit surface 36 includes the flat surface 41 and the sloped surface 40. Most part of the light exit surface 36 on the front side is the flat surface 41 and a part thereof on the light guide portion 31 side is the sloped surface 40. The thickness of the board-mounting portion 30 decreases toward the rear end (as further away from the light guide portion 32), that is, the board-mounting portion 30 has a tapered shape. A part of the light exit portion 31 adjacent to the light guide portion 32 has the sloped surface 40 on the front-surface side and thus the thickness thereof is constant. A part of the light exit portion 31 located more to the front than the above part has the flat surface 41 on the front-surface side. Therefore, the thickness gradually decreases toward the front end (as further away from the light guide portion 32), that is, the light exit portion 31 has a tapered shape. A long dimension (a dimension measuring in the Y-axis direction) of the flat surface 41 on the front-surface side is smaller than that of the flat surface 38 on the rear-surface side. Therefore, the front-end area of the light exit portion 31 is smaller in thickness than the rear-end area of the board-mounting portion 30. Moreover, a surface area of the front-end area of the light exit portion is smaller than that of the rear-end area of the board-mounting portion 30. All peripheral surfaces of each light guide plate 18 (including side surfaces and a front surface) are vertically straight surfaces, entire areas of which are substantially flat along the Z-axis direction.

As illustrated in FIG. 13, each light guide plate 18 having the above described cross-sectional structure has a pair of LED holding spaces 33 for holding the LEDs 16. Rays of light from the respective LEDs 16 enter the light guide plate 18. The rays from two different LEDs 16 are guided to the diffusers 15*a* and 15*b* in conditions that they are optically independent from each other. The components of the light guide plate 18 will be explained in detail along the planar layout thereof.

The light guide plate 18 has a symmetric shape with a line that passes through the meddle of the short side (in the X-axis direction) as a line of symmetry. The LED holding spaces 33 of the board-mounting portion 30 are arranged symmetrically a predetermined distance away from the middle of the short side (in the X-axis direction) of the light guide plate 18. Each LED holding space 33 has a landscape rectangular shape in plan view and a size slightly larger than an overall size of the LED 16. The height (the dimension measuring in the Z-axis direction) and the width (the dimension measuring in the X-axis direction) are slightly larger than those of the LED 16. The surface area of the light entrance surface 34 is significantly larger than the light exit surface 16*a*. Therefore, the rays of light emitted radially from the LED 16 enter the light guide plate 18 without any loss.

At the middle of a short dimension of the light guide plate 18, a slit 42 is formed so as to divide the light guide portion 32 and the light exit portion 31 into right and left. The slit 42 runs through the light guide plate 18 in the thickness direction (the Z-axis direction) and toward the front along the Y-axis direction with a constant width. Edge surfaces of the light guide plate 18, which face the slit 42, form side-edge surfaces of the divided light guide portion 32S and the divided light exit portion 31S. Each side-edge surface is a flat and smooth surface that is substantially straight along the Z-axis direction. The rays of light passing through the light guide plate 18 totally reflect off an interface between the light guide plate 18 and the air layer in the slit 42. Therefore, the rays of light do not travel or mix together between the divided light guide portions 32S that faces each other via the slit 42 or between the divided light exit portions 31S that faces each other via the slit 42. The divided light guide portions 32S and the divided light exit portions 31A are optically independent from each other.

Figure 12:
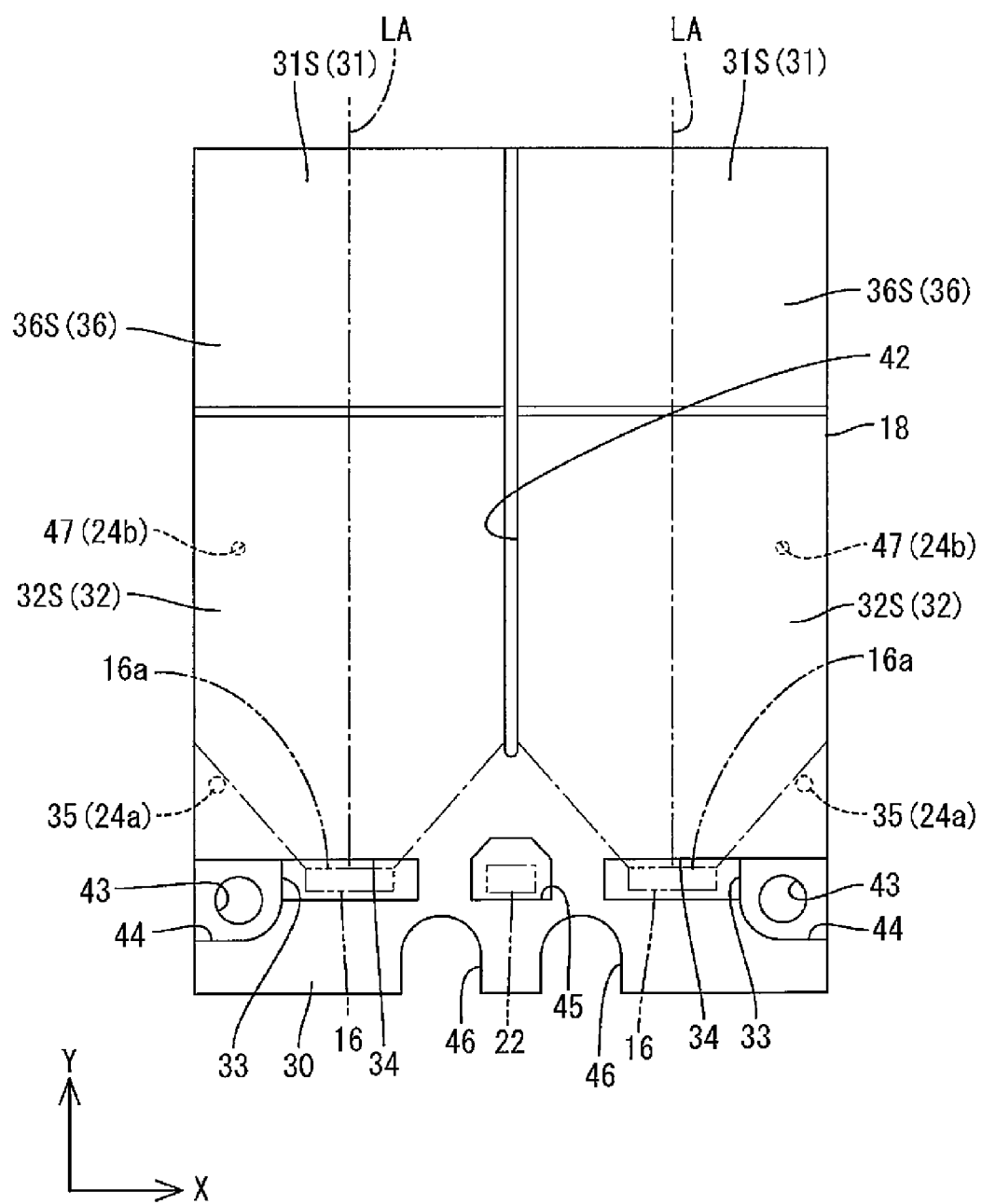
FIG. 12 is a plan view of the light guide plate.

The rear end of the slit 42 is slightly more to the front than the positioning pin 35 and more to the rear than a lighting area of each LED 16 (the area within an angular range with the light axis LA of the LED 16 as the center and indicated by alternate long and short dash lines in FIG. 12). With this configuration, the rays of light emitted from the LED 16 do not directly enter the adjacent divided light guide portion 32S that is not a target to be illuminated. The positioning pins 35 are symmetrically located on the outer end areas of the divided light guide portions 32S (the end portions away from the slit 42) more to the rear than the lighting areas of the respective LEDs 16. Therefore, the positioning pins 35 are less likely to be obstacles in optical paths. The slit 42 does not run to the board-mounting portion 30. Therefore, the divided light guide portions 32 connect to each other and continue into the board-mounting portion 30. This provides mechanical stability in mounting conditions. The light guide plate 18 includes two unit light guide plates 18a and 18b (corresponding to the divided light guide portion 32S and the divided light exit portion 31S). The unit light guide plates are optically independent from each other and provided each for each LED 16. The unit light guide plates are connected to each other together with the board-mounting portion 30. This simplifies mounting of the light guide plate 18 to the LED board 17. The reflection sheet 24 is placed over the slit 42 (see FIG. 13).

Clip insertion holes 43 are formed in the side-edge areas of the board-mounting portion 30 (in the areas more to the outsides than the LED holding space 33). The clip mounting holes 43 are through holes provided for mounting the light guide plate 18 to the LED board 17. The insertion holes 43 are arranged on the respective sides of the middle area in which two LED holding spaces 33 and the LEDs 16 housed are located. Namely, the LED holding spaces 33 and the LEDs 16 are all located between the insertion holes 43 with respect to the X-axis direction (a direction parallel to the light exit surface 36 and perpendicular to an arrangement direction in which the LEDs 16 and the light entrance surface 34 are arranged). The insertion holes 43 are in the same line along the front-to-rear direction.

Figure 6:
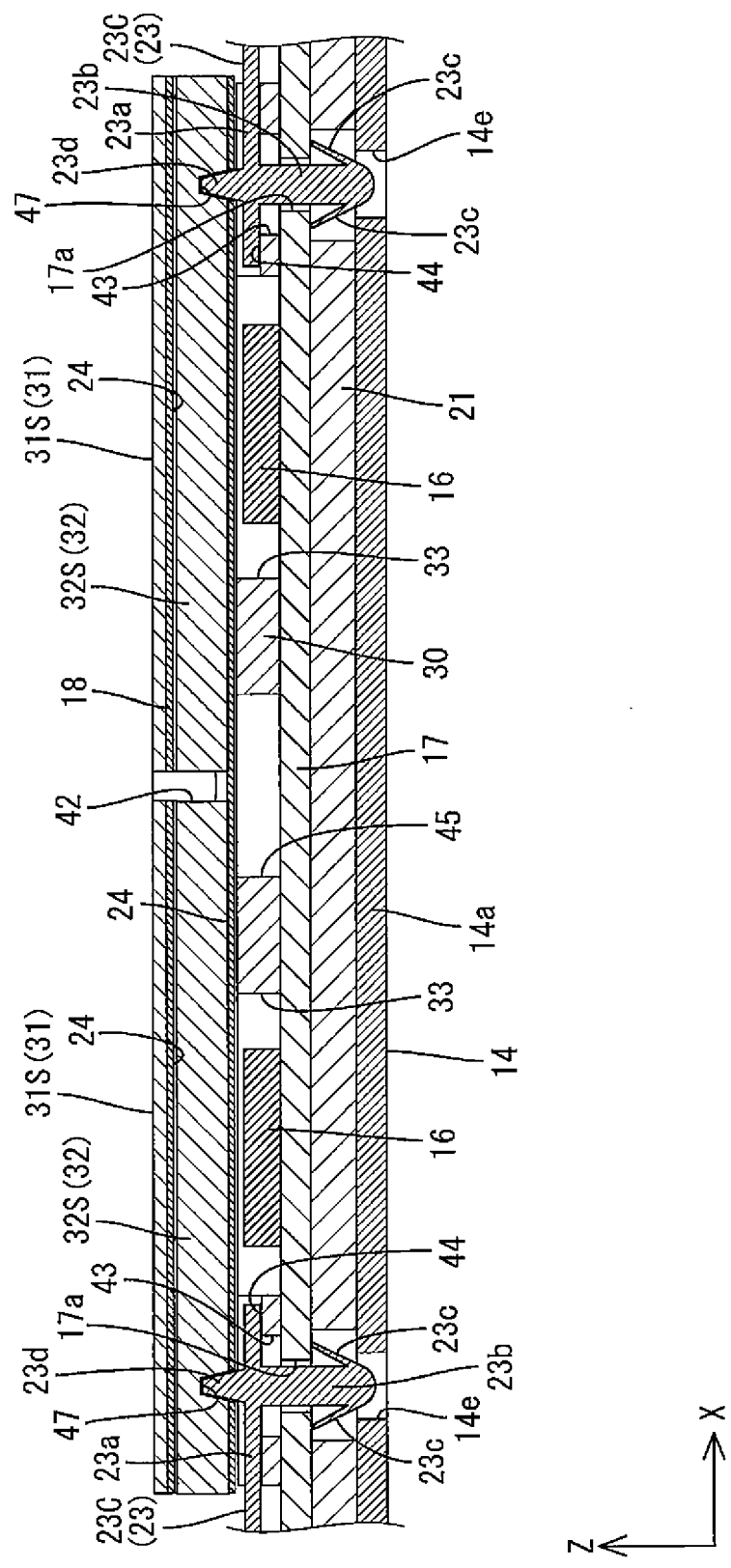
FIG. 6 is a magnified cross-sectional view of a light guide plate illustrated in FIG. 5.

Each clip 23 is made of resin (e.g., polycarbonate) in white that provides high light reflectivity. As illustrated in FIG. 6, each clip 23 includes a mounting plate 23a, an insertion portion 23b, and a pair of stoppers 23c. The mounting plate 23a is placed parallel to the mounting portion 30. The insertion portion 23b projects from the mounting plate 23a toward the LED board 17 along the thickness direction (the Z-axis direction) of the board-mounting portion 30. The stoppers 23c project from an end of the insertion portion 23b so as to turn back with respect to the insertion portion 23b. The insertion portions 23b of the clips 23 are inserted in respective insertion holes 43 of each board mounting portion and mounting holes 17a of each LED board 17. The stoppers 23C are held against the LED board 17 around the edges of the respective mounting holes 17 from the rear-surface side (the opposite side from the mounting plate 23a side). As a result, the light guide plate 18 is fixed to the LED board 17 and held in initial condition in which the light guide plate 18 is mounted. In the initial condition, the light guide plate 18 is fixed with two fixing points that are away from each other in the short-side direction (the X-axis direction). The insertion portions 23b of the clips 23 are inserted in the respective insertion holes 43 that are located at the two fixing points. Therefore, the light guide plate 18 does not rotate around the Z-axis (an axis perpendicular to the light exit surface 36) and is tightly fixed. Furthermore, each insertion portion 23b is seated substantially concentrically with the insertion hole 43 and the mounting hole 17a.

Figure 23:
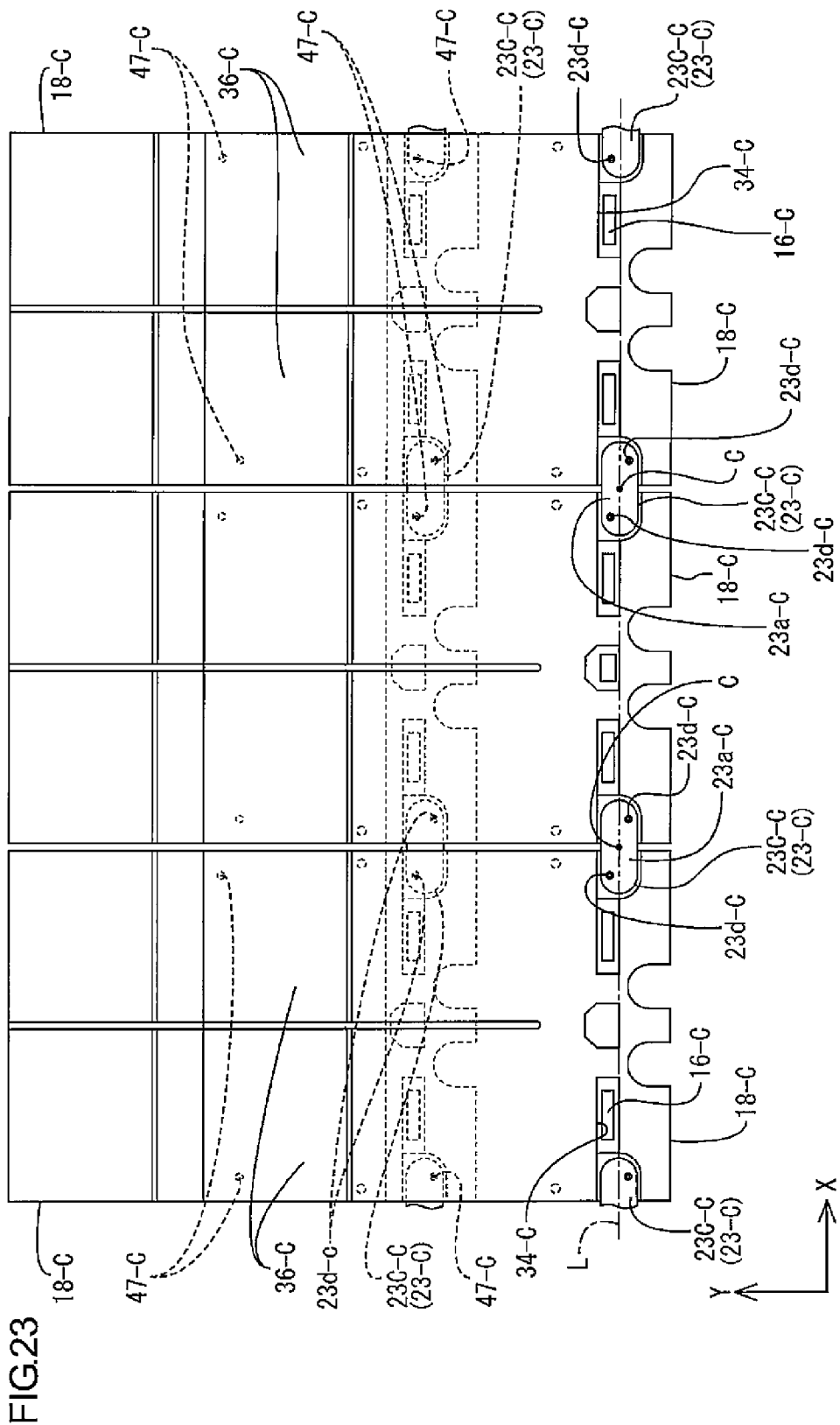
FIG. 23 is a plan view illustrating clips mounted to light guide plates according to the fourth embodiment of the present invention.

As illustrated in FIG. 23, the clips 23 include two different types of clips: single-type clips 23S (one on the right in FIG. 5) and combination-type clips 23C (one on the left in FIG. 5). Each single-type clip 23S has a single insertion portion 23b projecting from the mounting plate 23. Each combination-type clip 23C has two insertion portions 23b projecting from the mounting plate 23a. In the following description, the symbols 23S and 23C are used for referring to the single-type clips and the combination-type clips independently. To refer to the clips 23 as a whole, the numeral 23 without the letters is used.

Figure 11:
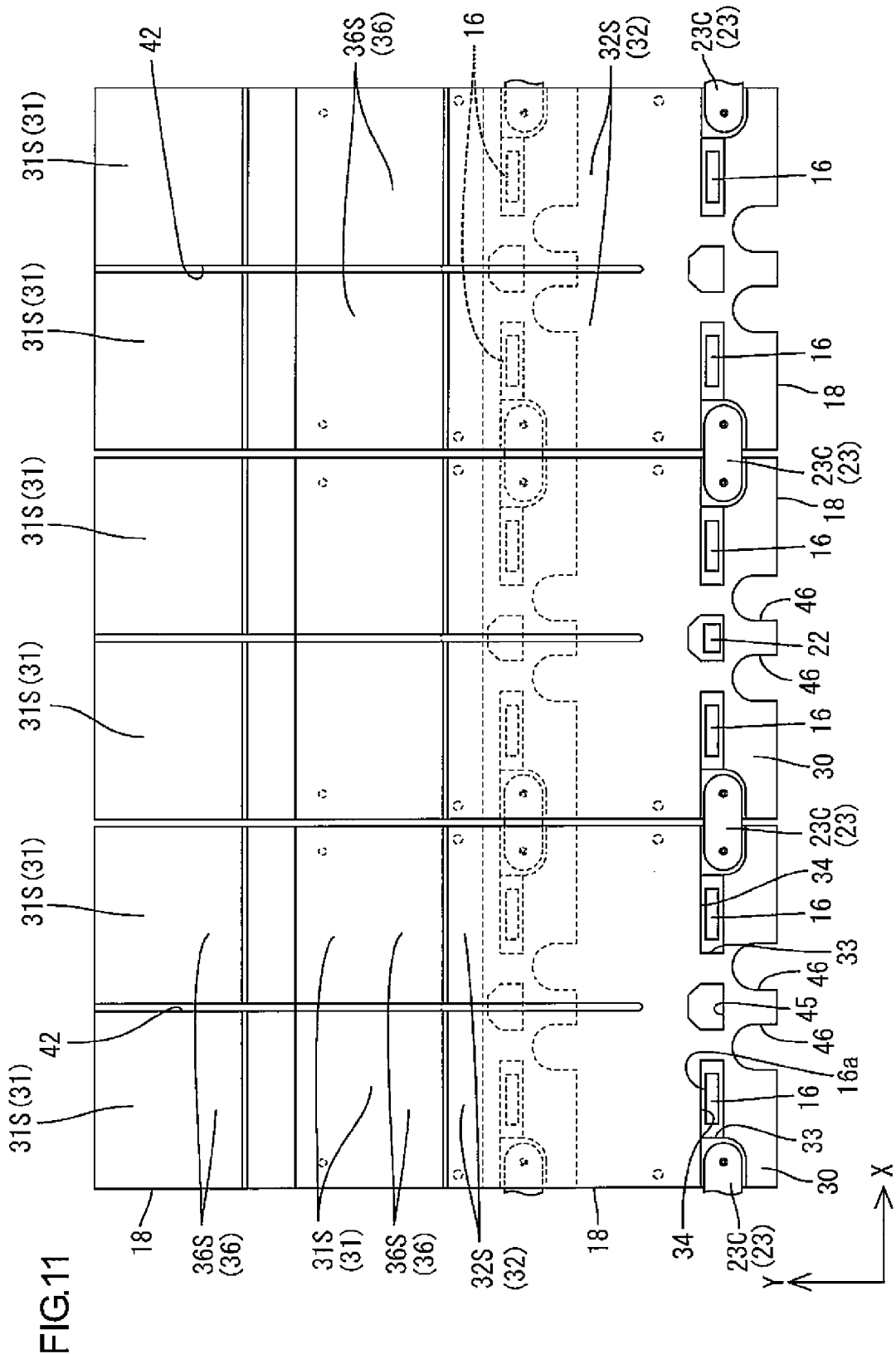
FIG. 11 is a plan view illustrating a layout of light guide plates.

As illustrated in FIG. 5, the single-type clips 23S are used only for the light guide plates 18 located near ends of an X-axis dimension of the chassis 14. Each single-type clip 23S is inserted in one of the insertion holes 43 of each light guide plate 18, that is, in the insertion hole 43 located closer to the side plate 14B of the chassis 14 (away from the light guide plate 18 arranged adjacently in the X-axis direction). The combination-type clips 23C are used for other light guide plates 18. Specifically, the combination-type clips 23C are arranged so as to connect the adjacent light guide plates 18 arranged parallel to each other in the X-axis direction. Two light guide plates 18 are fixed with a single combination-type clip 23C. As illustrated in FIG. 11, the mounting plate 23a of each combination-type clip 23C has an oval shape that is long in the X-axis direction. The long dimension of the mounting plate 23a of the combination-type clip 23C is larger than that of the mounting plate 23a of the single-type clip 23S, for instance, twice or more larger. Each combination-type clip 23C includes a pair of the insertion portions 23b projecting from the mounting plate 23a at symmetric locations away from the center in the long-side direction (the X-axis direction). The insertion portions 23b are inserted in the respective insertion holes 43 of the light guide plate 18 adjacently arranged in the X-axis direction. The respective insertion holes 43 are the adjacent insertion holes 43 of the adjacent light guide plates 18. The combination-type clip 23 exert the same function as two single-type clips connected together so as to fix the light guide plates 18 adjacently arranged in the X-axis direction at a time, instead of fixing them independently. Therefore, the number of the clips 23 and hours required for assembly can be reduced.

As illustrated in FIGS. 6 and 12, holding recesses 44 for holding the mounting plates 23 of the clips 23 are provided around the insertion holes 43 of each light guide plate 18. The depth of each holding recess 44 (measuring in the Z-axis direction) is substantially equal to or larger than the thickness of each mounting plate 23a. Therefore, the mounting plates 23a do not project from the surfaces of the board mounting portions 30. This configuration contributes to space and thickness reductions of the backlight unit 12 and the liquid crystal display device 10.

The flat surface 38 on the rear of each light guide plate 18 surrounds the rims of the insertion holes 43 (see FIG. 13). When the light guide plate 18 is fixed to the LED board 17 with the clips 23, the entire rims of the insertion holes 43 are in contact with the LED board 17. Therefore, the light guide plate 18 is stably fixed to the LED board 17. The flat surface 38 is formed in the entire area of each board-mounting portion 30 and a part of each light guide portion 32.

As illustrated in FIG. 12, each board-mounting portion 30 has a photo sensor holding space 45 between the LED holding spaces 33. The photo sensor holding space 45 is a through hole for holding the photo sensor 22 mounted on the LED board 17. The predetermined number of the photo sensors 22 are provided. They are irregularly arranged, that is, between specific LEDs on the LED boards 17. Namely, some photo sensor holding spaces 45 of the light guide plates 18 in the chassis 14 do not hold the photo sensors 22. Each board-mounting portion 30 has cutouts 46 in an area closer to the rear than the photo sensor holding spaces 33. The cutouts 46 are symmetrically located. Each cutout 46 runs completely through the board-mounting portion 30 and opens to the rear.

A screw (not shown) for fixing the LED board 17 to the chassis 14 is inserted in the cutout 46. Some of the cutouts are not used for light guide plates 18 in the chassis 14, as some photo sensor holding spaces 45 are not used.

As described earlier, a large number of the light guide plates 18 are arranged in a grid pattern and a plane layout. The layout of the light guide plates 18 will be explained in detail. First, the layout along the tandem-arrangement direction (the Y-axis direction) will be explained. As illustrated in FIG. 9, the light guide plates 18 are mounted such that the light guide portions 32 and the light exit portions 31 are away from the LED boards 17. The light guide portions 32 and the light exit portions 31 are arranged so as to cover about entire areas of the board mounting portions 30 and the light guide portions 32 of the adjacent light guide plates 18 on the front (the upper side in the vertical direction) from the front-surface side (the light-exiting side). Among the light guide plates 18 in the tandem arrangement, the one in the rear (the first light guide plate 18A) is located relatively on the front-surface side, that is, the light-exiting side (the diffuser 15b side). The one in front (the second light guide plate 18B) is located relatively on the rear-surface side, that is, the opposite side from the light-exiting side (the LED board 17 side). Among the light guide plates 18 adjacently arranged in the front-to-rear direction, the board-mounting portion 30 and the light guide portion 32 of the light guide plate 18 in front overlap the light guide portion 32 and the light exit portion 31 of the light guide plate 18 in the rear in plan view. The board mounting portion 30 and the light guide portion 32, which are the non-luminous portions of the light guide plate 18, are covered by the light guide portion 32 and the adjacent light exit portion 31 of the light guide plate 18 in the rear. Namely, the board mounting portion 30 and the light guide portion 32 are not bare on the diffuser 15b side, and only the light exit surface 36 of the light exit portion 31, which is the luminous portion, is bare on the diffuser 15b side. The light exit surfaces 36 of the light guide plates are continuously arranged without gaps in the tandem-arrangement direction. Furthermore, the reflection sheets 24 are arranged so as to cover about entire areas of the rear surface of the light guide portions 32 and the light exit portions 31. If rays of light are reflected by the light entrance surfaces 34 and light leaks therefrom, the leak light is less likely to enter the light guide plates 18 in the rear. The light guide portions 32 and the light exit portions 31 of the light guide plates 18 are physically supported by the respective light guide plates 18 in front (on the rear-surface side) from the rear-surface side. The sloped surface 40 of each light guide plate 18 and the sloped surface 39 of the corresponding light guide plate 18 on the rear-surface side slant at the same angle and thus they are parallel to each other. Therefore, gaps are less likely to be produced between the adjacent light guide plates 18 that overlap each other. Namely, the light guide plates 18 are securely supported by the light guide plates 18 on the rear-surface side. Only the front part of the light guide portion 32 of each light guide plate 18 covers the board-mounting portion 30 of the corresponding light guide plate 18 in front. The rear part of the light guide portion 32 faces the LED board 17.

The layout in a direction perpendicular to the tandem-arrangement direction (the X-axis direction) is illustrated in FIGS. 5 and 11. The light guide plates 18 do not overlap each other in the plan view. They are arranged parallel to each other with predetermined gaps therebetween. With the gaps, air layers are provided between the light guide plates 18 adjacent to each other in the X-axis direction. Therefore, the rays of light do not travel or mix between the light guide plates 18 adjacent to each other in the X-axis direction and thus the light guide plates 18 are optically independent from each other. The size of the gaps between the light guide plates 18 is equal to or smaller than that of the slit 42.

As illustrated in FIGS. 3 and 11, a large number of the light guide plates 18 are arranged in the planar layout inside the chassis 14. The light exit surface of the backlight unit 12 is formed with a number of the divided light exit portions 31S. As described above, the divided light guide portions 32s and the divided light exit portions 31S of the light guide plates 18 are optically independent from each other. Turning on and off of the LEDs 16 are controlled independently. The passing of light rays from the divided light exit portions 31S (or the divided light exit surfaces 36S) can be controlled independently. The driving of the backlight unit 12 can be controlled using an area active technology that provides control of outgoing light for each area. This significantly improves contrast that is very important for display performance of the liquid crystal display device 10.

As illustrated in FIG. 12, each LED 16 is arranged in the LED holding space 33 with entire peripheries thereof are separated from the inner walls of the LED holding space 33 (including the light entrance surface 34) by gaps in predetermined sizes. The gaps are provided for compensating for errors related to amounting position of the light guide plate 18 with respect to the LED board 17. The gaps are required for allowing thermal expansion of the light guide plate 18, which may occur due to heat generated during lighting of the LED 16. By providing the gaps between the LED 16 and the walls of the LED holding space 33, the light guide plate 18 is less likely to interfere with the LED 16 and thus the LED 16 is protected from being damaged.

As described earlier, the light guide plates 18 are in lines that are parallel to each other and each light contains multiple light guide plates 18 arranged in the tandem layout along the Y-axis direction. During mounting of the light guide plates 18, the following problem may occur. To mount the light guide plates 18, the light guide plate 18 on the rear-surface side (the first light guide plate 18A) is mounted to the LED board 17, and then another light guide plate 18 on the front-surface side (the second light guide plate 18B) is mounted to the LED board 17. During the mounting, the light guide plate 18 on the front-surface side and overlapping the other (the second light guide plates 18B) needs to be precisely positioned with respect to the light guide plate 18 that is mounted first (the first light guide plate 18A). Therefore, the mounting is not easy. If a displacement in relative positions occurs between the adjacent light guide plates 18 in the line in the X-axis direction or the Y-axis direction, a displacement also occurs in a relative position of the light guide surface 34 to the LEDs 16 in the X-axis direction or the Y-axis direction. As a result, the amount of incident light to the light entrance surface 34 or the amount of outgoing light from the light exit surface 36 may vary. This may result in variations in brightness from one light guide plate 18 to another. If the backlight unit 12 and the liquid crystal display device 10 are provided in large sizes, a large number of the light guide plates 18 are used. Therefore, the positional relationships between the light guide plates 18 cannot be easily equalized. As a result, the mounting of the light guide plates 18 tends to be more difficult.

Figure 14:
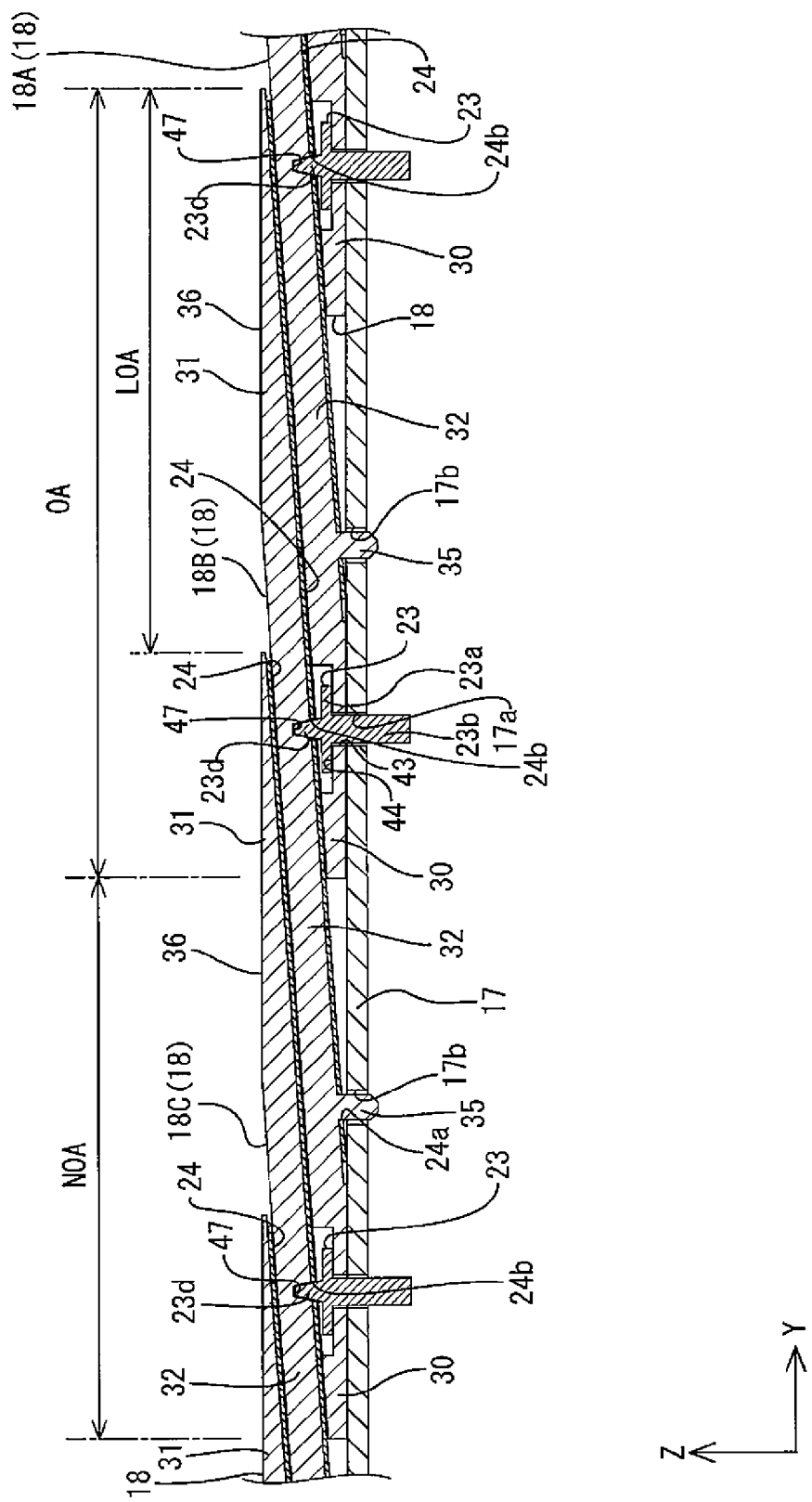
FIG. 14 is a cross-sectional view along the Y-Z plane illustrating locking structures of the light guide plates arranged in a line.
Figure 15:
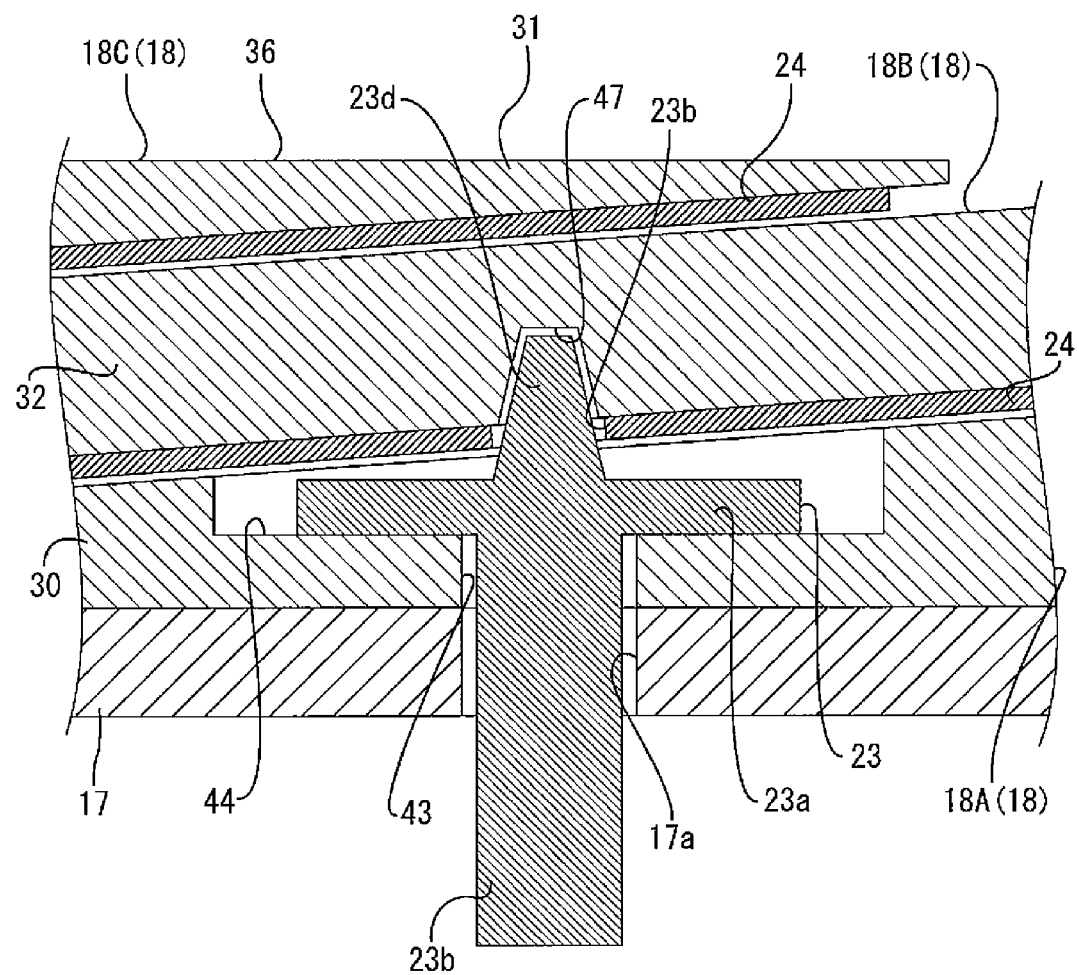
FIG. 15 is a magnified cross-sectional view along the Y-Z plane illustrating the locking structures in detail.
Figure 16:
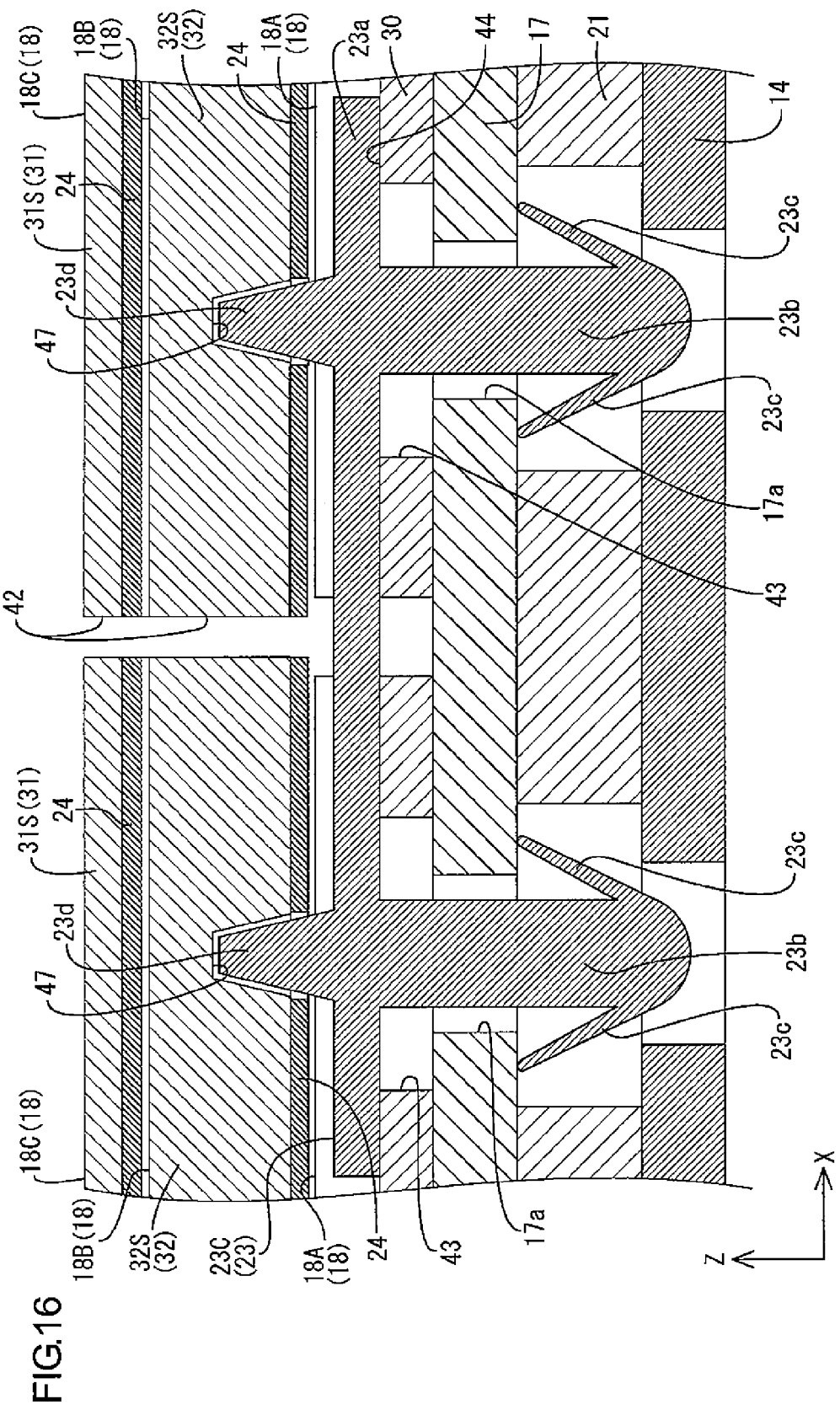
FIG. 16 is a magnified cross-sectional view along the X-Z plane illustrating the locking structures in detail.

To solve the above problem, this embodiment includes locking structures. As illustrated in FIG. 14, the adjacent light guide plates 18 arranged along the Y-axis direction (in the arrangement direction in which the LED 16 and the light entrance surface 34 are arranged) include the first light guide plate 18A and the second light guide plate 18B. The first light guide plate 18A is located on the front side and the rear-surface side (on the LED board 17 side, the opposite side from the light-exiting side). The second light guide plate 18B is located on the rear side and the front-surface side (on the opposite side from the LED board 17 side, the light-exiting side). The clip 23 for fixing the first light guide plate 18A and the second light guide plate 18 have the locking structures. The locking structures restrict relative movement of the second light guide plate 18B to the first light guide plate 18A in the X-axis direction and the Y-axis direction (i.e., the directions parallel to the light exit surface 36). In FIG. 14, the light guide plate 18 in a complete form is referred to as the second light guide plate 18B (the one in the middle in FIGS. 15 and 16) and the one in front and on the rear-surface side (the one at the bottom in FIGS. 15 and 16) is referred to as the first light guide plate 18A. Moreover, the light guide plate 18 in the rear and on the front-surface side with respect to the second light guide plate 18B (the one at the top in FIGS. 15 and 16) is referred to as the third light guide plate 18C. To refer to the light guide plates 18 as a whole, the numeral 18 without the letters is used The locking structures include the first locking parts 23d and the second locking parts 47. Each first locking part 23d is provided at the clip 23 that fixes the first light guide plate 18A. Each second locking part 47 is provided in the rear surface of the second light guide plate 18B, that is, in the surface that is opposite from the light exit surface 36 and faces the LED board 17. The first locking part 23d is fitted in the second locking part 27. The first locking part 23d is provided integrally with the clip 23. The first locking part 23d is a protrusion that projects from the mounting plate 23a on the front-surface side. Namely, the first locking part 23d is provided as a part of the clip 23. The first locking part 23d is made of white resin that is the same material used for the clip 23. The first locking part 23d efficiently reflects light that strikes the surface thereof. The first locking part 23d is provided on the surface of the mounting plate 23a on the front-surface side and substantially concentric with the insertion portion 23b on the rear-surface side. During mounting of the clip 23 to the light guide plate 18 and the LED board 17, the first locking part 23d that projects on the front-surface side can be held, that is, used as a holding part. Moreover, the first locking part 23d can be used as a marker for the insertion portion 23b that is concentric with the first locking part 23d. Therefore, the insertion portion 23b is easily inserted in the insertion hole 43 of the light guide plate 18 and the mounting hole 17a of the LED board 17. As illustrated in FIGS. 15 and 16, the first locking part 23d is formed in a truncated cone-like shape and projects on the front-surface side substantially straight in the Z-axis direction (the direction perpendicular to the light exit surface 36). Namely, the first locking part 23d has trapezoid cross-sections along the X-axis direction and the Y-axis direction. The first locking part 23d has a tapered columnar shape. The entire peripheral surface of the first locking part 23d is a sloped surface that is slanted in the X-axis direction. A direction in which the first locking part 23d is fitted in the second locking part 47 matches the Z-axis direction.

As illustrated in FIG. 5, each single-type clip 23S has one first locking part 23d around the center of the mounting plate 23a. Each combination-type clip 23C has a pair of the first locking parts 23d arranged on the mounting plate 23a symmetrically and away from the center in the longitudinal direction (the X-axis direction). The locations correspond to the insertion portions 23b. The locations of the first locking parts 23d of the combination-type clip 23C with respect to the Y-axis direction are set equal to each other and around the center of the mounting plate 23.

As illustrated in FIG. 14, each second locking part 47 is formed in the second light guide plate 18B. The second locking part 47 does not run all the way through the second light guide plate 18B to the front surface, that is, it is a recess that opens only in the rear surface of the second light guide plate 18B. The second locking part 47 is formed in a shape corresponding to an outer shape of the first locking part 23d and viewed as trapezoid void sections in cross-sectional views of the second light guide plate 18B along the X-axis direction and the Y-axis direction. Namely, the dimension of the second locking part 47 is relatively large on the opening side and small on the bottom side. The entire inner wall surface of the second locking part 47 is a sloped surface that forms an angle with the X-axis. The light guide portion 32 of each second light guide plate 18B has a pair of the second locking parts 47. The second locking part 47 is formed in a front-end area of the light guide portion 32 adjacent to the light exit portion 32, that is, farthest away from the fixing point with the clip 23. Namely, the second locking part 47 is formed close to the light exit portion 32 (or the light exit surface 36) in the Y-axis direction. Moreover, the second locking part 47 is formed in an area of the light guide portion 32 further more to the front than the positioning pin 35 located in the rear area of the light guide portion 32. The second locking part 47 is located slightly more to the front than the middle of the second light guide plate 18B in the longitudinal direction (the Y-axis direction). As illustrated in FIGS. 6 and 13, each one of the pair of the second locking parts 47 is located close to the corresponding end of the short side (lying in the X-axis direction) of the second light guide plate 18B and inner than the corresponding positioning pin 35.

As illustrated in FIG. 14, the front-end area of the light guide portion 32 in which the second locking parts 47 are formed is located in an overlapping area OA in which the second light guide plate 18B overlaps the first light guide plate 18A. Namely, the second locking part 47 is located in the overlapping area OA. Among the light guide plates 18 arrange in the tandem layout along the Y-axis direction, the second light guide plate 18B is arranged more to the rear than the first light guide plate 18A. The entire part of the board-mounting portion 30 that is fixed to the LED board 17 with the clip 23 and the rear part of the light guide portion 32 of the second light guide plate 18B are located in a non-overlapping area NOA. In the non-overlapping area NOA, the second light guide plate 18B does not overlap the first light guide plate 18A on the front side in plan view (i.e., does not overlap in the Z-axis direction (the direction perpendicular to the light exit surface 36)). The front part of the light guide portion 32 and the entire part of the light exit portion 31 of the second light guide plate 18B are located in the overlapping area OA. In the overlapping area OA, the second light guide plate 18B overlaps the first light guide plate 18A on the front side in plan view (i.e., overlaps in the Z-axis direction (the direction perpendicular to the light exit surface 36)). In FIG. 14, the overlapping area OA and the non-overlapping area NOA of the second light guide plate 18B, which is in a complete form, are shown as a reference. The light exit portion 31 is indicated with LOA in FIGS. 13 and 14.

As illustrated in FIGS. 15 and 16, the second locking parts 47 have the following positional relationships with the third light guide plate 18C arranged more to the rear than the second light guide plate 18B and on the front-surface side. The front part of the light guide portion 32 and the entire part of the light exit portion 31 of the third light guide plate 18C overlap the entire parts of the board-mounting portion 30 and the light guide portion 32 in plan view. The front-end part of the light exit portion 31 of the third light guide plate 18C overlaps the second locking parts 47 in plan view. Therefore, the second locking parts 47 and the first locking parts 23d fitted therein are covered with the third light guide plate 18C and the reflection sheet attached thereto from the front-surface side. The first locking parts 23d and the second locking parts 47 are behind the third light guide plate 18C and the reflection sheet 24 and are not directly viewed from the front-surface side.

The reflection sheet 24 attached to the second light guide plate 18B has insertion holes 24b in locations corresponding to the first locking parts 23d. The first locking parts 23d that are protrusions are inserted in the insertion holes 24b, respectively. Each first locking part 23d of each clip 23 is inserted in the corresponding second locking part 47. The surface of the reflection sheet 24 is provided in white to reflect light and the second light guide plate 18B is transparent. Therefore, the insertion hole 24b can be easily recognized from the front-surface side through the second light guide plate 18B. During attachment of the second light guide plate 18B to the first light guide plate 18A, the insertion hole 24b can be used as a marker for the first locking part 23d.

As illustrated in FIG. 14, all light guide plates 18 arranged in lines along the Y-axis direction and arranged parallel to each other have the second locking parts 47. All clips 23 that fix the light guide plates 18 have the first locking parts 23d. All light guide plates 18 arranged in the tandem layout have the same structure. The single-type clips 23S and the combination-type clips 23C that fix the light guide plates have the same structures, respectively. In the second locking parts 47 of one of the light guide plates 18 in the tandem layout, the first locking portions 23d of the clip 23 that fixes the light guide plate 18 in front are fitted. As a result, the light guide plate 18 is positioned with respect to the light guide plate 18 in front with respective to the X-axis direction and the Y-axis direction. The first locking parts 23d of the clip 23 that fixes the light guide plate 18 in front are fitted in the second locking portions 47 of the adjacent light guide plate 18 in the rear. As a result, the adjacent light guide plate 18 in the rear is also positioned with respect to the light guide plate 18 in front. Namely, each light guide plate 18 functions as the first light guide plate 18A, the second light guide plate 18B or the third light guide plate 18C. With the configuration in which the first locking parts 23d ore the clips 23 are fitted in the second locking parts 47 of the respective light guide plates 18, the relative positions of the light guide plates 18 in the tandem layout with respect to the direction parallel to the light exit surfaces 36 remain constant.

In this embodiment, the locking structures include the first locking structure and the second locking structure that are a different structure from the first structure. As illustrated in FIG. 14, the second locking structure includes the positioning pins 35 of the light guide plates 18 and the positioning holes 17b of the LED board 17. The positioning pins 35 are fitted in the positioning pins 35. For the second light guide plate 18B, the positioning pins 35 and the positioning holes 17b are provided in the locations furthermore to the rear than the respective first locking parts 23d and the respective second locking parts 47. An insertion direction of the positioning pins 35 into the positioning holes 17 matches the Z-axis direction and the insertion direction of the first locking parts 23d are inserted into the second locking parts 47. In FIGS. 14 to 17, the optical member 15 and the liquid crystal panel 11 are not illustrated. Furthermore, the chassis 14 and the heat sinks 21 are not illustrated in FIGS. 14, 15 and 17.

Each light guide plate 18 having the above structure is prepared by molding with a die and the reflection sheet 24 is attached to the rear surface thereof. The holes 24 of the reflection sheet 24 are aligned to the positioning pins 35 of the light guide plate 18 and the positioning pins 35 are inserted in the holes 24a. As a result, the reflection sheet 24 is precisely positioned with respect to the light guide plate 18 along the X-axis direction and the Y-axis direction (see FIGS. 10 and 13). The light guide plate 18 and the light reflection sheet 24 are bonded together with adhesives in the condition that they are properly positioned to each other.

The light guide plates 18 with the reflection sheets 24 are mounted to the LED boards on which the LEDs 16 are surface-mounted during the assembly of the backlight unit 12. After the LED boards 17 are mounted on the bottom plate 14a of the chassis 14 in predetermined locations (see FIG. 3), the light guide plates 18 are mounted in locations corresponding to the respective LEDs 16 on the respective LED boards 17. One of the light guide plate 18 is mounted in a location corresponding to the LEDs 16 located at the uppermost part (corresponding to the front end) of the bottom plate 14a of the chassis 14 in the vertical direction (the tandem-layout direction, the Y-axis direction). Other light guide plates 18 are mounted in sequence from the top to the bottom (corresponding to the rear end) along the vertical direction so as to correspond to the LEDs 16 (see FIGS. 7 to 9). The light guide plates 18 mounted second or later overlap the adjacent light guide plates 18 on the upper side (corresponding to the front side) from the front-surface side. The light guide plates 18 are layered and arranged in the tandem layout along the vertical direction.

Figure 17:
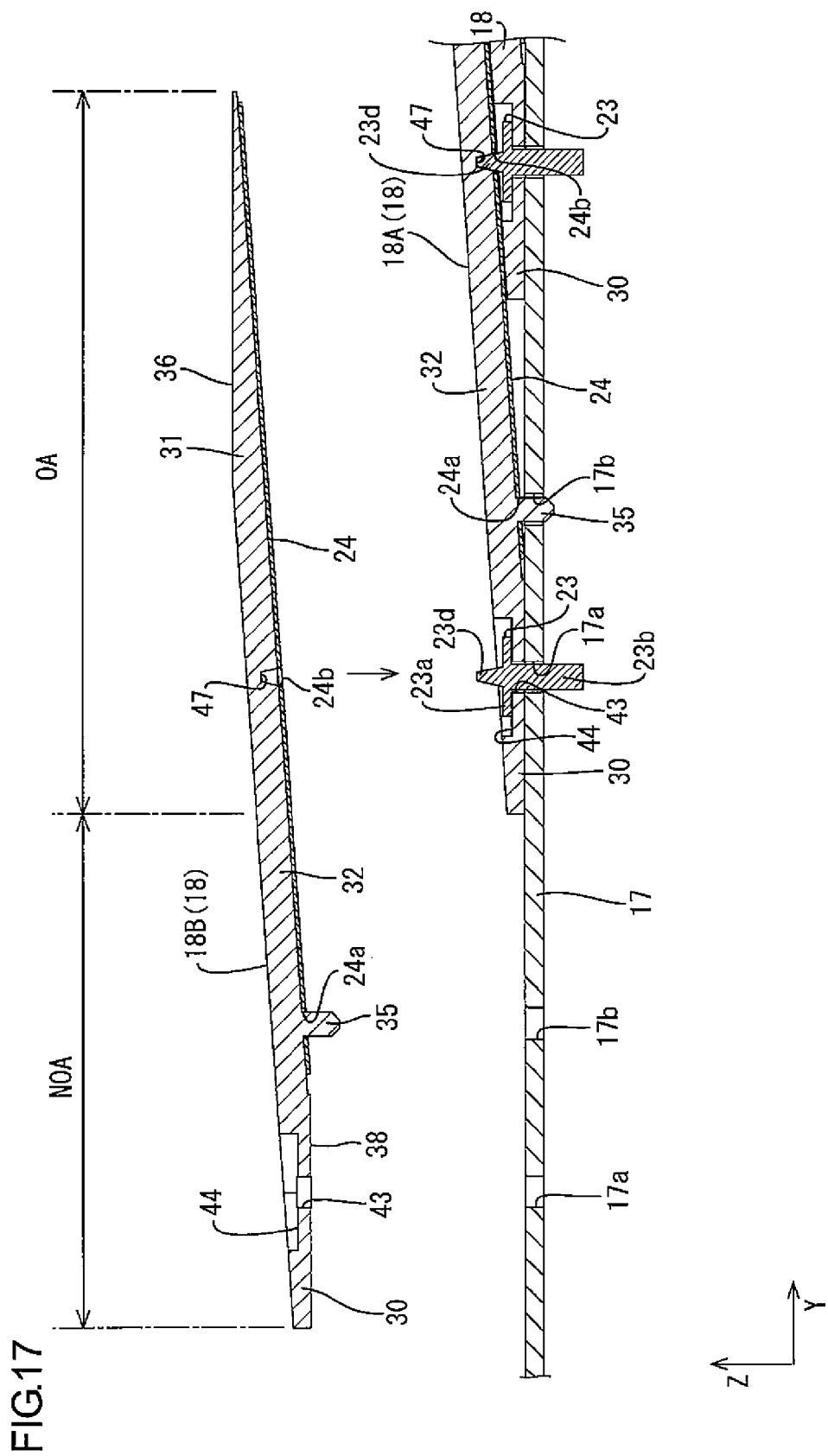
FIG. 17 is a cross-sectional view along the Y-Z plane illustrating the first guide plate mounted on an LED board and the second light guide plate before mounting.

How to mount the light guide plates 18 will be explained in detail. The light guide plate 18 mounted first is positioned by fitting the positioning pins 35 in the positioning holes 17b of the LED board 17, which restricts the relative movement of the light guide plate 18 to the LED board in the X-axis direction and the Y-axis direction. In this condition, the insertion holed 43 of the light guide plate 18 are aligned to the mounting holes 17a of the LED board 17. The insertion pins 23b of the clips 23 are inserted to the holes from the front-surface side such that the stoppers 23c are held against the rims of the mounting holes 17a of the LED board 17. As illustrated in FIG. 17, the light guide plate 18 mounted first is fixed to the LED board 17 and held in that initial condition. When mounting the clips 23, an assembly worker can hold the first locking part 23d that project from the mounting plate 23a on the front-surface side, that is, use it as a holding part. The insertion portions 23b of the clips 23 on the rear-surface side are concentric with the respective first locking parts 23d. Therefore, the first locking parts 23d that can be viewed from the front-surface side can be used as makers that indicate locations of the respective insertion portions 23b. As a result, the insertion portions 23 are easily inserted into the respective insertion holes 43 and the respective mounting holes 17a. During the mounting of each light guide plate 18, the LEDs 16 are inserted in the respective LED holding spaces 33. Because of the positioning pins 35 and the positioning holes 17b (the second locking structure), a positional relationship between the light exit surface 16a of each LED 16 and the light entrance surface 34 with respect to the X-axis direction and the Y-axis direction remains constant.

The other light guide plates 18 are mounted as follows. As illustrated in FIG. 17, the second light guide plate 18B is moved in the direction indicated with an arrow toward the first light guide plate 18A that is mounted to the LED board 17 previously. The second light guide plate 18B is positioned such that the overlapping area OA thereof is placed over the first light guide plate 18A from the front-surface side. The first locking parts 23d that are protrusions for fixing the first light guide plate 18A are fitted in the respective second locking parts 47 that are recesses formed in the second light guide plate 18B. The reflection sheet 24 attached to the second light guide plate 18B has the insertion holes 24b corresponding to the second locking parts 47. The insertion holes 24b are visible from the front-surface side through the second light guide plate 18. Therefore, the insertion holes 24a and the second locking parts 47 are easily positioned to the first locking parts 23d of the clips 23 that are behind the second light guide plate 18B and the reflection sheet 24. Furthermore, each first locking part 23d fixed to the LED board 17 is a protrusion and thus easily positioned with respect to the corresponding second locking part 47 that is a recess. In such a manner, the first locking parts 23d are fitted in the second locking parts 47 and the positioning pins 35 of the second light guide plate 18B are fitted in the positioning holes 17b of the LED board 17. The insertion direction of the first locking parts 23d into the second locking parts 47 and the insertion direction of the positioning pins 35 into the positioning holes 17b match the Z-axis direction and thus they match each other. The second light guide plate 18B can be attached to the first light guide plate 18A only by moving the second light guide plate 18B in the Z-axis direction, that is, it is easily attached. When the second light guide plate 18B is attached to the first light guide plate 18A in such a manner, the insertion holes 43 of the second light guide plate 18B are aligned to the respective mounting holes 17 of the LED board 17. The insertion portions 23b of the clips 23 are inserted in the respective holes and the second light guide plate 18B is fixed. The clips 23 are mounted in the same manner as those mounted to the light guide plate 18 mounted first. Other light guide plates 18 are mounted in sequence in the same manner and they are arranged in lines along the Y-axis direction as illustrated in FIG. 14.

The second light guide plate 18B does not move in the X-axis direction and the Y-axis direction with respect to the first light guide plate 18A because of two locking structures. The second light guide plate 18B is positioned with respect to the first light guide plate 18A. The relative position of the light entrance surface 34 of the second light guide plate 18B to the light-emitting surface 16a of the LED 16 remains constant. The positional relationship between the light entrance surface 34 of the second light guide plate 18B and the light-emitting surface 16a of the LED 16 is similar to the positional relationship between the light entrance surface 34 of the first light guide plate 18A and the light-emitting surface 16a of the LED 16. Namely, mounting conditions of the light guide plates 18 arranged in the Y-axis direction with respect to the LED board 17 are equalized. The amount of incident light from each LED 16 to the light entrance surface 34 of corresponding light guide plate 18 and the exit efficiency of light from the light exit surface 36 are substantially constant from one LED 16 to another. Therefore, the brightness of each light guide plate 18 does not differ from one light guide plate 18 to another. As a result, uneven brightness is less likely to occur in the backlight unit 12 and the liquid crystal display device 10.

After the light guide plates 18 are mounted to the LED boards 17, the rest of assembly work is performed, and the backlight unit 12 and the liquid crystal display device 10 are prepared (see FIGS. 4 to 9). When the liquid crystal display device 10 is turned on and the LEDs 16 are lit, rays of light emitted from each LED 16 through the light-emitting surface 16a enter the corresponding light entrance surface 34. The rays of light travel through the light guide plate 18 from the light entrance surface 34 to the light exit portion 31. While the rays of light travel through the light guide portion 32, they are totally reflected by the interface with the external air layer. Therefore, the rays of light do not leak to the outside during traveling through the light guide portion 32. While traveling through the light guide portion 32, the RGB rays of light from the respective LED chips 16c of the LED 16 are mixed into white light and the white light is sufficiently diffused in the X-axis direction and the Y-axis direction. Rays of light reach the light exit portion 31 are scattered by the scattering surface 37 provided on the opposite side from the light exit surface 36. Moreover, the rays are reflected by the reflection sheet 24 provided on the rear-surface side with respect to the scattering surface 37 and guided to the light exit surface 36. The rays scattered by the scattering surface 37 and reflected by the reflection sheet 24 include rays that strike the light exit surface 36 at angles smaller than the critical angle. Those rays exit the light guide plate 18 through the light exit surface 36. Rays of light that strike the light exit surface 36 at angles larger than the critical angle are totally reflected by the light exit surface 36 and scattered by the scattering surface 37. The reflection and the scattering repeatedly occur and the rays finally exit from the light exit surface 36. While traveling through the diffusers 15a and 15b and the optical sheet 15c, the rays that exit the light guide plates 18 are evenly dispersed in the entire area of the light exit surfaces 36 of the backlight unit 12. As a result, the liquid crystal panel 11 is illuminated with substantially planar light.

As illustrated in FIGS. 15 and 16, each reflection sheet 24 attached to the corresponding light guide plate 18 has the insertion holes 24b through which the respective first locking parts 23d are inserted. Therefore, light that travel through the light guide plate 19 may leak to the rear-surface side through the insertion holes 24b. In this embodiment, the first locking part 23d that is fitted in the insertion hole 24b and the mounting plate 23a of each clip 23 that is mounted on the rear-surface side with respect to the insertion hole 24b are made of white resin that provides high light reflectivity and integrally provided. The rays of light traveling through the light guide plate 18 toward the insertion hole 24b reflect off the surfaces of the first locking part 13d and the mounting plate 23a (of the clip 23) and travel back toward the inner side of the light guide plate 18. Therefore, the rays of light inside the light guide plate 19 are less likely to leak. As a result, the light use efficiency and the brightness of the light guide plates 18 are less likely to decrease.

The second locking parts 47 of each light guide plate 18 could be optical obstacles for the rays that travel inside the light guide plate 18. However, the second locking parts 47 are provided in the light guide portion 32 of each light guide plate 18, that is, outside the light exit portion 31 having the light exit surface 36 with respect to the Y-axis direction. When the light exit surface 36 is viewed from the front-surface side, the second locking parts 47 and the first locking parts 23d fitted therein are not directly viewed. Furthermore, the second locking parts 47 are provided in the areas close to ends of the short dimension of each light guide plate 18. The short dimension measures in the X-axis direction. The second locking parts 47 are provided in locations that are less likely to be viewed in comparison to the middle area of the light guide plates 18. Therefore, the second locking parts 47 are further less likely to be viewed. The reflection sheet 24 attached to the third light guide plate 18C is arranged on the front-surface side with respect to the first locking parts 23d and the second locking parts 47. Namely, the first locking parts 23d and the second locking parts 47 are covered with the reflection sheet 24 so as not to be directly viewed from the front-surface side. Therefore, the first locking parts 23d and the second locking parts 47 are further less likely to be viewed. With the above configuration, the light guide plates 18 are less likely to have optical abnormalities due to the locking structures.

As described above, the backlight unit 12 of this embodiment includes the LEDs 16, the light guide plates 18, the LED boards 17, the clips 23 and the locking structures. Each light guide plate 18 has the light entrance surface 34 and the light exit surface 36. The light entrance surface 34 faces the corresponding LED 16 such that light from the LED 16 enters the light entrance surface 34. The light exit surfaces 36 are arranged along the arrangement direction in which the LEDs 16 and the light entrance surfaces 34 are arranged (the Y-axis direction). Rays of light exit through the light exit surfaces 36. A plurality of the light guide plates 18 are arranged along the arrangement direction. The light guide plates 18 overlap each other in the direction that crosses the respective light exit surfaces 36. The LEDs 16 and the light guide plates 18 are mounted to the LED boards 17. The clips 23 fix the light guide plates 18 to the respective LED boards 17 so as to hold them in the initial conditions. The overlapping light guide plates 18 include the first light guide plate 18A and the second light guide plate 18B. The first light guide plate 18A is arranged on the LED board 17 side and the second light guide plate 18B is arranged on the opposite side from the LED board 17 side. The clips 23 fix the first light guide plate 18A and the second light guide plate 18B together. The clips 23 that fix the first light guide plate 18A and the second light guide plate 18 have the locking structures. The locking structures restrict the relative movement of the second light guide plate 18B along the light exit surface 36.

During the mounting of the light guide plates 18 to each LED board 17, the first light guide plate 18A is first mounted to the LED board 17 and fixed with the clips 23. Then, the second light guide plate 18B is mounted to the LED board 17. The second light guide plate 18B overlaps the first light guide plate 18A from the opposite side from the LED board 17 side. With the locking structures, the relative movement of the second light guide plate 18B to the clips 23 that fixes the first light guide plate 18A along the light exit surface 36 is restricted. This configuration makes the assembly work easier and restricts the relative movement of the second light guide plate 18B to the first light guide plate 18A. Therefore, the positional relationships between the light guide plates 18 remain constant. The positional relationships between the LEDs 16 and the light entrance surfaces 34 are equalized. Moreover, the amounts of incident light rays to the light entrance surfaces 34 and the amounts of outgoing light rays from the light exit surfaces 36 are also equalized among the light guide plates 18. As a result, the brightness is less likely to differ from one light guide plate 18 to another. If the backlight unit 12 is provided in a large size, a large number of the light guide plates 18 are required. The above configuration is especially suitable for such a backlight unit 12. The above configuration makes the assembly work easier and reduces the uneven brightness.

The locking structures include the first locking parts 23d and the second locking parts 47. The first locking parts 23d are included in the respective clips 23 that fix the first light guide plate 18A. The second locking parts 47 are included in the second light guide plate 18B on the opposite side from the light exit surface 36. The first locking parts 23d are fitted in the respective second locking parts 47. By fitting the first locking parts 23d included in the clips 23 that fix the first light guide plate 18A in the second locking parts 47 provided in the second light guide plate 18B on the opposite side from the light guide surface 36 side, they are positioned to each other. The first locking parts 23d of the locking structures are included in the clips that fix the first light guide plate 18A and not in the first light guide plate 18A. Therefore, optical influences of the locking structures on the light guide plates 18 can be reduced, and uneven brightness or low brightness is less likely to occur.

The reflection sheet 24 is attached to the opposite surface of the second light guide plate 18B from the light exit surface 36. The reflection sheet 24 reflects light toward the light exit surface 36. The reflection sheet 24 has the insertion holes 24b through which the first locking parts 23d or the second locking parts 47, whichever are protrusions, are inserted. The insertion holes 24b can be viewed through the second light guide plate 18B from the opposite side from the LED board 17 side. Therefore, the insertion holes 24b can be used as markers for the first locking parts 23d of the clips 23. This makes the assembly work further easier.

The first locking parts 23d have white surfaces. Light may leak through the insertion holes 24b of the reflection sheet 24. With the first locking parts 23d that face the insertion holes 24b and have the white surfaces that provide high light reflectivity, light is less likely to leak. Therefore, the brightness of the second light guide plate 18B remains high.

Each light guide plate 18 includes the light exit portion 31 having the light exit surface 36 and the light guide portion 32 that guides light from the light entrance surface to the light exit portion 31. The second locking parts 47 are provided in the light guide portion 32 of the second light guide plate 18B. In comparison to a light guide plate having the second locking parts in the light guide portion 31, optical influences of the second locking parts 47 provided in the second light guide plate 18B on the light exit surface 36 can be reduced. Therefore, uneven brightness or low brightness is less likely to occur on the light exit surface 36.

The second locking parts 47 are provided in the overlapping are OA in which the second light guide plate 18B overlaps the first light guide plate 18A. In comparison to a light guide plate having the second locking parts in the non-overlapping area NOA in which the second light guide plate 18B does not overlap the first light guide plate 18A, the first locking parts 23d and the second locking parts 47 are collectively arranged along the arrangement direction in which the LED 16 and the light entrance surface 34 are arranged. This contributes to a space reduction and provides a high positioning accuracy.

The overlapping light guide plates 18 further include the third light guide plate 18C arranged on the opposite side from the LED board 17 side with respect to the second light guide plate 18B. The reflection sheet 24 is attached to the opposite surface of the third light guide plate 18C from the light exit surface 36. The reflection sheet 24 reflects light toward the light exit surface 36. The overlapping portions of the third light guide plate 18C and the reflection sheet 24 with the second light guide plate 18B are arranged so as to overlap the first locking parts 23d and the second locking parts 47 in the direction that crosses the light exit surface 36. The first locking parts 23d and the second locking parts 47 are covered by the reflection sheet 24 of the third light guide plate 18C that overlaps the second light guide plate 18B from the opposite side from the LED board 17. Therefore, the first locking parts 23D and the second locking parts 47 are less likely to be viewed from the opposite side from the LED board 17. This further contributes to reduction of the uneven brightness.

The first locking parts 23d are protrusions and the second locking parts 47 are recesses. During the attachment of the second light guide plate 18B to the first light guide plate 18A, the first locking parts 23d are easily positioned with respect to the respective second locking parts 47 because they are provided as protrusions and corresponding recesses. Therefore, the attachment is easily performed.

The first locking parts 23d are provided integrally with the clips 23. In comparison to the first locking parts provided separately from the clips 23, high positioning accuracies can be achieved and the mounting is easier.

Each of the light guide plated 18 arranged in the above-described arrangement direction has the second locking parts 47, and each of the clips 23 that fix the light guide plates 18 has the first locking parts 23d. Therefore, the first light guide plate 18A and the second light guide plate 18B are provided in the same configuration. Moreover, the clips 23 that fix the first light guide plate 18A and the clips that fix the second light guide plate 18B are provided in the same configuration. Namely, the common parts can be used, which contributes to a cost reduction. Moreover, the light guide plates 18 can be easily arranged. This configuration is preferable for a large-size backlight unit.

A plurality of the light guide plates 18 are arranged parallel to the light exit surfaces 36 and to each other in the direction that crosses the above-described arrangement direction (the X-axis direction). With this configuration, the backlight unit 12 in which the light guide plates 18 and the light exit surfaces 36 thereof are two-dimensionally arranged in a parallel layout is less likely to produce uneven brightness.

A pair of the clips 23 are provided for each light guide plate 18. The clips 23 are mounted to the light guide plate 18 parallel to the light exit surface 36 and at the locations close to the ends of the dimension that crosses the above-described arrangement direction. If two single-type clips are mounted to the light guide plates 18 arranged adjacently to each other in the direction that crosses the above-described arrangement direction so as to be parallel to the light exit surface 36 and integrated with each other, the integrated clip is equal to the combination-type clip 23C. With this configuration, the number of the parts and the assembly steps can be reduced. This configuration makes the assembly work easier and contributes to a cost reduction.

The second light guide plate 18B has the second locking parts 47 parallel to the light exit surface 36 and at the locations close to the ends of the dimension that crosses the above-described arrangement direction. With this configuration, the optical influences of the second locking parts 47 can be reduced. Therefore, the uneven brightness or the low brightness is preferably reduced.

A pair of the clips 23 having the first locking parts 23d is provided for the first light guide plate 18A. The clips 23 are arranged parallel to the light exit surface 36 of the first light guide plate 18A and at the locations close to the ends of the dimension that crosses the above-described arrangement direction. A pair of the second locking parts 47 is provided in the second light guide plate 18B. The second locking parts 47 are formed parallel to the light exit surface 36 and at the locations close to the ends of the dimension that crosses the above-described arrangement direction. With the first locking parts 23d provided in a pair and the second locking parts 47 provided in a pair, the second light guide plate 18B is positioned with a high accuracy.

The above locking structures are the first locking structures (the first locking parts 23d and the second locking parts 47). The LED boards 17 and the light guide plates 18 have the positioning holes 17b and the positioning pins 35, respectively. The positioning holes 17b and the positioning pins 35 are the second locking structures for restricting the relative movement of the light guide plates 18 to the light exit surfaces 36. The first locking structures and the second locking structures are arranged away from each other in the above-de-scribed arrangement direction. With this configuration, the second light guide plate 18B is positioned with respect to the clips 23 that fix the first light guide plate 18A and the LED board 17 with the first locking structures and the second locking structures that are away from each other in the arrangement direction. As a result, the positioning accuracy improves and the uneven brightness is further less likely to occur.

The first locking structures and the second locking structures are fitted, respectively, in the direction substantially perpendicular to the light exit surfaces 36. Therefore, the second light guide plate 18B is easily mounted.

Each clip 23 includes the mounting plate 23a, the insertion portion 23b and the stoppers 23c. The mounting plate 23a is provided on the opposite side of the corresponding light guide plate 18 from the LED board 17 side. The insertion portion 23b projects from the mounting plate 23a on the LED board 17 side. The insertion portion 23b is inserted in the insertion hole 43 of the light guide plate 18 and the mounting hole 17a of the LED board 17. The stoppers 23c are provided at the insertion portion 23b and held against the LED board 17 on the opposite side from the mounting plate 23a side. The insertion portion 23b of the clip 23 is passed through the light guide plate 18 and the LED board 17, and the light guide plate 18 and the LED board 17 are sandwiched between the mounting board 23a and the stoppers 23c and fixed. Therefore, the light guide plate 18 and the LED board 17 are stably fixed.

The first light guide plate 18A has holding recesses 44 for holding the mounting plate 23a. The mounting plate 23a is held in the holding recesses 44. This configuration contributes to reducing the thickness of the backlight unit 12.

Each mounting plate 23a has the first locking part 23d substantially concentric with the insertion portion 23b. During the mounting of the clip 23 to the light guide plate 18 and the LED board 17, the first locking part 23d can be used as a marker for the insertion portion 23b. Therefore, the insertion portion 23b can be easily inserted in the insertion hole 43 and the mounting hole 17a.

Each clip 23 having the first locking part 23d is made of white resin. Therefore, light is preferably reflected at the surface of the clip 23 and thus the light use efficiency improves. If white paint is applied to the surface of the clip, the paint may come off. However, such a problem does not occur in this embodiment.

The LEDs 16 are used as light sources. Therefore, high brightness can be achieved.

Second Embodiment

Next, the second embodiment of the present invention will be explained with reference to FIGS. 18 to 20. In this embodiment, each first locking part 23d-A and each second locking part 47-A have engaging structures. The similar portions as the first embodiment will be indicated with the same symbols followed by -A. The same configurations, functions and effects as the first embodiment will not be explained.

Figure 18:
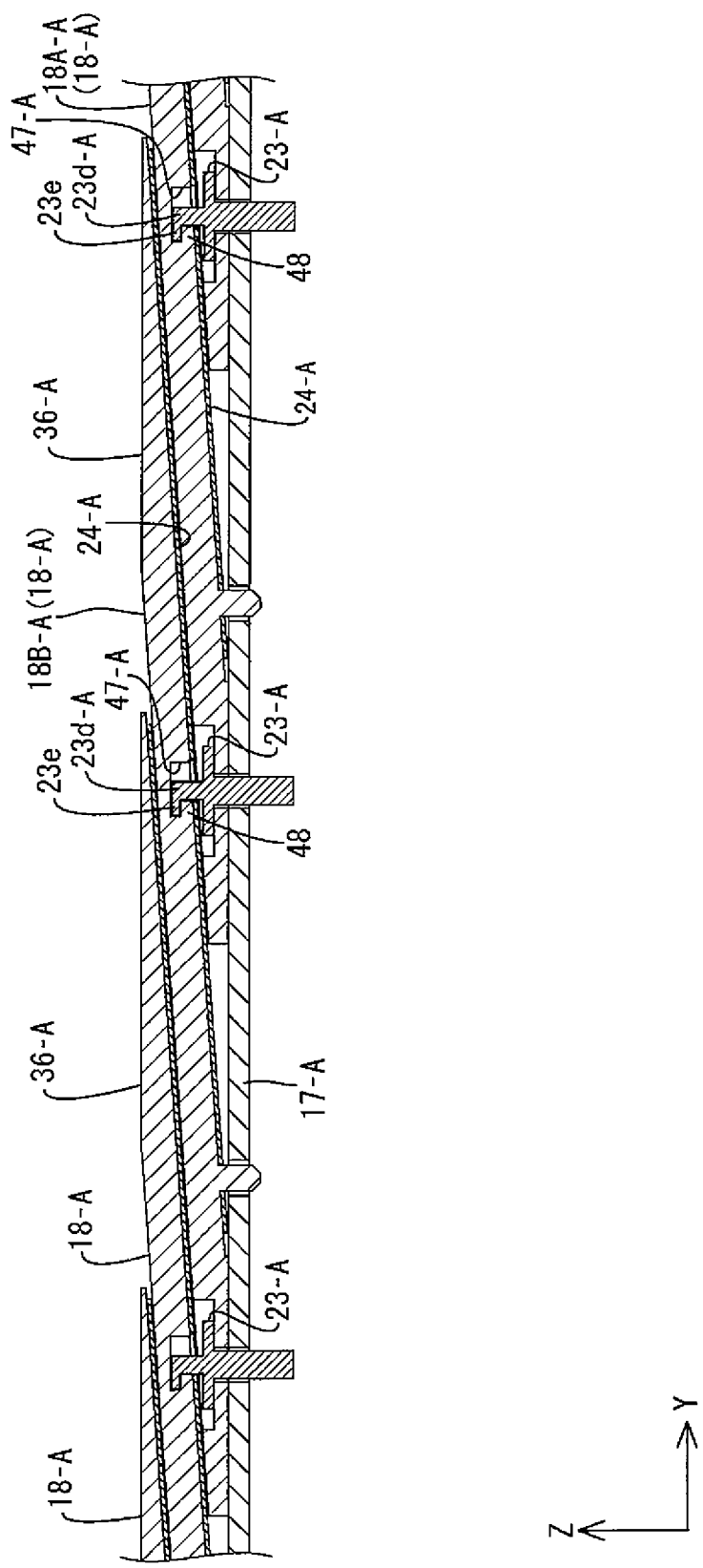
FIG. 18 is a cross-sectional view along the Y-Z plane illustrating locking structures of the light guide plates arranged in a line according to the second embodiment of the present invention.
Figure 19:
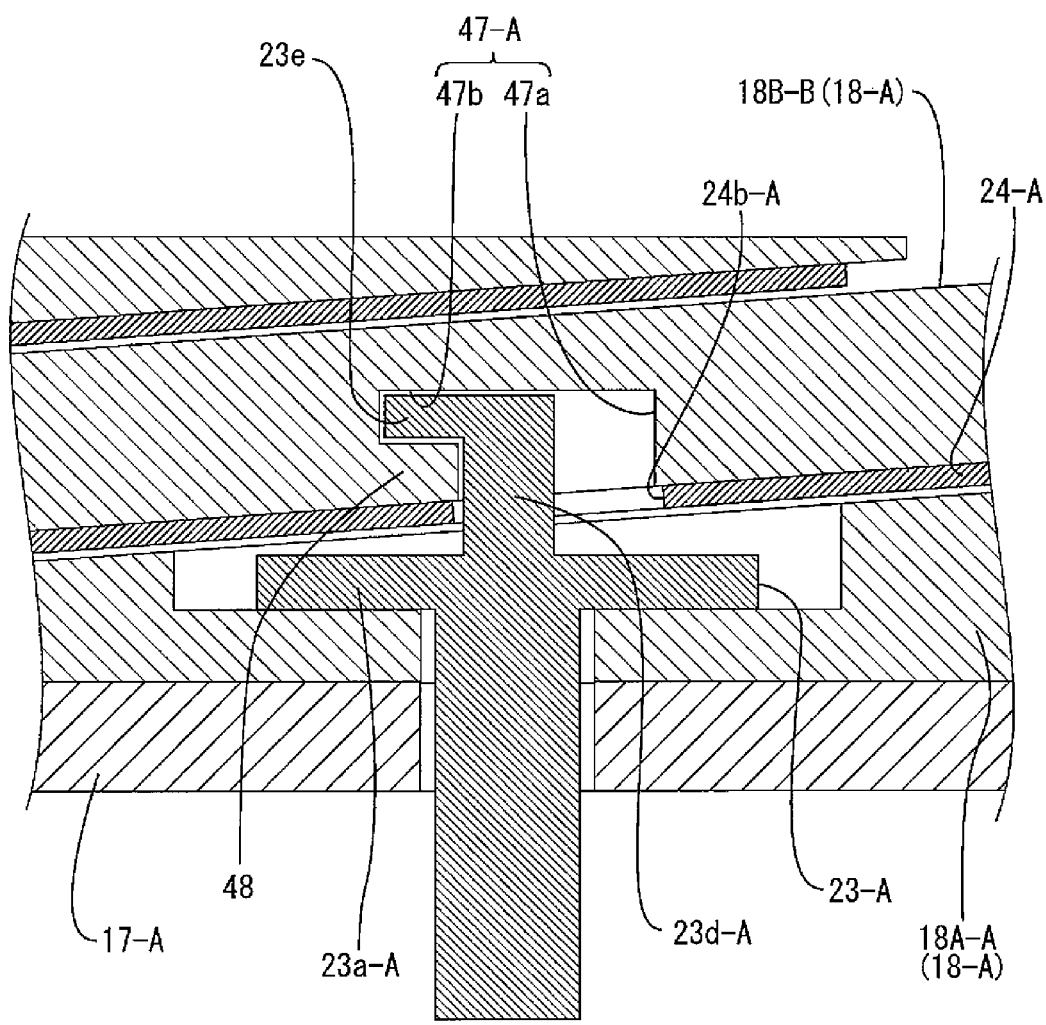
FIG. 19 is a magnified cross-sectional view along the Y-Z plane illustrating the locking structures in detail.
Figure 20:
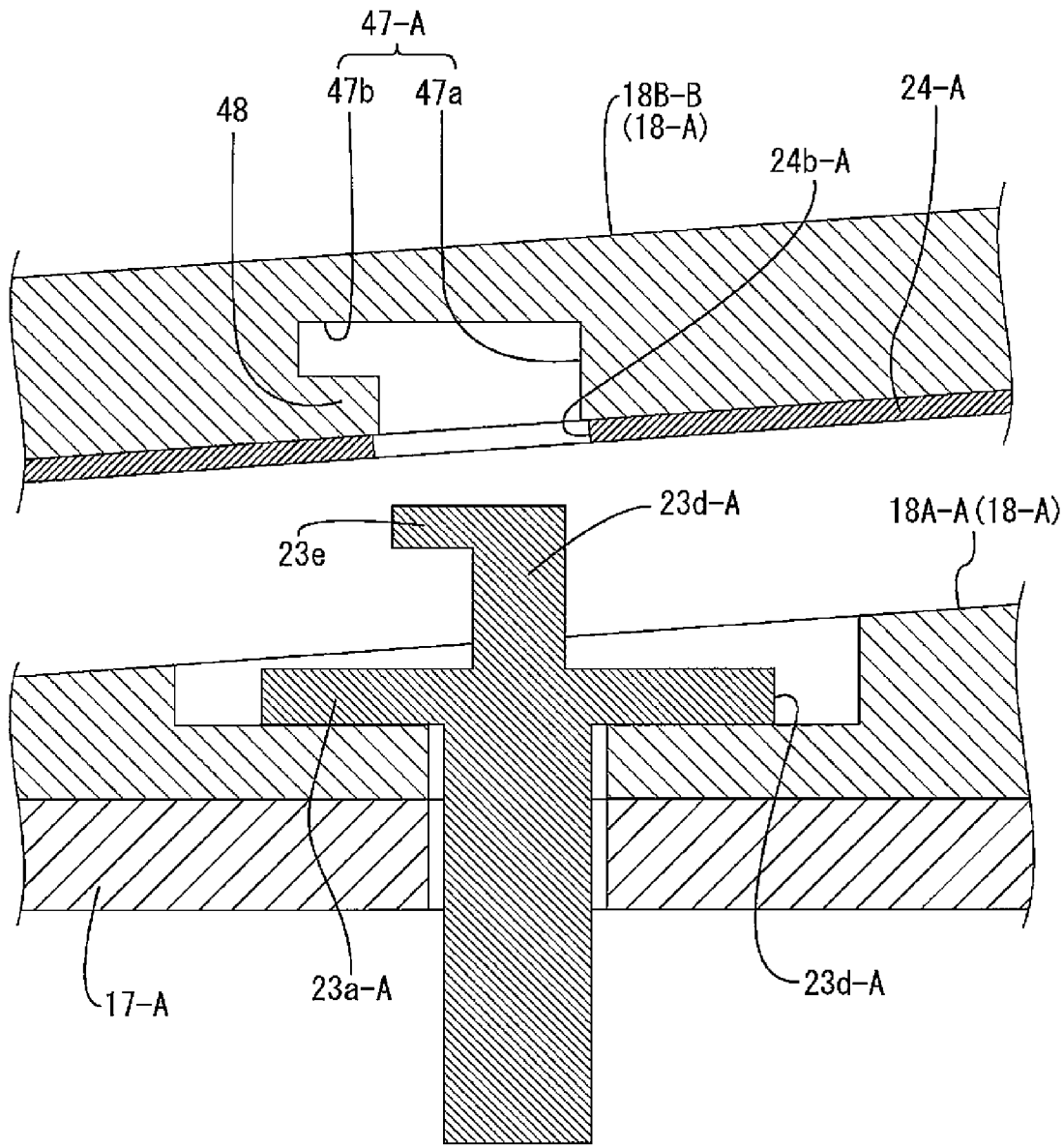
FIG. 20 is a cross-sectional view along the Y-Z plane illustrating the first guide plate mounted on an LED board and the second light guide plate before mounting.

As illustrated in FIGS. 18 and 19, the first locking part 23d-A projects from a mounting plate 23a-A of each clip 23-A along the Z-axis direction (the vertical direction). The first locking part 23d-A has a columnar shape with a constant diameter and an engaging part 23e at a distal end. The engaging part 23e projects toward the rear (i.e., horizontally). The axis of the engaging part 23e lies in the Y-axis direction (the direction parallel to the light exit surface 36-A) and substantially perpendicular to the axis of the first locking part 23d-A, which lies in the Z-axis direction (perpendicular to the light exit surface 36-A). The first locking part 32d-A and the engaging part 23*e* form an L-like shape (or a hook-like shape) in side view. The engaging part 23*e* projects from the first locking part 23*d*-A toward the rear, that is, in an opposite direction to the light exit surface 36-A (not shown) of the first light guide plate 18A-A to which the clip 23-A is mounted and in a direction toward the second light guide plate 18B-A.

Each second locking part 47-A is a recess in which the first locking part 23*d*-A and the engaging part 23*e* are inserted. The second locking part 47-A is formed in an L-like shape in plan view similar to the shape formed by the first locking part 23*d*-A and the engaging part 23*e*. The second locking part 47-A includes a vertical portion 47*a* on the front and a horizontal portion 47*b* on the rear. The vertical portion 47*a* opens on the rear-surface side. The horizontal portion 47*b* continues from the vertical portion 47*a* in a location more to the rear than the vertical portion 47*a* and does not open on the rear-surface side. A dimension of the vertical portion 47*a* measuring in the Y-axis direction is equal to or larger than a sum of dimensions of the first locking part 23*d*-A and the engaging part 23*e* measuring in the same direction. Therefore, the first locking part 23*e* and the engaging part 23*e* can be inserted in the vertical portion 47*a*. A dimension of the horizontal portion 47*b* measuring in the Z-axis direction is equal to or larger than a dimension of the engaging part 23*e*. Therefore, the engaging part 23*e* can be inserted in the horizontal portion 47*b*. When the engaging part 23*e* is inserted in the horizontal portion 47*b*, the engaging portion 23*e* is held against a part of the inner wall of the horizontal portion 47*b*, which is located on the rear-surface side, from the front-surface side, that is, from the opposite side from the LED board 17-A side. The part of the inner wall of the horizontal portion 47*b* to which the engaging part 23*e* is held is an engaging portion 48. When the engaging part 23*e* and the engaging portion 48 are engaged, the second light guide plate 18B-A having the engaging portion 48 does not move upward to the front-surface side away from the clip 23-A having the engaging part 23*e* and the first light guide plate 18A-A that is fixed with the clips 23-A. The insertion holes 24*b*-A of the reflection sheet 24-A are substantially in the same size as the vertical portions 47*a*. All clips 23-A in the backlight unit include the engaging parts 23*e* and the first locking parts 23*d*-A. All light guide plates 18-A in the backlight unit include the engaging portions 48 and the second locking parts 47-A.

The second light guide plate 18B-A is attached to the first light guide plate 18A-A from the front-surface side. As illustrated in FIG. 20, the vertical portion 47*a* of the second locking part 47-A is positioned with respect to the first locking part 23*d*-A and the engaging part 23*e*. Then, the second light guide plate 18B-A is brought closer to the first light guide plate 18A-A along the Z-axis direction. When the first locking part 23*d*-A and the engaging part 23*e* are inserted deeply in the second locking part 47-A, the second light guide plate 18B-A is moved along the Y-axis direction toward the front with respect to the first light guide plate 18A-A. As illustrated in FIG. 19, the engaging part 23*e* is inserted in the horizontal portion 47*b* of the second locking part 47-A and held to the engaging portion 48 from the front-surface side. As a result, the second light guide plate 18B-8A does not move in the Z-axis direction (the direction perpendicular to (or crossing) the light exit surface 36-A) toward the front-surface with respect to the first light guide plate 18A-A and the clip 23-A that fixes the first light guide plate 18A-A. Namely, the relative movement of the second light guide plate 18B-A so as to leave from the first light guide plate 18A-A and the clip 23-A is restricted. The engaging surfaces of the engaging part 23*e* and the engaging portion 48 lie in the Y-axis direction, that is, parallel to the light exit surface 36-A. Namely, the engaging surfaces are parallel to the direction that is perpendicular to the direction in which the second light guide plate 18B-A is not supposed to move. Therefore, the relative movement of the second light guide plate 18B-A is further properly restricted. During the attachment, the front end of the engaging part 23*e* comes in contact with the rear inner wall of the horizontal portion 47*b*, and the front end of the first locking part 23*d*-A comes in contact with the rear inner wall of the vertical portion 47*a*. As a result, the second light guide plate 18B-A is positioned with respect to the Y-axis direction.

As described above, the engaging portion 48 is provided in each second locking part 47-A, and the engaging part 23*e* is provided at the first locking part 23*d*-A on the opposite side from the LED board 17-A with respect to the engaging portion 48. When the engaging part 23*e* of the first locking part 23*d*-A is engaged with the engaging portion 48, the relative movement of the second light guide plate 18B-A to the first light guide plate 18A-A toward the opposite direction to the LED board 17-A is restricted. As a result, the relative positions of the LEDs to the light entrance surfaces 34-A are properly equalized and the uneven brightness is further less likely to occur.

Each first locking part 23*d*-A is a protrusion and the engaging part 23*e* projects from the first locking part 23*d*-A along the direction that crosses the direction that crosses the light exit surface 36-A. Each second locking part 47-A is a recess for receiving the first locking part 23*d*-A and the engaging part 23*e*. Moreover, the engaging portion 48 is formed on the inner wall of the second locking part 47-A. During the attachment of the second light guide plate 18B-A to the first light guide plate 18A-A, the second locking part 47-A, which is a recess, is easily positioned with respect to the first locking part 23*d*-A, which is a protrusion, and the engaging part 23*e*, which projects from the first locking part 23*d*-A. Namely, the assembly work can be easily performed.

Each engaging part 23*e* is formed in a shape that projects along the arrangement direction in which the LED and the light entrance surface are arranged and in the opposite direction to the light exit surface 36-A of the first light guide plate 18A-A. During the attachment of the second light guide plate 18B-A to the first light guide plate 18A-A, the first locking part 23*d*-A and the engaging part 23*e* are inserted in the second locking part 47-A and then the first light guide plate 18B-A is moved toward the light exit surface 36-A of the first light guide plate 18A-A. As a result, the engaging part 23*e* is engaged with the engaging portion 48. Namely, the assembly work can be easily performed.

Each engaging portion 23*e* is parallel to the light exit surface 36-A of the first light guide plate 18A-A. With this configuration, the relative movement of the second light guide plate 18B-A toward the opposite side from the LED board 17-A with respect to the first light guide plate 18A-A is further properly restricted.

Third Embodiment

Next, the third embodiment of the present invention will be explained with reference to FIGS. 21 and 22. In this embodiment, different shapes of first locking parts 23*d*-B and second locking parts 47-B are used in comparison to the second embodiment. The similar portions as the second embodiment will be indicated with the same symbols followed by -B. The same configurations, functions and effects as the first embodiment will not be explained.

Figure 21:
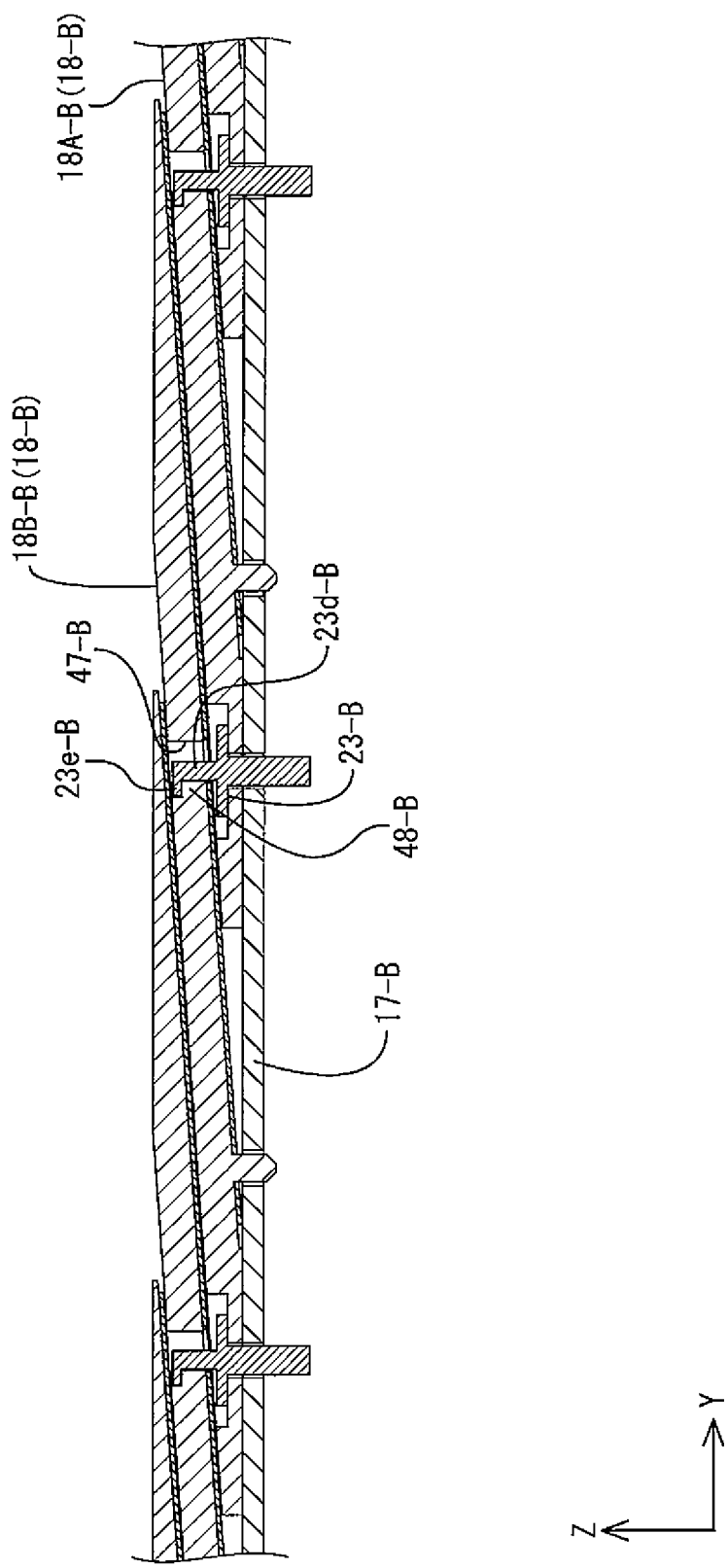
FIG. 21 is a cross-sectional view along the Y-Z plane illustrating locking structures of the light guide plates arranged in a line according to the third embodiment of the present invention.
Figure 22:
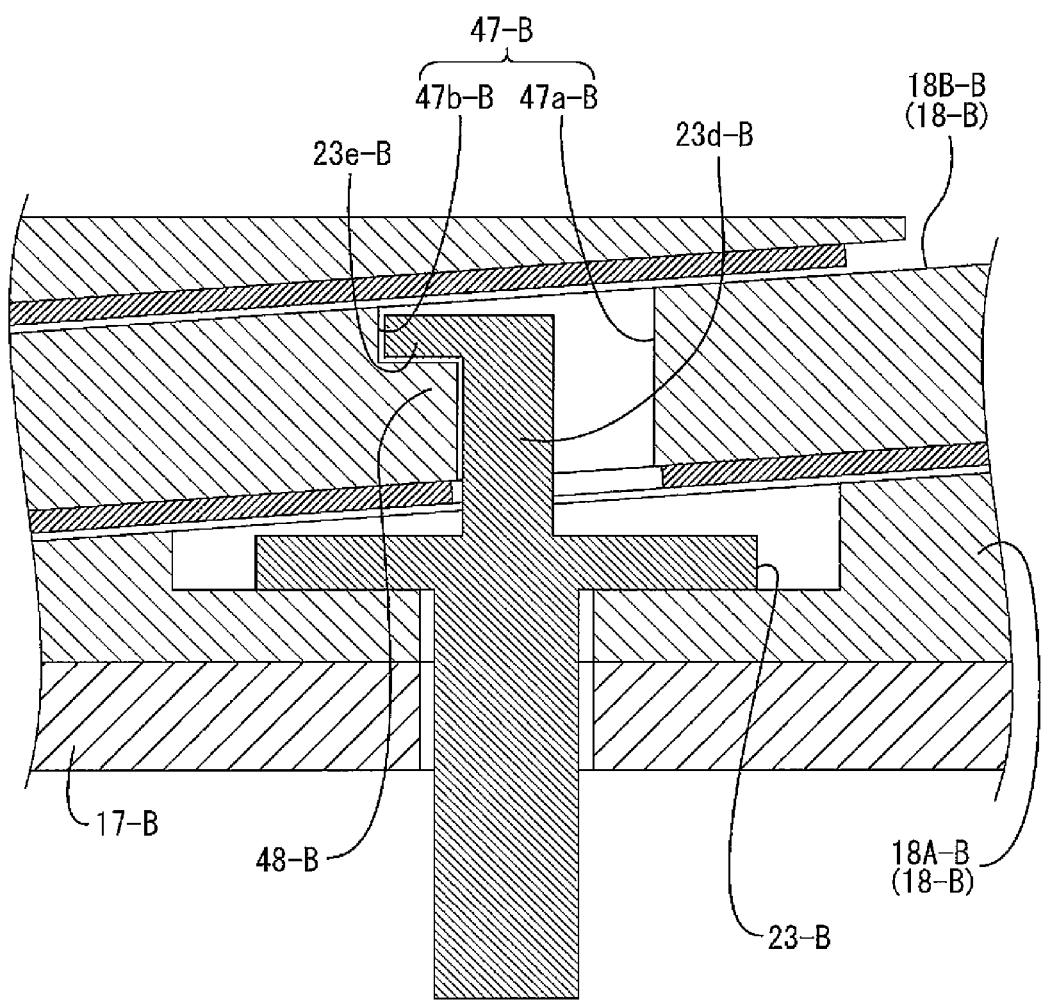
FIG. 22 is a magnified cross-sectional view along the Y-Z plane illustrating the locking structures in detail.

As illustrated in FIGS. 21 and 22, each second locking part 47-B is a through hole that runs all the way through the second light guide plate 18B-B in the thickness direction (the Z-axis direction). Specifically, a vertical portion 47a-B of the second locking part 47-B runs in the Z-axis direction and opens on the front-surface side and the rear-surface side. Each first locking part 23d-B is formed with a dimension measuring a mounting plate 23a-B of a clip 23-B to a distal end defined such that the first locking part 23d-B does not project from the front surface of the second light guide plate 18B-B when it is fitted in the second locking part 47-B. Furthermore, each engaging part 23e-B does not project from the front surface of the second light guide plate 18B-B when it is inserted in a horizontal portion 47b-B. Namely, the first locking part 23d-B and the engaging part 23e-B are entirely placed in the second locking part 47b-B. The horizontal portion 47b-B in which the engaging part 23e-B is placed opens on the front-surface side. Therefore, the engaging part 23e-B is bare on the front-surface side. During the mounting of the light guide plates 18-B, an assembly worker can visually confirm a position of the engaging part 23e-B in the second locking part 47-B with respect to the Y-axis direction, that is, an engagement condition of the engaging part 23e-B with the engaging portion 48-B. Therefore, the light guide plates 18-B are properly mounted. All clips 23-B in the backlight unit include the first locking part 23d-B and the engaging part 23e-B. All light guide plates 18-B in the backlight unit include the second locking part 47-B and the engaging portion 48-B.

In this embodiment, each second locking part 47-B is a through hole that runs all the way through the second light guide plate 18B-B. Each engaging part 23e-B is placed so as to be bare on the opposite side of the second light guide plate 18B-B from the LED board 17-B. Therefore, the engagement condition of each engaging part 23e-B that is bare on the opposite side of the second light guide plate 18B-B from the LED board 17-B can be visually confirmed. Namely, the attachment can be properly performed.

Each second engaging part 47-B is formed such that the engaging part 23e-B is entirely placed therein when the engaging part 23e-B is engaged with the engaging portion 48-B. Therefore, the engaging part 23e-B does not project from the first light guide plate 18A-B toward the second light guide plate 18B-B, and no gap is created between the first light guide plate 18A-B and the second light guide plate 18B-B. This contributes to reducing the thickness of the backlight unit 12.

Fourth Embodiment

Next, the fourth embodiment of the present invention will be explained with reference to FIG. 23. In this embodiment, different combination-type clips 23-C having first engaging parts 23d-C in a different layout in comparison to the first embodiment are used. The similar portions as the first embodiment will be indicated with the same symbols followed by -C. The same configurations, functions and effects as the first embodiment will not be explained.

In this embodiment, each combination-type clip 23C-C includes a pair of first locking parts 23d-C in the following layout. As illustrated in FIG. 23, the first locking parts 23d-C are arranged on each mounting plate 23a-C off the center line of the mounting plate 23a-C to the front and to the rear, respectively, with respect to the Y-axis direction (the arrangement direction in which the LED 16-C and the light entrance surface 34-C are arranged). The locations of the first locking parts 23d-C with respect to the X-axis direction are the same as the first embodiment. The locations with respect to the Y-axis direction will be explained in detail. The first locking part 23d-C on the right in FIG. 23 is located more to the rear than line L that lies at the center of the mounting plate 23a-C with respect to the Y-axis direction and along the X-axis direction. The first locking part 23d-C on the left in FIG. 23 is located more to the rear than line L that lies at the center of the mounting plate 23a-C with respect to the Y-axis direction and along the X-axis direction. Distances from line L to the first locking parts 23d-C are the same. Namely, the first locking parts 23d-C are symmetrical with respect to the center C the mounting plate 23a-C. In comparison to the first locking parts arranged in line along the X-axis direction such as those in the first embodiment, the first locking parts 23d-C are less likely to be viewed from the front-surface side. Therefore, the uneven brightness is less likely to occur. Each light guide plate 18-C has a pair of second locking parts 47-C in locations corresponding to the first locking parts 23d-C. Specifically, the locations of the second locking parts 47-C differ from each other in the Y-axis direction.

If insertion portions (not shown) on the rear side of each mounting plate 23a-C, insertion holes (not shown) of each light guide plate 18 and mounting holes (not shown) of each LED board are provided in locations corresponding to the first locking parts 23d-C, the combination-type clips 23C-C can be mounted even when they are in turnaround orientations. Therefore, the mounting is easily performed.

In this embodiment, a pair of the clips 23-C is provided for each light guide plate 18C. The clips 23-C are mounted at locations close to the ends of a dimension of the light guide plate 18-C measuring in the direction parallel to the light exit surface 36-C and that crosses the arrangement direction in which the LED 16-C and the light entrance surface 34-C are arranged. Each clip 23-C includes the first locking parts 23d-C. The combination-type clips 23C-C are mounted to the light guide plates 18-C arranged adjacently in the direction parallel to the light exit surface 36-C and that crosses the arrangement direction. The adjacent first locking parts 23d-C included in the corresponding combination-type clip 23C-C that is mounted to the different light guide plates 18-C adjacent to each other are arranged in the different locations with respect to the arrangement direction. The adjacent first locking parts 23d-C are not arranged in line along the direction parallel to the light exit surface 36-C and that crosses the arrangement direction. Therefore, the first locking parts 23d-C are less likely to exert optical influences on the light guide plates 18-C.

Fifth Embodiment

Next, the fifth embodiment of the present invention will be explained with reference to FIGS. 24 and 25. In this embodiment, different shapes of first locking parts 23d-D and second locking parts 47-D from the second embodiment are used. The similar portions as the second embodiment will be indicated with the same symbols followed by -D. The same configurations, functions and effects as the first embodiment will not be explained.

Figure 24:
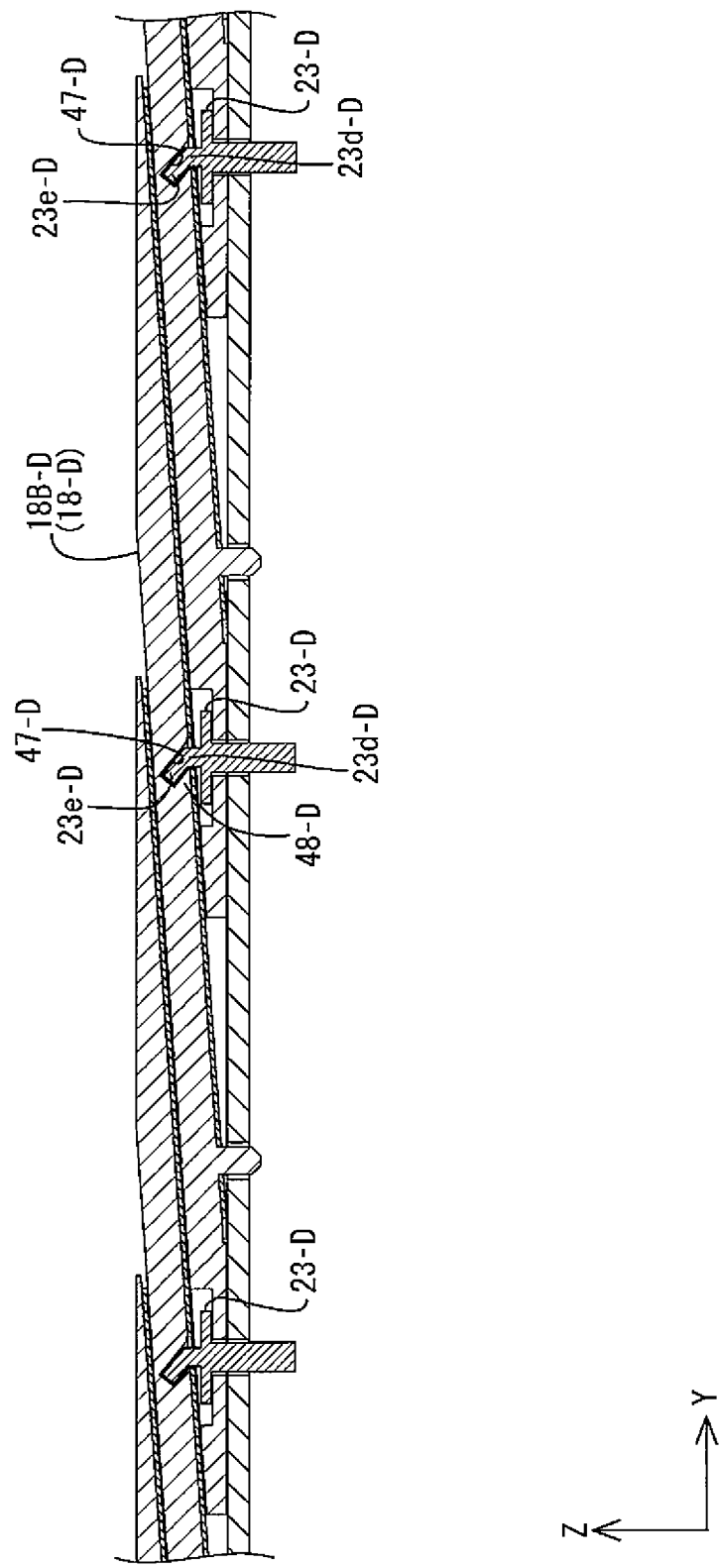
FIG. 24 is a cross-sectional view along the Y-Z plane illustrating locking structures of the light guide plates arranged in a line according to the fifth embodiment of the present invention.
Figure 25:
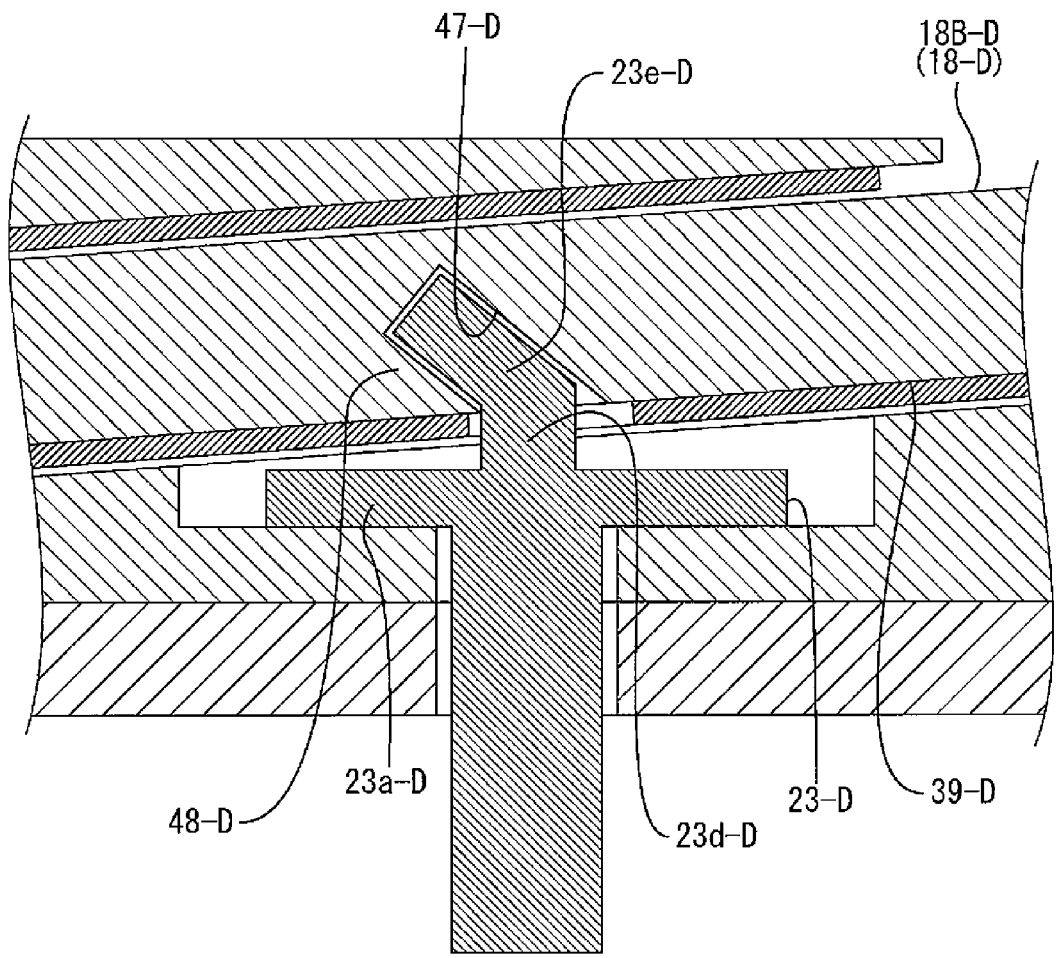
FIG. 25 is a magnified cross-sectional view along the Y-Z plane illustrating the locking structures in detail.

As illustrated in FIGS. 24 and 25, each second locking part 47-D runs forward through the second light guide plate 18B-D and obliquely with respect to the Z-axis direction and the Y-axis direction. The second locking part 47-D opens in the rear surface of the light guide plate 18B-D. Each first locking part 23d-D projects from the mounting plate 23a-D and extends straight along the Z-axis direction. An engaging part 23e-D projects from the distal end of each first locking part 23d-D obliquely backward. The engaging part 23e-D is slanted with respect to the Z-axis direction and the Y-axis direction. Each first locking part 23d-D and each engaging part 23e-D are inserted in the corresponding second locking part 47-D along the direction oblique to the Z-axis direction and the Y-axis direction at an acute angle to the rear sloped surface 39-D of the light guide plate 18-D. Engaging portions 48 are engaged with the respective engaging parts 23e-D. Each engaging portion 48 has a triangular cross-section. Engaging surfaces of the engaging parts 23e-D and the engaging portions 48-D are sloped surfaces that are slanted along the direction mentioned above. All clips 23-D in the backlight unit include the first locking parts 23d-D and the engaging parts 23e-D. All light guide plates 18-D in the backlight unit include the second locking parts 47-D and the engaging portions 48-D.

Sixth Embodiment

Figure 26:
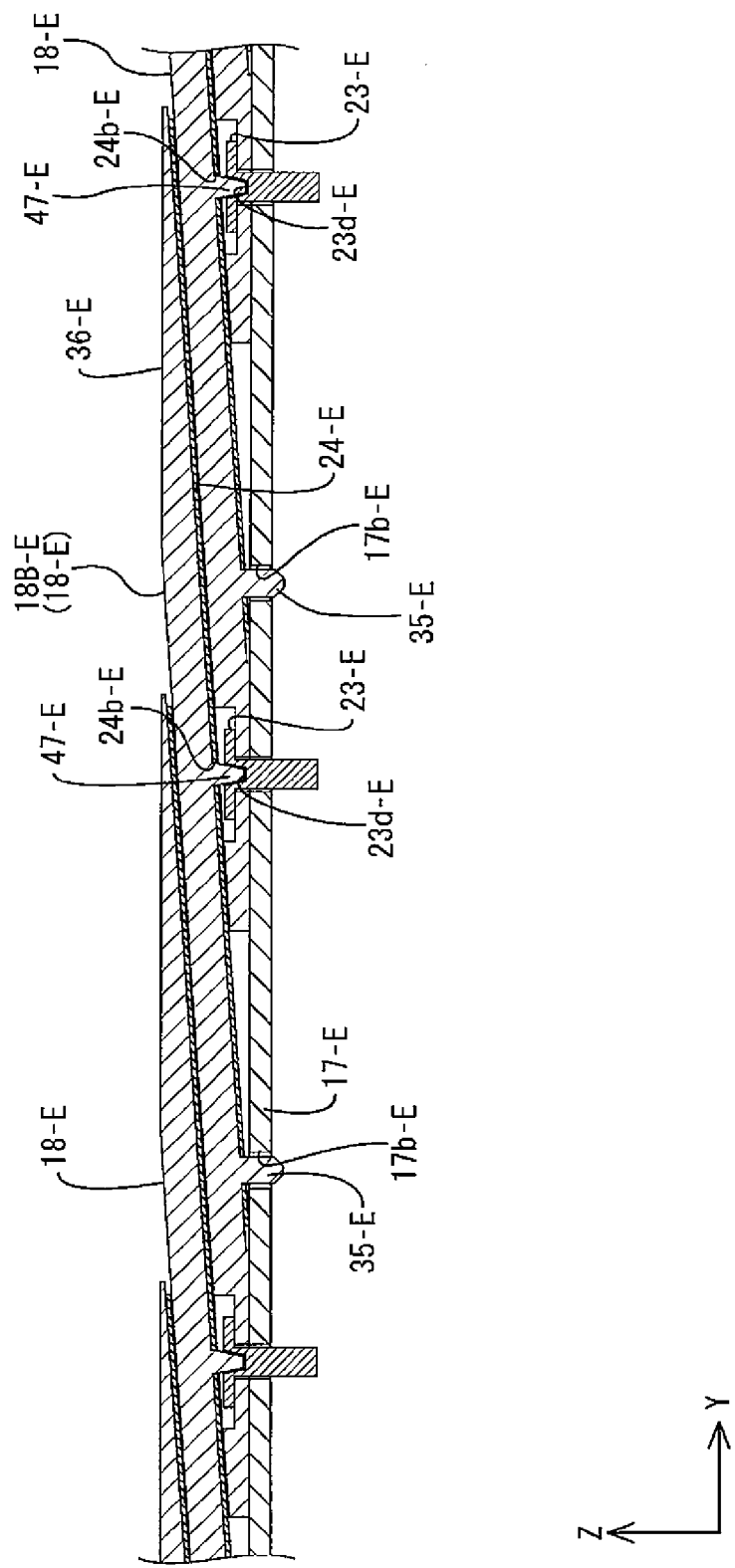
FIG. 26 is a cross-sectional view along the Y-Z plane illustrating locking structures of the light guide plates arranged in a line according to the sixth embodiment of the present invention.
Figure 27:
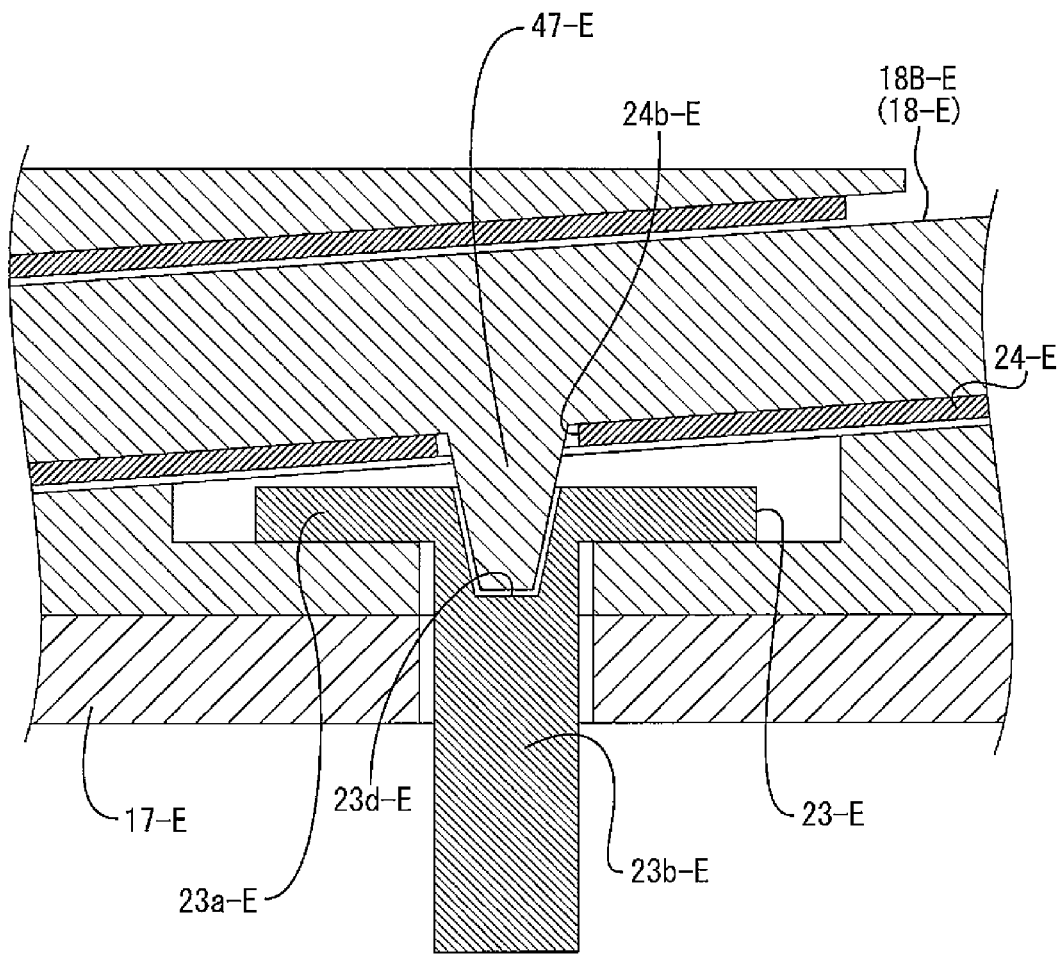
FIG. 27 is a magnified cross-sectional view along the Y-Z plane illustrating the locking structures in detail.

Next, the sixth embodiment of the present invention will be explained with reference to FIGS. 26 and 27. In this embodiment, first locking parts 23d-E are recesses and second locking parts 47-E are protrusions, which are the other way around in comparison to the first embodiment. The similar portions as the first embodiment will be indicated with the same symbols followed by -E. The same configurations, functions and effects as the first embodiment will not be explained.

The first locking parts 23d-E are provided integrally with each clip 23-E. Each first locking part 23d-E is a recess that does not run all the way through the clip 23-E to the rear surface and opens only on the front-surface side. Specifically, a depth of each first locking part 23d-E is defined such that the first locking part 23d-E runs all the way through the mounting plate 23a-E through a part of the insertion portion 23b-E. The first locking part 23d-E is a trapezoidal void section in cross-sectional view along the X-axis direction and the Y-axis direction. The first locking part 23d-E is relatively large around the opening for the second locking part 47-E and relatively small at the bottom. The inner wall of the first locking part 23d-E is sloped with respect to the X-axis direction. The first locking part 23d-E is formed by molding when the second light guide plate 18B-E is molded.

The second locking parts 47-E are provided integrally with the second light guide plate 18B-E. Each second locking part 47-E is a protrusion that projects from the rear surface of the second light guide plate 18B-E to which a reflection sheet 24-E is attached. The second locking part 47-E is formed in a shape corresponding to the shape of the first locking part 23d-E. The second locking part 47-E has a truncated cone-like shape that projects substantially straight along the Z-axis direction (the direction perpendicular to the light exit surface 36-E) on the front-surface side. Each second locking part 47-E has trapezoidal cross-sections along the X-axis direction and the Y-axis direction. Namely, the second locking part 47-E has a cone-like shape. The periphery of the second locking part 47-E is sloped with respect to the X-axis direction. A fitting direction in which the second locking part 47-E is inserted in the first locking part 23d-E matches the Z-axis direction. The reflection sheet 24-E has insertion holes 24b-E in locations corresponding to the second locking parts 47-E that are protrusions. The insertion holes 24b-E are through holes through which the second locking parts 47-E are passed. All clips 23-E in the backlight unit have the first locking parts 23d-E and all light guide plates 18-E in the backlight unit have the second locking parts 47-E.

Because each second locking part 47-E on the second light guide plate 18B-E is a protrusion as described above, the following functions and effects are achieved. During the attachment of the reflection sheet 24-E to the second light guide plate 18B-E, positioning pins 35 are inserted in the respective positioning holes 17b-E and the second locking parts 47-E are inserted in the insertion holes 24b-E. The reflection sheet 24-E are positioned with respect to the second light guide plate 18B-E with four points away from each other in the X-axis direction or the Y-axis direction. As a result, the reflection sheet 24-E is easily attached in a proper location on the second light guide plate 18B-E. When the LEDs are lit after the second light guide plate 18B-E is mounted to the LED board 17-E, the second locking parts 47-E is less likely to be an optical obstacle to light that travels through the second light guide plate 18B-E in comparison to the second locking parts that are recesses as in the first embodiment. Therefore, the uneven brightness is further less likely to occur. Rays of light leaking on the rear-surface side via the insertion holes 24b-E or the second locking parts 47-E are reflected by the surface of the clips 23-E (including the first locking parts 23e-E) provided in white with high light reflectivities. Namely, the rays are efficiently directed back to the second light guide plate 18B-E. Therefore, high light use efficiency can be achieved.

In this embodiment, the first locking parts 23d-E are recesses and the second locking parts 47-E are protrusions. Namely, the second light guide plate 18B-E does not have recesses. The second locking parts 47-E are less likely to be an optical obstacles for light that travels through the second light guide plate. This configuration is preferable for reducing the uneven brightness.

The reflection sheet 24-E is configured to reflect light toward the light exit surface 36-E. The reflection sheet 24-E is attached to the opposite surface of the second light guide plate 18-E from the light exit surface 36-E. The reflection sheet 24-E has the insertion holes 24b-E corresponding to the second locking parts 47-E and through which the second locking parts 47-E are passed. During the attachment of the reflection sheet 24-E to the second light guide plate 18B-E, the reflection sheet 24-E is positioned with respect to the second light guide plate 18B-E when the second locking parts 47-E are passed through the insertion holes 24b-E. Namely, the attachment is easily performed.

The second locking parts 47-E are provided integrally with second light guide plate 18B-E. In comparison to the second locking parts provided separately from the second light guide plate 18B-E, the high positioning accuracy can be achieved and the attachment is easily performed.

Seventh Embodiment

Next, the seventh embodiment of the present invention will be explained with reference to FIGS. 28 to 29. In this embodiment, first locking parts 23d-F are recesses and second locking parts 47-F are protrusions, which are the same as the sixth embodiment. Moreover, engaging structures similar to the second embodiment are provided. The similar portions as the sixth embodiment will be indicated with the same symbols followed by -F. The same configurations, functions and effects as the first embodiment will not be explained.

Figure 28:
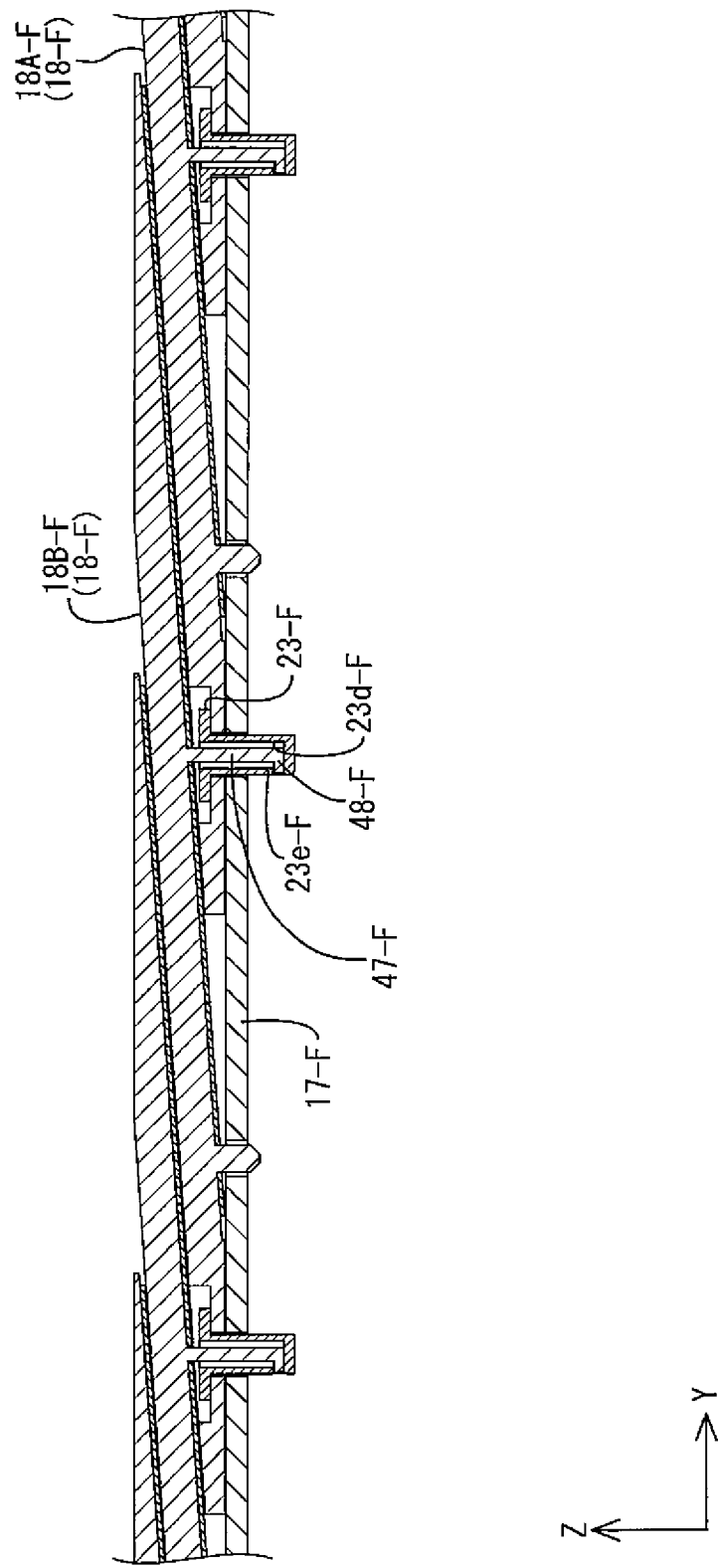
FIG. 28 is a cross-sectional view along the Y-Z plane illustrating locking structures of the light guide plates arranged in a line according to the seventh embodiment of the present invention.
Figure 29:
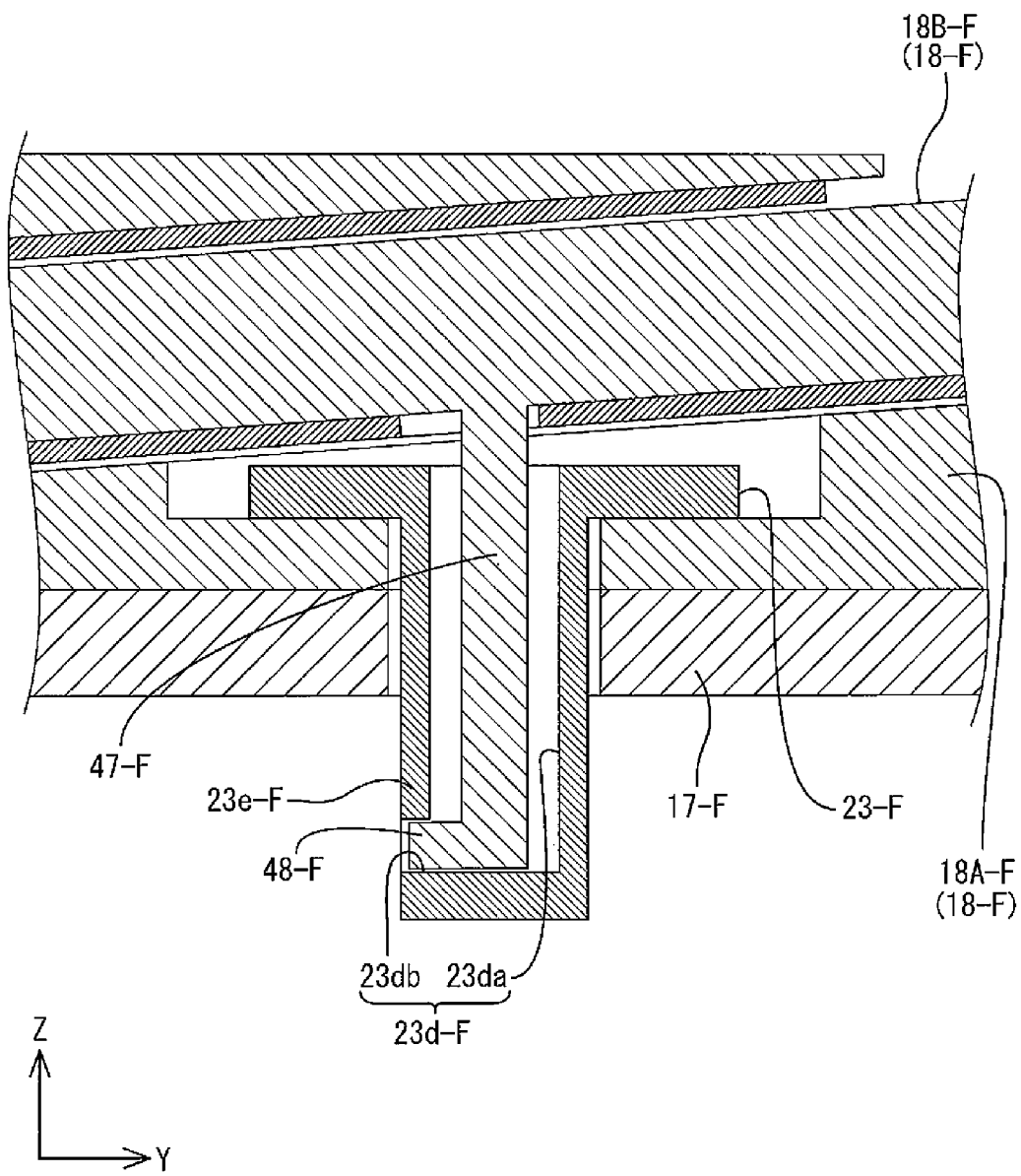
FIG. 29 is a magnified cross-sectional view along the Y-Z plane illustrating the locking structures in detail.

As illustrated in FIGS. 28 and 29, each second locking part 47-F has a columnar shape that extends straight in the Z-axis direction with a constant diameter. An engaging part 48-F is provided at the distal end of the second locking part 47-F. The engaging part 48-F extends along the Y-axis direction to the rear (i.e., it is a projection). The second locking part 47-F and the engaging part 48 form an L-like shape (or a hook-like shape) in side view. Each first locking part 23d-F is a recess in which the second locking part 47-F and the engaging part 48-F are inserted. The first locking part 23d-F is an L-shaped void section in side view similar to the shape formed by the second locking part 47 and the engaging part 48-F. The first locking part 23*d*-F includes a vertical portion 23*da* and a horizontal portion 23*db*. The vertical portion 23*da* opens on the front-surface side. The second locking part 47-F and the engaging part 48-F are inserted in the vertical portion 23*da* along the Z-axis direction. The horizontal portion 23*db* continues from the bottom part of the vertical portion 23*da* and does not open on the front-surface side. The engaging part 48-F is inserted in the horizontal portion 23*db* along the Y-axis direction.

When the engaging part 48-F is inserted in the horizontal portion 23*db*, it is held against the inner wall of the horizontal portion 23*db* from the rear-surface side, that is, from the opposite side from the LED board 17-F. A part of the inner wall of the horizontal portion 23*bd* where the engaging part 48-F is held against is an engaging part 23*e*-F. When the engaging part 48-F is held against the engaging part 23*e*-F, the relative movement of the second light guide plate 18B-F to the clip 23-F and the first light guide plate that is fixed with the clip 23-F in the upward direction is restricted. During the attachment of the second light guide plate 18B-F to the first light guide plate 18A-F, the second locking parts 47-F and the engaging part 48-F are inserted in the respective vertical portions 23*da* of the first locking parts 23*d*-F along the Z-axis direction. Then, the second light plate 18B-F is moved relatively to the rear along the Y-axis direction. As a result, the engaging part 48-F is held against the engaging part 23*e*-F. All clips 23-F in the backlight unit have the first locking parts 23*d*-F and the engaging parts 23*e*-F. All the light guide plates 18-F in the backlight unit have the second locking parts 47-F and the engaging parts 48-F.

Other Embodiments

The present invention is not limited to the above embodiments explained in the above description. The following embodiments may be included in the technical scope of the present invention, for example.

(1) In the first and the sixth embodiments, each first locking part and each second locking part have the trapezoidal cross-sections. However, they may be formed differently with different cross-sections. For example, each first locking part and each second locking part may be formed in tapered shapes with triangular cross-sections, or may be in non-tapered shapes with rectangular or square cross-sections. An example of the first locking parts or the second locking parts, which are protrusions, formed in shapes with rectangular or square cross-sections are cylindrical or rectangular columnar first locking parts or the second locking parts. In the first and the sixth embodiments, entire inner walls or outer peripheries of the first locking parts or the second locking parts are sloped. However, parts of the inner walls or outer peripheries may be vertical. Namely, the first locking parts and the second locking parts may be formed with different shapes of cross-sections along different cutting directions.

(2) In the second, third and fifth embodiments, the engaging parts projects from the respective first locking parts toward the rear. However, the engaging parts may project from the respective first locking parts toward the front. In that case, the horizontal portions of the second locking parts need to be provided on the front side with respect to the vertical portions. Similarly, the engaging parts in the seventh embodiment may project from the second locking parts toward the front and the horizontal portions of the first locking parts may be provided on the front side with respect to the vertical portions. The first locking parts, the second locking parts, the engaging parts and the engaging portions may be formed differently.

(3) In the third embodiment, entire engaging parts are inserted in the respective second locking parts. However, they may partially project from the second locking parts on the front-surface side. The first locking parts in the seventh embodiment may opens on the rear-surface side similar to the third embodiment.

(4) The layout of each pair of the first locking parts in the fourth embodiment can be altered as necessary. For example, the first locking parts may be arranged the other way around with respect to the fourth embodiment. In FIG. 23, the first locking parts on the right may be arranged more to the front and those on the left may be arranged more to the rear. The first locking parts in each pair may be asymmetrically arranged.

(5) In the first to the fifth embodiments, the first locking parts that are protrusions are provided integrally with the clips. However, the first locking parts may be prepared separately from the clips and mounted to the clips so as to be provided as parts of the clips. In the sixth and the seventh embodiments, the second locking parts are protrusions. The second locking parts may be prepared separately from the light guide plates and mounted to the light guide plates so as to be provided as parts of the light guide plates.

(6) In the above embodiments, each first locking part and each insertion portion of each clip are provided concentrically with each other. However, the first locking part and the insertion portion of each clip may be displaced from each other in the X-axis direction or the Y-axis direction.

(7) In the above embodiments, each clip has the same number of the first locking parts and the insertion portion. However, each combination-type clip may have a pair of the insertion portions and a single first locking part. Each clip may have the larger number of the first locking parts than the number of the insertion portions. For example, each combination-type clip may have three or more first locking parts and each single-type clip may have two of more first locking parts.

(8) In the above embodiments, the second locking parts are provided in the light guide portions of the light guide plates. However, the second locking parts may be provided in other portions, for example, in the board-mounting portions or the light exit portions. In that case, part of the clips in which the first locking parts that are recesses are provided or the first locking parts that are protrusions of the clips may be extended so as to fit the second locking parts.

(9) In the above embodiments, the second locking parts are provided in the overlapping area of the second light guide plate in which the second light guide plate overlap the first light guide plate. However, the second locking parts may be provided in the non-overlapping area of the second light guide plate in which the second light guide plate does not overlap the first light guide plate. In that case, part of the clips in which the first locking parts that are recesses are provided or the first locking parts that are protrusions of the clips may be extended so as to fit the second locking parts.

(10) In the above embodiments, the light guide plates and the LED boards include the positioning pins and the positioning holes, respectively, as the second locking structures. However, the LED boards may include the positioning pins and the light guide plates may include the positioning holes. In that case, positioning recesses that do not run all the way through the light guide plates and open only on the rear-surface side may be provided instead of the positioning holes.

(11) The shapes of the positioning pins and the positioning holes that are the second locking structures may be altered as necessary. The light guide plates and the LED boards without the positioning pins and the positioning holes are also included in the scope of the present invention.

(12) In the above embodiments, two kinds of the clips, the combination-type clips and the single-type clips, are used. However, only single-type clips may be used and the combination-type clips may not be used. Namely, the light guide plates adjacently arranged in the X-axis direction may be fixed independently with separate single-type clips. Furthermore, each light guide plate is fixed with a pair of the clips at the edges. However, each light guide plate may be fixed with a single clip or fixed with the clip at a location other than the edges (e.g., at the center of the dimension along the X-axis direction).

(13) In the above embodiments, the clips with the first locking parts have the white surfaces. However, the color of the surfaces may be milky white or other colors. Namely, the clips (including the first locking parts) may be made of resin in a color other than white.

(14) In the above embodiments, the clips with the first locking parts are made of white resin. However, the clips (including the first locking parts) may be made of resin in a color other than white and then the surfaces may be pained in white. In that case, a transparent resin or a semitransparent resin, that is, a material that is capable of light transmission rather than reflection may be used. The surfaces of those clips may be painted in a color other than white with the technology of the above embodiment (13).

(15) In the above embodiments, each light guide plate has a single slit. However, the light guide plate may have more than one slit. With this configuration, each light guide plate can include more than two LEDs. This makes assembly work of the backlight unit easier. In that case, each light guide plate may be fixed with a pair of the clips that are positioned such that the LEDs are located between the clips.

(16) In the above embodiments, each light guide plate has the slit that divides the light exit portion and the light guide portion so that a single light guide plate covers a plurality of the LEDs. However, each light guide plate may not have the slit and only covers a corresponding LED (i.e., may have a single light entrance surface). With this configuration, light from the adjacent LED that is not an object to be covered by a specific light guide plate is less likely to enter the specific light guide plate. As a result, each light guide plate can maintain optical independence from another. Fixing points where the light guide plate are fixed with the fixing members such as clips should be set such that the LEDs are located between the fixing points.

(17) In the above embodiments, each light guide plate has a rectangular shape in a plan view. However, each light guide plate may have a square shape in a plan view. The lengths, the widths, the thicknesses and the outer surface shapes of each board-mounting portion, each light guide portion and each light exit portion can be altered as necessary.

(18) In the above embodiments, each LED emits light upward in the vertical direction. However, the light emitting direction of each LED can be altered as necessary. Namely, each LED can be mounted to the LED board in a suitable position. Specifically, each LED can be mounted to the LED board so as to emit light downward in the vertical direction, or such that the light emitting direction (the light axis) aligned with the horizontal direction. Moreover, the LEDs with different light-emitting directions may be included.

(19) In the above embodiments, the LEDs and the light guide plates (unit light emitters) are two-dimensionally arranged parallel to each other inside the chassis. However, they may be one-dimensionally arranged parallel to each other. Specifically, the LEDs and the light guide plates are arranged parallel to each other in only in the vertical direction, or they are arranged parallel to each other only in the horizontal direction.

(20) In the above embodiments, each LED includes three different LED chips configured to emit respective colors of RGB. However, LEDs each including a single LED chip configured to emit a single color of blue or violet and each configured to emit white light using fluorescent material may be used.

(21) In the above embodiments, each LED includes three different LED chips configured to emit respective colors of RGB. However, LEDs each including three different LED chips configured to emit respective colors of cyan (C), magenta (M) and yellow (Y) or white LEDs may be used.

(22) In the above embodiments, the LEDs are used as point light sources. However, point light sources other than LEDs can be used.

(23) In the above embodiments, point light sources are used for light sources. However, linear light sources such as cold cathode tubes and hot cathode tubes other than the point light sources may be used.

(24) Planar light sources such as organic ELs may be used other than the embodiments and the above embodiments (22) and (23).

(25) The optical member may be configured differently from the above embodiments. Specifically, the number of diffusers or the number and the kind of the optical sheets can be altered as necessary. Furthermore, a plurality of optical sheets in the same kind may be used.

(26) In the above embodiments, the liquid crystal panel and the chassis are held in the vertical position with the long-side direction thereof aligned with the vertical direction. However, the liquid crystal panel and the chassis may be held in the vertical position with the long-side direction thereof aligned with the vertical direction.

(27) In the above embodiments, the TFTs are used as switching components of the liquid crystal display device. However, the technology described the above can be applied to liquid crystal display devices including switching components other than TFTs (e.g., thin film diode (TFD)). Moreover, the technology can be applied to not only color liquid crystal display devices but also black-and-white liquid crystal display devices.

(28) In the above embodiments, the liquid crystal display device including the liquid crystal panel as a display component is used. The technology can be applied to display devices including other types of display components.

(29) In the above embodiments, the television receiver TV including the tuner T is used. However, the technology can be applied to a display device without the tuner T.

The invention claimed is:

1. A lighting device comprising:
light sources;
a base member to which the light sources are mounted;
a plurality of light guide members mounted to the base member, each of the light guide members having a light entrance surface facing at least one of the light sources such that light from the light source enters the light guide member through the light entrance surface, and each having a light exit surface through which the light exits, the light exit surface being parallel to an arrangement direction in which the light source and the light entrance surface are arranged, the light guide members being arranged in a line along the arrangement direction and overlapping one another in a direction crossing the light exit surfaces, the light guide members overlapping one another including a first light guide member and a second light guide member, the first light guide member being arranged on a base member side, and the second light guide member being arranged on an opposite side from the base member side;

fixing members fixing the light guide members to the base member so as to be held in initial conditions in which the light guide members are mounted; and locking structures for restricting a relative movement of the second light guide member in a direction along the light exit surface, the locking structures being provided in the fixing member fixing the first light guide member and the second light guide member, respectively.

2. The lighting device according to claim 1, wherein the locking structures include a first locking part provided in the fixing member that fixes the first light guide member and a second locking part provided on a surface of the second light guide member opposite from the light exit surface and engaged with the first locking part.

3. The lighting device according to claim 2, further comprising a reflection member configured to reflect light toward the light exit surface, the reflection member being attached to the surface of the second light guide member opposite from the light exit surface, and having an insertion hole through which one of the first locking part and the second locking part whichever is a protrusion is inserted.

4. The lighting device according to claim 3, wherein the first locking part has a white surface.

5. The lighting device according to claim 2, wherein:
each of the light guide members includes a light exit portion having a light exit surface and a light guide portion configured to guide incident light from the light entrance surface to the light exit portion; and
the second locking part is provided in the light guide portion of the second light guide member.

6. The lighting device according to claim 2, wherein the second locking part is provided in an overlapping area of the second light guide member with the first light guide member.

7. The lighting device according to claim 2, further comprising a reflection member, wherein:
the light guide members overlapping one another include a third light guide member arranged on an opposite side from the base member with respect to the second light guide member;
the reflection member is attached to a surface of the third light guide member on an opposite side from the light exit surface and configured to reflect light toward the light exit surface; and
the third light guide member and the reflection member are arranged such that overlapping areas thereof with the second light guide member also overlap the first locking part and the second locking part in a direction that crosses the light exit surface.

8. The lighting device according to claim 2, further comprising an engaging part provided at the second locking part, wherein the first locking part includes an engaging portion on an opposite side from the base member with respect to the engaging part and with which the engaging part is engaged.

9. The lighting device according to claim 8, wherein:
the first locking part is a protrusion;
the engaging part projects from the first locking part in a direction that crosses a direction that crosses the light exit surface; and
the second locking part is formed in a shape such that the first locking part and the engaging part are placed therein, and an edge of the second locking part is configured as the engaging portion.

10. The lighting device according to claim 9, wherein the engaging portion is formed so as to project in an opposite direction from the light exit surface of the first light guide member.

11. The lighting device according to claim 9, wherein the engaging portion extends parallel to the light exit surface of the first light guide member.

12. The lighting device according to claim 9, wherein:
the second locking part is a through hole that runs through the second light guide member; and
the engaging portion is bare in a surface of the second light guide member on a side opposite from the base member.

13. The lighting device according to claim 12, wherein the second locking part is formed so as to hold the entire engaging part engaged with the engaging portion therein.

14. The lighting device according to claim 2, wherein:
the first locking part is a protrusion; and
the second locking part is a recess.

15. The lighting device according to claim 14, wherein the first locking part is provided integrally with the fixing member.

16. The lighting device according to claim 2, wherein:
the first locking part is a recess; and
the second locking part is a protrusion.

17. The lighting device according to claim 16, wherein further comprising a reflection member configured to reflect light toward the light exit surface, the reflection member being attached to the surface of the second light guide member opposite from the light exit surface, and having an insertion hole corresponding to the second locking part and in which the second locking part is inserted.

18. The lighting device according to claim 16, wherein the second locking part is provided integrally with the second light guide member.

19. The lighting device according to claim 2, wherein:
each of the light guide member arranged in line along the arrangement direction includes the second locking part;
each of the fixing members that fix the light guide members includes the first locking part.

20. The lighting device according to claim 2, wherein the light guide members are arranged in lines that are parallel to each other in a direction that crosses the arrangement direction and parallel to the light exit surface.

21. The lighting device according to claim 20, wherein:
a pair of the fixing members is mounted to each light guide member at locations close to ends of a dimension parallel to the light exit surface and that crosses the arrangement direction;
each of the fixing members includes the first locking part; and
the first locking parts of two fixing members arranged adjacent to each other and mounted to the different light guide members, two fixing members among the fixing members mounted to the light guide members arranged parallel to the light exit surface and adjacent to each other in a direction that crosses the arrangement direction, are arranged in locations different from each other in the arrangement direction.

22. The lighting device according to claim 20, wherein:
the fixing members are arranged at ends of dimension of the light guide members parallel to the light exit surface and that crosses the arrangement direction; and
the first locking parts of two fixing members arranged adjacent to each other and mounted to the different light guide members, two fixing members among the fixing members mounted to the light guide members arranged parallel to the light exit surface and adjacent to each other in a direction that crosses the arrangement direction, are integrally provided.

23. The lighting device according to claim 2, wherein the second locking part is provided in the second light guide plate at a location close to an end of a dimension parallel to the light exit surface and the that crosses the arrangement direction.

24. The lighting device according to claim 23, wherein:
the fixing members, each having the first locking part, are arranged at ends of dimension of the first light guide member parallel to the light exit surface and that crosses the arrangement direction; and
the second locking parts are arranged at ends of dimension of the second light guide member parallel to the light exit surface and that crosses the arrangement direction.

25. The lighting device according to claim 1, wherein:
the locking structures are the first locking structures;
the base member and the light guide members include second locking structures configured to restrict relative movements of the light guide members along the light exit surfaces; and
the first locking structures and the second locking structures are arranged away from each other in the arrangement direction.

26. The lighting device according to claim 25, wherein:
the first locking structures are engaged in a direction substantially perpendicular to the light exit surface; and
the second locking structures are engaged in the direction substantially perpendicular to the light exit surface.

27. The lighting device according to claim 2, wherein each of the fixing members includes:
a mounting portion on an opposite side from the base member with respect to the light guide member;
an insertion portion projecting from the mounting portion on a base member side and inserted in an insertion hole formed in the light guide member and a mounting hole formed in the base member; and
a stopper provided at the insertion portion and held against the base member from an opposite side from the mounting portion.

28. The lighting device according to claim 27, wherein the fist light guide member has a holding recess for holding the mounting portion.

29. The lighting device according to claim 27, wherein the first locking part is provided in the mounting portion substantially concentrically with the insertion portion.

30. The lighting device according to claim 1, wherein each of the fixing members including the first locking part is made of white resin.

31. The lighting device according to claim 1, wherein the light sources are light-emitting diodes.

32. A display device comprising:
the lighting device according to claim 1; and
a display panel configured to provide display using light from the lighting device.

33. The display device according to claim 32, wherein the display panel is a liquid crystal panel including liquid crystals sealed between a pair of substrates.

34. A television receiver comprising the display device according to claim 32.

* * * * *